(12) United States Patent
Kember et al.

(10) Patent No.: US 10,774,179 B2
(45) Date of Patent: Sep. 15, 2020

(54) METHOD FOR PREPARING POLYOLS

(71) Applicant: Econic Technologies Ltd., Macclesfield (GB)

(72) Inventors: Michael Kember, London (GB);
Rakibul Kabir, London (GB);
Charlotte Katherine Williams, London (GB)

(73) Assignee: Econic Technologies Ltd., Macclesfield (GB)

( * ) Notice: Subject to any disclaimer, the term of this patent is extended or adjusted under 35 U.S.C. 154(b) by 0 days.

(21) Appl. No.: 15/809,801

(22) Filed: Nov. 10, 2017

(65) Prior Publication Data

US 2018/0148539 A1    May 31, 2018

Related U.S. Application Data

(63) Continuation of application No. PCT/GB2016/052676, filed on Aug. 26, 2016.

(30) Foreign Application Priority Data

Aug. 28, 2015 (GB) .................................. 1515350.5

(51) Int. Cl.
*C08G 64/34* (2006.01)
*C08G 65/26* (2006.01)
*C08G 64/02* (2006.01)
*C08G 18/44* (2006.01)

(52) U.S. Cl.
CPC ............ *C08G 64/34* (2013.01); *C08G 18/44* (2013.01); *C08G 64/0208* (2013.01); *C08G 65/2603* (2013.01); *C08G 65/2663* (2013.01)

(58) Field of Classification Search
CPC ............... C08G 64/34; C08G 65/2663; C08G 65/2603; C08G 64/0208
See application file for complete search history.

(56) References Cited

U.S. PATENT DOCUMENTS

| | | | |
|---|---|---|---|
| 4,565,845 A | 4/1986 | Inoue et al. | |
| 4,665,134 A | 5/1987 | Inoue et al. | |
| 5,777,177 A | 7/1998 | Pazos | |
| 9,006,347 B2* | 4/2015 | Williams | B01J 31/2243 525/419 |
| 9,453,104 B2* | 9/2016 | Williams | C07C 217/58 |
| 9,994,675 B2 | 6/2018 | Williams et al. | |
| 10,030,102 B2* | 7/2018 | Keyworth | B01J 31/1835 |
| 10,030,106 B2 | 7/2018 | Williams et al. | |
| 10,308,762 B2* | 6/2019 | Williams | B01J 31/1835 |
| 2006/0223973 A1 | 10/2006 | Hinz et al. | |
| 2011/0034616 A1 | 2/2011 | Noordover et al. | |
| 2011/0118435 A1* | 5/2011 | Williams | C07C 217/58 528/405 |
| 2012/0136134 A1 | 5/2012 | Van Der Meulen et al. | |
| 2012/0172566 A1 | 7/2012 | Zhang et al. | |
| 2012/0232245 A1* | 9/2012 | Jeong | C08G 65/2603 528/405 |
| 2013/0072602 A1* | 3/2013 | Gurtler | C08G 65/2603 524/83 |
| 2013/0172524 A1* | 7/2013 | Farmer | C07F 5/069 528/405 |
| 2014/0249279 A1 | 9/2014 | Williams et al. | |
| 2015/0051370 A1 | 2/2015 | Williams et al. | |
| 2016/0108181 A1 | 4/2016 | Williams et al. | |
| 2016/0347906 A1 | 12/2016 | Williams et al. | |
| 2017/0210848 A1* | 7/2017 | Chapman | B01J 31/1835 |
| 2017/0247508 A1 | 8/2017 | Williams et al. | |

(Continued)

FOREIGN PATENT DOCUMENTS

| | | | |
|---|---|---|---|
| KR | 2014 0042167 | * | 4/2014 |
| KR | 20140042167 A | | 4/2014 |

(Continued)

OTHER PUBLICATIONS

Langanke et al. Green Chem. 2014, 16, 1865-1870 (Year: 2014).*
Varghese et al. Polyhedron 2012, 32, 90-95 (Year: 2012).*
International Search Report and Written Opinion for PCT/GB2009/001043, dated Jul. 7, 2009.
International Preliminary Report on Patentability for PCT/GB2009/001043, dated Nov. 4, 2010.
International Search Report and Written Opinion for PCT/EP2012/067588, dated Mar. 14, 2013.
International Preliminary Report on Patentability for PCT/EP2012/067588, dated Mar. 20, 2014.
Great Britain Search Report for GB 1308978.4, dated Nov. 14, 2013.

(Continued)

*Primary Examiner* — Matthew P Coughlin
(74) *Attorney, Agent, or Firm* — Wolf, Greenfield & Sacks, P.C.

(57) ABSTRACT

The present invention relates to a method for preparing a polycarbonate ether polyol, by reacting an epoxide and carbon dioxide in the presence of a catalyst of formula (I), a double metal cyanide (DMC) catalyst and a starter compound. The catalyst of formula (I) is as follows:

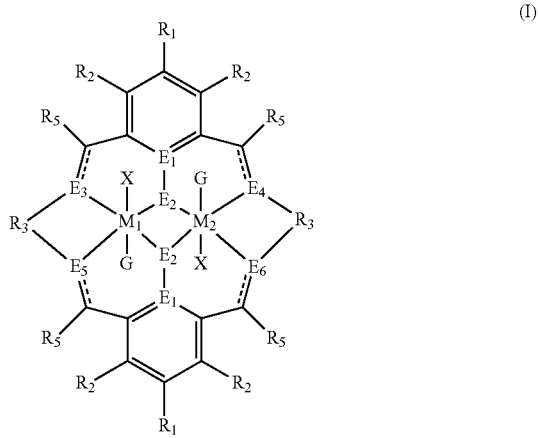

24 Claims, 6 Drawing Sheets

(56) References Cited

U.S. PATENT DOCUMENTS

| | | | |
|---|---|---|---|
| 2018/0305501 A1 | 10/2018 | Williams et al. | |
| 2019/0010277 A1 | 1/2019 | Williams et al. | |

FOREIGN PATENT DOCUMENTS

| | | | | |
|---|---|---|---|---|
| RU | 2191784 C2 | 10/2002 | | |
| WO | WO 2008/128548 A2 | 10/2008 | | |
| WO | WO 2009/130470 A2 | 10/2009 | | |
| WO | WO 2009/137540 A1 | 11/2009 | | |
| WO | WO 2010/028362 A1 | 3/2010 | | |
| WO | WO 2010/110460 A1 | 9/2010 | | |
| WO | WO 2012/037282 A2 | 3/2012 | | |
| WO | WO 2013/034750 A2 | 3/2013 | | |
| WO | WO-2013034750 A2 * | 3/2013 | .......... | B01J 31/2243 |
| WO | WO 2013/130811 A1 | 9/2013 | | |
| WO | WO 2014/184578 A2 | 11/2014 | | |
| WO | WO 2016/012785 A1 | 1/2016 | | |
| WO | WO-2016012786 A1 * | 1/2016 | .......... | B01J 31/1835 |

OTHER PUBLICATIONS

Great Britain Search Report for GB 1402109.1, dated Aug. 1, 2014.
International Search Report and Written Opinion for PCT/GB2014/051511, dated Jan. 20, 2015.
International Preliminary Report on Patentability for PCT/GB2014/051511, dated Nov. 26, 2015.
International Search Report and Written Opinion for PCT/EP2015/052496, dated Apr. 7, 2015.
International Preliminary Report on Patentability for PCT/EP2015/052496, dated Aug. 18, 2016.
International Search Report and Written Opinion for PCT/GB2016/052676, dated Nov. 17, 2016.
[No Author Listed] Database WPI, Thomas Scientific. Univ Pusan Nat Ind Coop Found. Apr. 7, 2014. XP002763970.
Aida et al.., Catalytic reaction on both sides of a metalloporphyrin plane. Alternating copolymerization of phthalic anhydride and epoxypropane with an aluminum porphyrin-quaternary salt system. *J Am Chem Soc*. 1985;107(5):1358-1364.
Aida et al.., Well-controlled polymerization by metalloporphyrin. Synthesis of copolymer with alternating sequence and regulated molecular weight from cyclic acid anhydride and epoxide catalyzed by the system of aluminum porphyrin coupled with quaternary organic salt. *Macromolecules*. 1985;18:1049.
Allen et al.., High-activity, single-site catalysts for the alternating copolymerization of $CO_2$ and propylene oxide. *J Am Chem Soc*. Dec. 4, 2002;124(48):14284-5.
Asato et al.., Polynuclear zinc (II) complexes of phenol-imine and -amine macrocycles. *J. Chem. Soc. Dalton Trans*. 1995; 3897-3904.
Black et al.., Compartmental Schiff-base ligands as selective double-loaded extractants for copper(II). *Chem Commun* (Camb). Feb. 21, 2002;(4):340-1.
Bok et al.., Bimetallic fluorine-substituted anilido-aldimine zinc complexes for CO2/(cyclohexene oxide) copolymerization. *Inorg Chem*. May 15, 2006;45(10):4228-37.
Bradley et al.., Homometallic Alkoxides. Alkoxo and Aryloxo Derivatives of Metals. *Elsevier*. 2001; 1:105-109.
Buchard et al.., A bimetallic iron(III) catalyst for CO2/epoxide coupling. *Chem Commun* (Camb). Jan. 7, 2011;47(1):212-4. doi: 10.1039/c0cc02205e. Epub Sep. 27, 2010.
Chamberlain et al.., Polymerization of lactide with zinc and magnesium beta-diiminate complexes: stereocontrol and mechanism. *J Am Chem Soc*. Apr. 11, 2001;123(14):3229-38.
Cheng et al.., Catalytic Reactions Involving C1 Feedstocks: New High-Activity Zn(II)-Based Catalysts for the Alternating Copolymerization of Carbon Dioxide and Epoxides. *J Am Chem Soc*. 1998;120:11018-19.
Cheng et al.., Single-site beta-diiminate zinc catalysts for the alternating copolymerization of CO2 and epoxides: catalyst synthesis and unprecedented polymerization activity. *J Am Chem Soc*. Sep. 12, 2001;123(36):8738-49.

Coates et al.., Discrete Metal-Based Catalyst for the Copolymerization of CO2 and Epoxides: Discovery, Reactivity, Optimization, and Mechanism. *Angew Chem Int Ed*. 2004;43:6618-39.
Cyriac et al.., Immortal CO2/Propylene Oxide Copolymerization: Precise Control of Molecular Weight and Architecture of Various Block Copolymers. *Macromolecules*. 2010;43(18):7398-401.
Darensbourg et al.., Bis 2,6-difluorophenoxide Dimeric Complexes of Zinc and Cadmium and Their Phosphine Adducts :Lessons Learned Relative to Carbon Dioxide/Cyclohexene Oxide Alternating Copolymerization Processes by Zinc Phenoxides. *J Am Chem Soc*. 2000;122:12487-96.
Darensbourg et al.., Catalytic Activity of a Series of Zn(II) Phenoxides for the Copolymerization of Epoxides and Carbon Dioxides. *J Am Chem Soc*. 1999;121:107-16.
Darensbourg et al.., Kinetic Studies of the Alternating Copolymerization of Cyclic Acid Anhydrides and Epoxides, and the Terpolymerization of Cyclic Acid Anhydrides, Epoxides, and $CO_2$ Catalyzed by (salen)CrIIIC1. *Macromolecules*. 2012;45(5):2242-48.
Darensbourg et al.., Mechanistic aspects of the copolymerization reaction of carbon dioxide and epoxides, using a chiral salen chromium chloride catalyst. *J Am Chem Soc*. Jun. 5, 2002;124(22):6335-42.
Darensbourg et al.., Solution and solid-state structures of phosphine adducts of monomeric zinc bisphenoxide complexes. Importance of these derivatives in CO2/epoxide copolymerization processes. *Inorg Chem*. Apr. 3, 2000;39(7):1578-85.
Darensbourg, Making plastics from carbon dioxide: salen metal complexes as catalysts for the production of polycarbonates from epoxides and CO2. *Chem Rev*. Jun. 2007;107(6):2388-410. Epub Apr. 21, 2007.
Das et al.., Iso- and mixed-valent phenoxy bridged binuclear macrocyclic complexes of cobalt, iron and manganese. *Polyhedron*. 1994;13(38):2639-45.
Diciccio et al.., Ring-Opening Copolymerization of Maleic Anhydride with Epoxides: A Chain-Growth Approach to Unsaturated Polyesters. *J Am Chem Soc*. 2011;133:10724-27.
Dutta et al.., Efficient proton-templated synthesis of 18- to 38-membered tetraimino(amino)diphenol macrocyclic ligands: structural features and spectroscopic properties. *J Org Chem*. Aug. 6, 2004;69(16):5419-27.
Dutta et al.., Model Compounds for Iron Proteins. Structures and Magnetic, Spectroscopic, and Redox Properties of Fe(III)M(II) and [Co(III)Fe(III)](2)O Complexes with (&mgr;-Carboxylato)bis(&mgr;-phenoxo)dimetalate and (&mgr;-Oxo)diiron(III) Cores. *Inorg Chem*. Apr. 10, 1996;35(8):2292-2300.
Eberhardt et al.., The Ethylsulfinate Ligand: A Highly Efficient Initiating Group for the Zinc β-Diiminate Catalyzed Copolymerization of CO2 and Epoxides. *Organometallics*. 2003;22:211-14.
Gao et al., Dicarboxylic acid promoted immortal copolymerization for controllable synthesis of low-molecular weight oligo(carbonate-ether) diols with tunable carbonate unit content. *J. Polym. Sci. A Polym. Chem*. 2012;50:5177-84. doi:10.1002/pola.26366.
Hosseini et al.., Alternating Ring-Opening Polymerization of Cyclohexene Oxide and Anhydrides: Effect of Catalyst, Cocatalyst, and Anhydride Structure. *Macromolecules*. 2012;45(4):1770-76.
Hosseini et al.., Interaction energy and polymer density profile in nanocomposites: a coarse grain simulation based on interaction stress. *Polym Chem*. 2012;3:1158-67.
Hosseini et al.., Semi-aromatic polyesters by alternating ring-opening copolymerization of styrene oxide and anhydrides. *Polym Chem*. Jan. 2012; 3:1308-1313.
Inoue et al.., Copolymerization of carbon dioxide and epoxide. *Polymer Letts*. 1969;7:287-92.
Inoue et al.., Immortal polymerization: the outset, development, and application. *J Polym. Sci. Part A Polym. Chem*. 2000;38:2861-71.
Jeske et al.., Alternating copolymerization of epoxides and cyclic anhydrides: an improved route to aliphatic polyesters. *J Am Chem Soc*. Sep. 19, 2007;129(37):11330-1. Epub Aug. 28, 2007.
Jutz et al.., Mechanistic Investigation and Reaction Kinetics of the Low-Pressure Copolymerization of Cyclohexene Oxide and Carbon Dioxide Catalyzed by a Dizinc Complex. *J Am Chem Soc*. 2011;133(43):17395-17405.

(56) References Cited

OTHER PUBLICATIONS

Kember et al., Triblock copolymers from lactide and telechelic poly(cyclohexene carbonate) *Polym. Chem.*, Mar. 2, 2012;3:1196-1201 Supporting Information S1-9.
Kember et al.., Di- and tri-zinc catalysts for the low-pressure copolymerization of CO2 and cyclohexene oxide. *Inorg Chem.* Oct. 5, 2009;48(19):9535-42. doi: 10.1021/ic901109e.
Kember et al.., Di-cobalt(II) catalysts for the copolymerisation of CO2 and cyclohexene oxide: support for a dinuclear mechanism? *Chem Sci.* 2012;3:1245-55.
Kember et al.., Efficient Magnesium Catalysts for the Copolymerization of Epoxides and $CO_2$; Using Water to Synthesize Polycarbonate Polyols. *J Am Chem Soc.* 2012;134(38):15676-15679.
Kember et al.., Highly active di- and trimetallic cobalt catalysts for the copolymerization of CHO and $CO_2$ at atmospheric pressure. *Macromolecules.* 2010; 43(5):2291-98. doi: 10.1021/ma902582m.
Kember et al.., Highly active dizinc catalyst for the copolymerization of carbon dioxide and cyclohexene oxide at one atmosphere pressure. *Angew Chem Int Ed Engl.* 2009;48(5):931-3.
Kember et al.., Triblock copolymers from lactide and telechelic poly(cyclohexene carbonate). *Polym Chem.* 2012;3:1196-1201.
Knight et al.., Dinuclear zinc complexes using pentadentate phenolate ligands. *Inorg Chem.* Dec. 15, 2008;47(24):11711-9.
Koning et al.., Synthesis and physical characterization of poly(cyclohexane carbonate), synthesized from CO2 and cyclohexene oxide. *Polymer.* 2001;42:3995-4004.
Lee et al.., Bimetallic anilido-aldimine zinc complexes for epoxide/CO2 copolymerization. *J Am Chem Soc.* Mar. 9, 2005;127(9):3031-7.
Lu et al.., Design of highly active binary catalyst systems for CO2/epoxide copolymerization: polymer selectivity, enantioselectivity, and stereochemistry control. *J Am Chem Soc.* Feb. 8, 2006;128(5):1664-74.
Moore et al.., Mechanism of the alternating copolymerization of epoxides and CO2 using beta-diiminate zinc catalysts: evidence for a bimetallic epoxide enchainment. *J Am Chem Soc.* Oct. 1, 2003;125(39):11911-24.
Nozaki et al.., Asymmetric catalytic synthesis of polyketones and polycarbonates. *Pure Appl Chem.* 2004;76(3):541-46.
Paddock et al.., Chemical CO(2) fixation: Cr(III) salen complexes as highly efficient catalysts for the coupling of CO(2) and epoxides. *J Am Chem Soc.* Nov. 21, 2001;123(46):11498-9.
Pilz et al.., Dinuclear Zinc Complexes Based on Parallel β-Diiminato Binding Sites: Syntheses, Structures, and Properties as CO2/Epoxide Copolymerization Catalysts. *Organometallics.* 2007;26:3668-76.
Qin et al.., Cobalt-Based Complexes for the Copolymerization of Propylene Oxide and CO2; Active and Selective Catalysts for Polycarbonate Synthesis. *Angew Chem Int Ed.* 2003;42:5484-87.
Ren et al.., Highly Active, Bifunctional Co(III)-Salen Catalyst for Alternating Copolymerization of $CO_2$ with Cyclohexene Oxide and Terpolymerization with Aliphatic Epoxides. *Macromolecules.* 2010;43(3):1396-1402.
Robert et al.., Tandem synthesis of alternating polyesters from renewable resources. *Nature Comm.* 2011;2:586.
Rokicki et al.., The Application of Carbon Dioxide as a Direct Material for Polymer Syntheses in Polymerization and Polycondensation Reactions. *J Macromol Sci Rev Macomol Chem Phys* 1981;C21(1):135-86.

Saini et al.., Dinuclear metal catalysts: improved performance of heterodinuclear mixed catalysts for CO2-epoxide copolymerization. *Chem Commun.* 2014;50:4164-67.
Sugimoto et al., Alternating copolymerization of carbon dioxide and epoxide by dinuclear zinc Schiff base complex. *Reactive and Functional Polymers.* Nov. 2007; 67(11):1277-83.
Sugimoto et al.., Alternating Copolymerization of Carbon Dioxide and Epoxide by Manganese Porphyrin: The First Example of Polycarbonate Synthesis from 1-atm Carbon Dioxide. *J Polym Sci Polym Chem.* 2003;41:3549-55.
Sugimoto et al.., Copolymerization of Carbon Dioxide and Epoxide. *J Polym Sci Polym Chem.* 2004;42:5561-73.
Sugimoto et al.., The Cobalt Porphyrin-Lewis Base System: A Highly Selective Catalyst for Alternating Copolymerization of $CO_2$ and Epoxide under Mild Condition. *Macromolecules.* 2008;41:312-17.
Van Meerendonk et al.., High-Throughput Automated Parallel Evaluation of Zinc-Based Catalysts for the Copolymerization of CHO and $CO_2$ to Polycarbonates. *Macromol Rapid Commun.* 2004;25:382-86.
Van Meerendonk et al.., Unexpected Side Reactions and Chain Transfer for Zinc-Catalyzed Copolymerization of Cyclohexene Oxide and Carbon Dioxide. *Macromolecules.* 2005;38:7306-13.
Williams et al.., A highly active zinc catalyst for the controlled polymerization of lactide. *J Am Chem Soc.* Sep. 17, 2003;125(37):11350-9.
Williams et al.., Metalloenzyme inspired dizinc catalyst for the polymerization of lactide. *Chem Commun* (Camb). Sep. 21, 2002;(18):2132-3.
Wu et al.., Tandem metal-coordination copolymerization and organocatalytic ring-opening polymerization via water to synthesize diblock copolymers of styrene oxide/CO2 and lactide. *J Am Chem Soc.* Oct. 24, 2012;134(42):17739-45. doi: 10.1021/ja307976c. Epub Oct. 9, 2012.
Xiao et al.., Copolymerization of cyclohexene oxide with $CO_2$ by using intramolecular dinuclear zinc catalysts. *Chemistry.* Jun. 6, 2005;11(12):3668-78.
Xiao et al.., Intramolecularly Dinuclear Magnesium Complex Catalyzed Copolymerization of Cyclohexene Oxide with $CO_2$ under Ambient $CO_2$ Pressure: Kinetics and Mechanism. *Macromolecules.* 2006;39:128-37.
Crescenzi et al., Thermodynamics of fusion of poly-β-propiolactone and poly-ε-caprolactone. comparative analysis of the melting of aliphatic polylactone and polyester chains. European Polymer Journal Mar. 1972;8(3):449-463.
Hu et al., Crystalline Structure and Properties of EP and EB Copolymers by Solid-State NMR, DSC, and WAXS. Macromolecules, 2002;35(13):5013-5024. DOI: 10.1021/ma0118670.
Keller et al., Characterization of polybutylacrylate-B-polyvinylpyridine block copolymers by size-exclusion chromatography and dual refractive index/UV-detection. Journal of Liquid Chromatography & Related Technologies, 2010;33(17):1587-1600. DOI: 10.1080/10826076.2010.518934.
Rae et al., The properties of poly(tetrafluoroethylene) (PTFE) in compression. Polymer Oct. 2004;45(22):7615-7625.
Kim et al., Biodegradable Polycarbonate Synthesis by Copolymerization of Carbon Dioxide with Epoxides Using a Heterogeneous Zinc Complex. Macromol. Symp., 2005;224:181-192. doi:10.1002/masy.200550616.

* cited by examiner

METHOD FOR PREPARING POLYOLS

RELATED APPLICATIONS

The present application claims priority under 35 U.S.C. §§ 120 and 365(c) to and is a continuation of international PCT Application PCT/GB2016/052676, filed Aug. 26, 2016. Foreign priority benefits are claimed under 35 U.S.C. § 119(a)-(d) or 35 U.S.C. § 365(b) of British application number 1515350.5, filed Aug. 28, 2015. The entire contents of these applications are incorporated herein by reference in their entirety.

TECHNICAL FIELD

The present invention relates to a method for preparing a polycarbonate ether polyol, by reacting an epoxide and carbon dioxide in the presence of a catalyst of formula (I), a double metal cyanide (DMC) catalyst and a starter compound.

BACKGROUND

Polyurethanes are polymers which are prepared by reacting a di- or polyisocyanate with a polyol. Polyurethanes are used in many different products and applications, including as insulation panels, high performance adhesives, high-resilience foam seating, seals and gaskets, wheels and tyres, synthetic fibres, and the like.

The polyols used to make polyurethanes are polymers which have multiple reactive sites (e.g. multiple hydroxyl functional groups). The polyols which are most commonly used are based on polyethers or polyesters.

One method for making polyether polyols in industry is by reacting an epoxide with a double metal cyanide (DMC) catalyst in the presence of a starter compound.

The nature and properties of the polyols have a great impact on the nature and the properties of the resultant polyurethanes. It is desirable to include polycarbonate linkages in the backbone of polyether polyols, as carbonate linkages in the polyol may improve the properties of the resultant polyurethane, for example, the presence of carbonate linkages may improve the UV stability, hydrolytic stability, chemical resistance and/or mechanical strength of the resulting polyurethane. The presence of carbonate linkages also increases the viscosity of the resulting polyol, which can limit use in some applications. It is therefore important to be able to control the ratio of ether linkages to carbonate linkages in polyols to tailor properties for widespread application. It is also important to be able to control the molecular weight and polydispersity of the polyol, as these properties impact usefulness and ease of processing of the resultant polyols.

DMC catalysts for use in the preparation of polyethers were first disclosed in U.S. Pat. No. 3,427,256 by The General Tyre and Rubber Company. It was subsequently found that carrying out this reaction in the presence of a starter compound yielded a polyether polyol.

DMC catalysts are also capable of preparing polyether polyols which contain carbonate linkages in the polymer backbone (hereinafter referred to as polycarbonate ether polyols). To prepare these types of polymers, the reaction is typically carried out at high pressures of carbon dioxide. It has generally been found that, for DMC catalysts, in order to obtain appreciable incorporation of carbon dioxide, the reaction must be carried out at pressures of 40 bar or above. This is undesirable as industrial equipment for preparing polyols are typically limited to pressures of up to 10 bar. For example, in US 2013/0072602, the examples set out the polymerisation of propylene oxide in the presence of a starter compound, and an additive at 50 bar $CO_2$. The resulting polycarbonate ether polyols incorporate between 17.8 and 24.1 wt % $CO_2$. Similar results can be seen in US 2013/0190462.

In WO 2015/022290, the examples show that when the polymerisation of propylene oxide is carried out in the presence of a DMC catalyst and a starter compound in the range of 15-25 bar $CO_2$, the resulting polyols incorporated between 10.0 and 15.4 wt % $CO_2$.

It is therefore desirable to be able to prepare polycarbonate ether polyols under pressures used in industrial polyether polyol equipment. It is also desirable to obtain appreciable incorporation of carbon dioxide (e.g. ≥20 wt % carbon dioxide, which requires a proportion of carbonate linkages of ~0.5 in the polymer backbone, depending on the nature of the starter used) under low pressures.

WO 2010/028362 discloses a method for making polycarbonate polyols by copolymerising carbon dioxide and an epoxide in the presence of a chain transfer agent and a catalyst having a permanent ligand set which complexes a single metal atom. The polyols prepared in the examples have a proportion of carbonate linkages ≥0.95 in the polymer backbone. These systems are designed to prepare polycarbonates having little or no ether linkages in the polymer backbones. Furthermore, each of the examples is carried out at high pressures of 300 psig (about 20 bar) carbon dioxide.

WO 2013/034750 discloses a method for preparing polycarbonate polyols using a catalyst of formula (I):

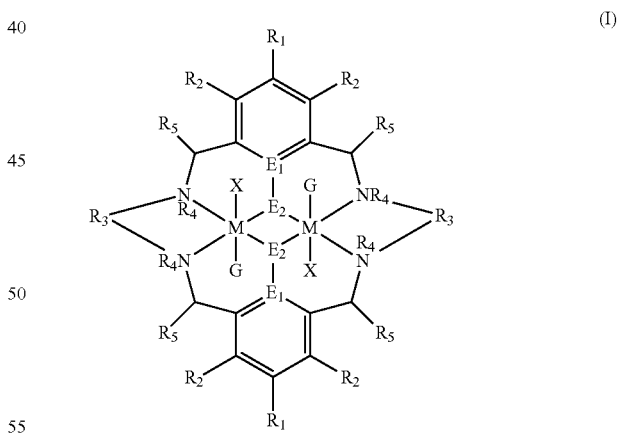

The polyols prepared in the examples have ≥95% carbonate linkages, and generally ≥99% carbonate linkages in the polymer backbone.

WO 2012/121508 relates to a process for preparing polycarbonate ethers, which are ultimately intended for use as resins and soft plastics. This document is not concerned with preparing polyols. The process disclosed in WO 2012/121508 requires the copolymerisation of an epoxide and carbon dioxide in the presence of a DMC catalyst and a metal salen catalyst having the following formula:

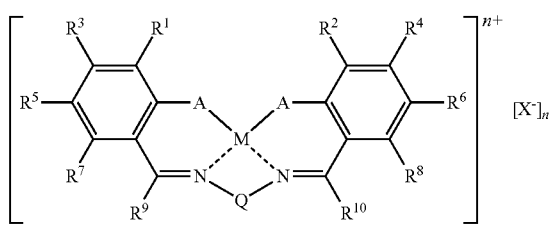

The examples are each carried out at 16 bar $CO_2$ or above. The resulting polycarbonate ethers contain varying amounts of ether and carbonate linkages. However, said polymers have a high molecular weight, have high polydispersity indices (that is, PDIs of 3.8 and above) and are not terminated by hydroxyl groups. These polymers cannot therefore be used to make polyurethanes.

Gao et al, Journal of Polymer Science Part A: Polymer Chemistry, 2012, 50, 5177-5184, describes a method for preparing low molecular weight polycarbonate ether polyol using a DMC catalyst and a di-carboxylic acid starter. The proportion of carbonate linkages can be increased up to 0.75 in the resultant polyols by decreasing the temperature (50° C.) and increasing the pressure (40 bar), when using a dicarboxylic acid starter which is apparently crucial to the ability to prepare polyols with high proportions of carbonate linkages. These conditions are unfavourable for economic industrial application. Gao et al suggests that dual catalysts systems for preparing polycarbonate ether polyols are unfavourable.

With previously reported catalyst systems, even at the widest range of temperature and pressures that have been deployed, it has reportedly not been possible to prepare polyols with proportions of carbonate linkages between 0.75 and 0.9.

SUMMARY OF THE INVENTION

The invention relates to a method for preparing a polycarbonate ether polyol by reacting an epoxide and carbon dioxide in the presence of a catalyst of formula (I), a double metal cyanide (DMC) catalyst and a starter compound.

The catalyst of formula (I) is as follows:

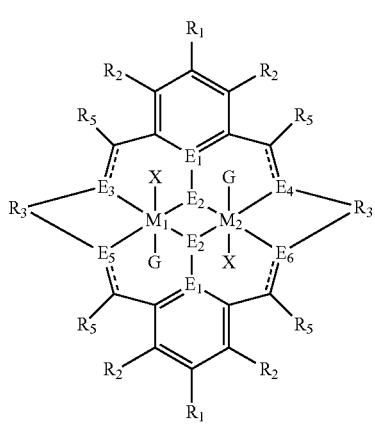

(I)

wherein:
$M_1$ and $M_2$ are independently selected from Zn(II), Cr(II), Co(II), Cu(II), Mn(II), Mg(II), Ni(II), Fe(II), Ti(II), V(II), Cr(III)-X, Co(III)-X, Mn(III)-X, Ni(III)-X, Fe(III)-X, Ca(II), Ge(II), Al(III)-X, Ti(III)-X, V(III)-X, Ge(IV)-(X)$_2$ or Ti(IV)-(X)$_2$;

$R_1$ and $R_2$ are independently selected from hydrogen, halide, a nitro group, a nitrile group, an imine, an amine, an ether group, a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

$R_3$ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic;

$R_5$ is independently selected from H, or optionally substituted aliphatic, heteroaliphatic, alicyclic, heteroalicyclic, aryl, heteroaryl, alkylheteroaryl or alkylaryl;

$E_1$ is C, $E_2$ is O, S or NH or $E_1$ is N and $E_2$ is O;

$E_3$, $E_4$, $E_5$ and $E_6$ are selected from N, $NR_4$, O and S, wherein when $E_3$, $E_4$, $E_5$ or $E_6$ are N, 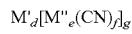 is ═, and wherein when $E_3$, $E_4$, $E_5$ or $E_6$ are $NR_4$, O or S, 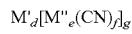 is —; $R_4$ is independently selected from H, or optionally substituted aliphatic, heteroaliphatic, alicyclic, heteroalicyclic, aryl, heteroaryl, alkylheteroaryl, -alkylC(O)O$R_{19}$ or -alkylC≡N or alkylaryl;

X is independently selected from OC(O)$R^x$, OSO$_2R^x$, OSO$R^x$, OSO($R^x$)$_2$, S(O)$R^x$, O$R^x$, phosphinate, halide, nitrate, hydroxyl, carbonate, amino, amido or optionally substituted aliphatic, heteroaliphatic, alicyclic, heteroalicyclic, aryl or heteroaryl;

$R_x$ is independently hydrogen, or optionally substituted aliphatic, haloaliphatic, heteroaliphatic, alicyclic, heteroalicyclic, aryl, alkylaryl or heteroaryl; and G is absent or independently selected from a neutral or anionic donor ligand which is a Lewis base.

The DMC catalyst comprises at least two metal centres and cyanide ligands. The DMC catalyst may additionally comprise an organic complexing agent, water and/or a metal salt (e.g. in non-stoichiometric amounts).

For example, the DMC catalyst may comprise:

$M'_d[M''_e(CN)_f]_g$

Wherein M' is selected from Zn(II), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III), M" is selected from Fe(II), Fe(III), Co(II), Co(III), Cr(III), Cr(III), Mn(II), Mn(III), Ir(III), Ni(II), Rh(III), Ru(II), V(IV), and V(V); and d, e, f and g are integers, and are chosen to such that the DMC catalyst has electroneutrality.

The starter compound may be of the formula (III):

$$Z\text{-}(R^Z)_a \qquad (III)$$

Z can be any group which can have 2 or more —$R^Z$ groups attached to it. Thus, Z may be selected from optionally substituted alkylene, alkenylene, alkynylene, heteroalkylene, heteroalkenylene, heteroalkynylene, cycloalkylene, cycloalkenylene, hererocycloalkylene, heterocycloalkenylene, arylene, heteroarylene, or Z may be a combination of any of these groups, for example Z may be an alkylarylene, heteroalkylarylene, heteroalkylheteroarylene or alkylheteroarylene group.

a is an integer which is at least 2, each $R^Z$ may be —OH, —NHR', —SH, —C(O)OH, —P(O)(OR')(OH), —PR'(O)(OH)$_2$ or —PR'(O)OH, and R' may be H, or optionally substituted alkyl, heteroalkyl, aryl, heteroaryl, cycloalkyl or heterocycloalkyl.

The method can be carried out at pressure of between about 1 bar and about 60 bar, between about 1 bar and about 30 bar, between about 1 bar and about 20 bar, between about 1 bar and about 15 bar, or between about 1 bar and about 10 bar carbon dioxide. It will also be appreciated that the reaction is capable of being carried out at a pressure of about 5 bar or below.

The method can be carried out at temperatures of from about 0° C. to about 250° C., for example from about 40° C. to about 140° C., e.g. from about 50° C. to about 110° C., such as from about 60° C. to about 100° C., for example, from about 70° C. to about 100° C.

The invention also provides a polymerisation system for the copolymerisation of carbon dioxide and an epoxide, comprising:
 a. A catalyst of formula (I) as defined herein,
 b. A DMC catalyst as defined herein, and
 c. A starter compound as herein.

The invention is capable of preparing polycarbonate ether polyols which have n ether linkages and m carbonate linkages, wherein n and m are integers, and wherein m/(n+m) is from greater than zero to less than 1.

The polyols prepared by the method of the invention may be used for further reactions, for example to prepare a polyurethane, for example by reacting a polyol composition comprising a polyol prepared by the method of the invention with a composition comprising a di- or polyisocyanate.

DEFINITIONS

Figure 1:
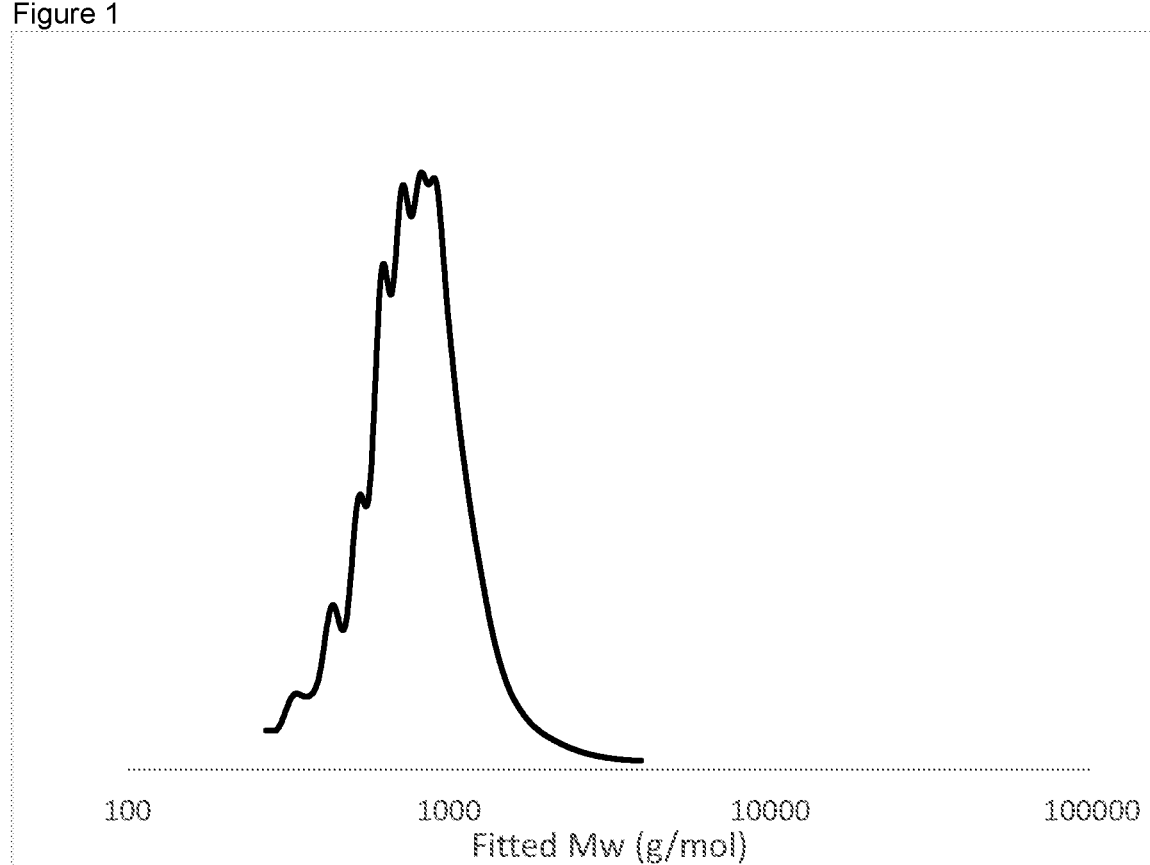
FIG. 1 is a GPC trace for Run 3 in Table 1, showing the narrow polydispersity polyol produced by the combination of a catalyst of formula (I) and a DMC catalyst.
Figure 2:
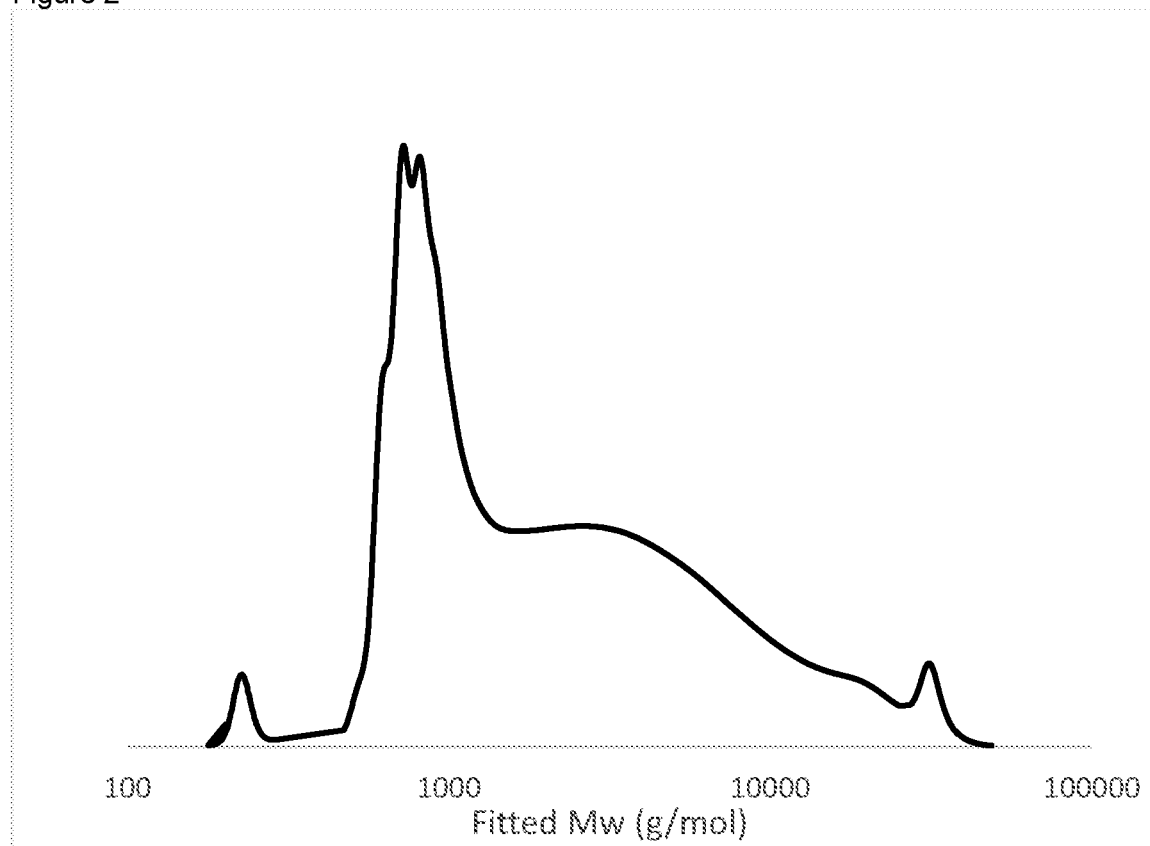
FIG. 2 is a GPC trace for Run 2 in Table 1, demonstrating the high polydispersity polyol produced by using a DMC catalyst alone.
Figure 3:
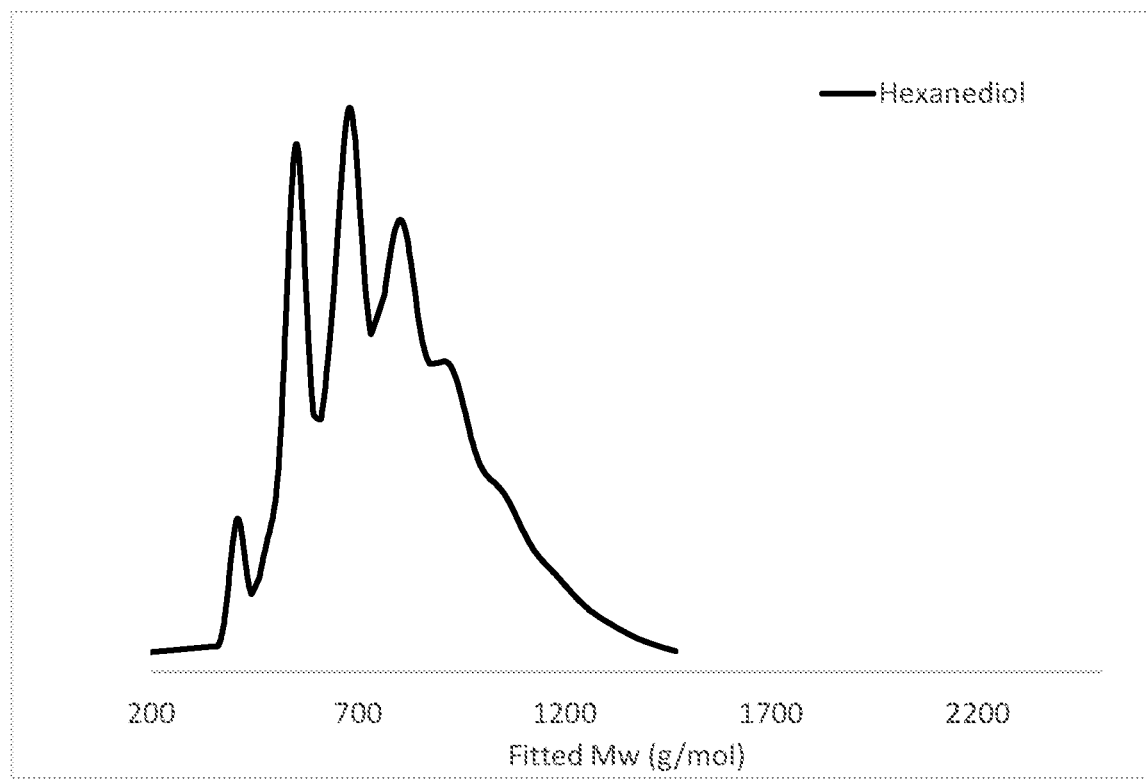
FIG. 3 is a GPC trace for Run 3 in Table 2, using 1,6-hexanediol as a starter.
Figure 4:
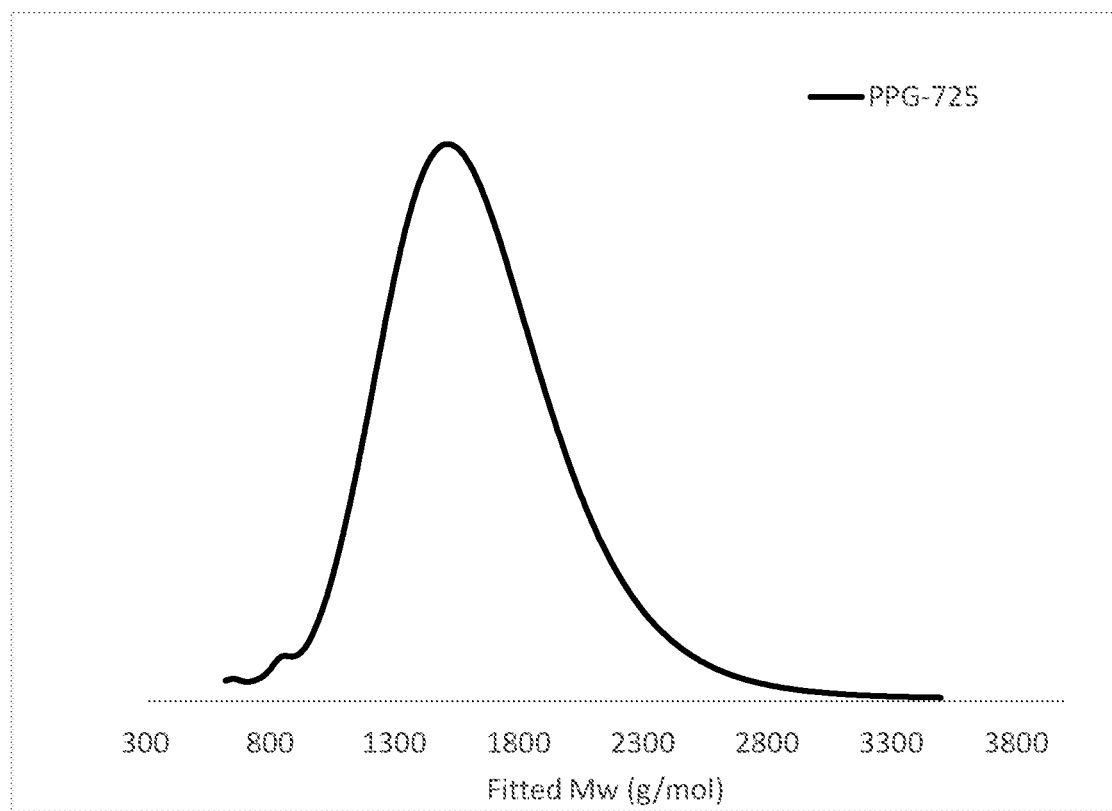
FIG. 4 is a GPC trace for Run 2 in Table 2, using PPG-725 as a starter.
Figure 5:
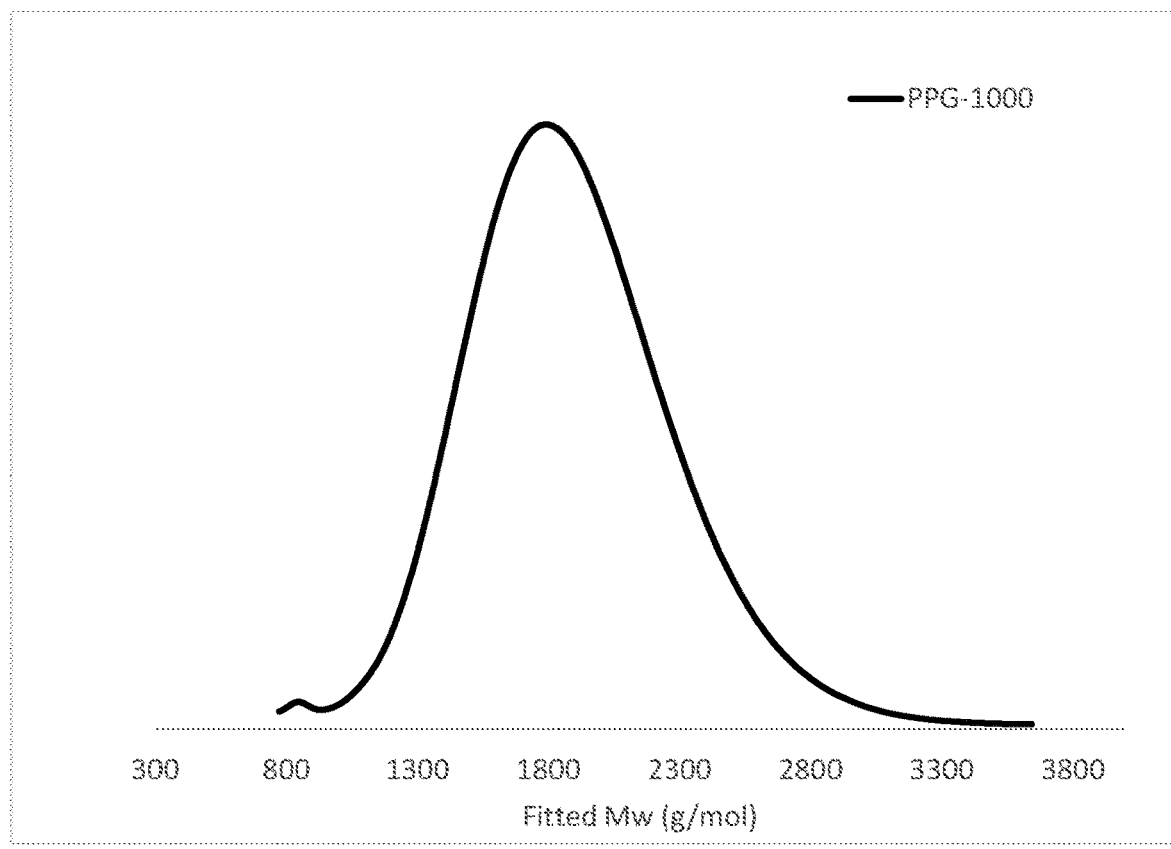
FIG. 5 is a GPC trace for Run 1 in Table 2, using PPG-1000 as a starter.

For the purpose of the present invention, an aliphatic group is a hydrocarbon moiety that may be straight chain or branched and may be completely saturated, or contain one or more units of unsaturation, but which is not aromatic. The term "unsaturated" means a moiety that has one or more double and/or triple bonds. The term "aliphatic" is therefore intended to encompass alkyl, alkenyl or alkynyl groups, and combinations thereof. An aliphatic group is preferably a $C_{1-20}$ aliphatic group, that is, an aliphatic group with 1, 2, 3, 4, 5, 6, 7, 8, 9, 10, 11, 12, 13, 14, 15, 16, 17, 18, 19 or 20 carbon atoms. Preferably, an aliphatic group is a $C_{1-15}$ aliphatic, more preferably a $C_{1-12}$ aliphatic, more preferably a $C_{1-10}$ aliphatic, even more preferably a $C_{1-8}$ aliphatic, such as a $C_{1-6}$ aliphatic group.

An alkyl group is preferably a "$C_{1-20}$ alkyl group", that is an alkyl group that is a straight or branched chain with 1 to 20 carbons. The alkyl group therefore has 1, 2, 3, 4, 5, 6, 7, 8, 9, 10, 11, 12, 13, 14, 15, 16, 17, 18, 19 or 20 carbon atoms. Preferably, an alkyl group is a $C_{1-15}$ alkyl, preferably a $C_{1-12}$ alkyl, more preferably a $C_{1-10}$ alkyl, even more preferably a $C_{1-8}$ alkyl, even more preferably a $C_{1-8}$ alkyl group. Specifically, examples of "$C_{1-20}$ alkyl group" include methyl group, ethyl group, n-propyl group, iso-propyl group, n-butyl group, isobutyl group, sec-butyl group, tert-butyl group, n-pentyl group, n-hexyl group, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, 1,1-dimethylpropyl group, 1,2-dimethylpropyl group, 2,2-dimethylpropyl group, 1-ethylpropyl group, n-hexyl group, 1-ethyl-2-methylpropyl group, 1,1,2-trimethylpropyl group, 1-ethylbutyl group, 1-methylbutyl group, 2-methylbutyl group, 1,1-dimethylbutyl group, 1,2-dimethylbutyl group, 2,2-dimethylbutyl group, 1,3-dimethylbutyl group, 2,3-dimethylbutyl group, 2-ethylbutyl group, 2-methylpentyl group, 3-methylpentyl group and the like.

Alkenyl and alkynyl groups are preferably "$C_{2-20}$alkenyl" and "$C_{2-20}$alkynyl", more preferably "$C_{2-15}$ alkenyl" and "$C_{2-15}$ alkynyl", even more preferably "$C_{2-12}$ alkenyl" and "$C_{2-12}$ alkynyl", even more preferably "$C_{2-10}$ alkenyl" and "$C_{2-10}$ alkynyl", even more preferably "$C_{2-8}$ alkenyl" and "$C_{2-8}$ alkynyl", most preferably "$C_{2-6}$ alkenyl" and "$C_{2-6}$ alkynyl" groups, respectively.

A heteroaliphatic group (including heteroalkyl, heteroalkenyl and heteroalkynyl) is an aliphatic group as described above, which additionally contains one or more heteroatoms. Heteroaliphatic groups therefore preferably contain from 2 to 21 atoms, preferably from 2 to 16 atoms, more preferably from 2 to 13 atoms, more preferably from 2 to 11 atoms, more preferably from 2 to 9 atoms, even more preferably from 2 to 7 atoms, wherein at least one atom is a carbon atom. Particularly preferred heteroatoms are selected from O, S, N, P and Si. When heteroaliphatic groups have two or more heteroatoms, the heteroatoms may be the same or different.

An alicyclic group is a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Preferably, an alicyclic group has from 3 to 15, more preferably from 3 to 12, even more preferably from 3 to 10, even more preferably from 3 to 8 carbon atoms, even more preferably from 3 to 6 carbons atoms. The term "alicyclic" encompasses cycloalkyl, cycloalkenyl and cycloalkynyl groups. It will be appreciated that the alicyclic group may comprise an alicyclic ring bearing one or more linking or non-linking alkyl substituents, such as —CH$_2$-cyclohexyl. Specifically, examples of the $C_{3-20}$ cycloalkyl group include cyclopropyl, cyclobutyl, cyclopentyl, cyclohexyl, cycloheptyl, adamantyl and cyclooctyl.

A heteroalicyclic group is an alicyclic group as defined above which has, in addition to carbon atoms, one or more ring heteroatoms, which are preferably selected from O, S, N, P and Si. Heteroalicyclic groups preferably contain from one to four heteroatoms, which may be the same or different. Heteroalicyclic groups preferably contain from 5 to 20 atoms, more preferably from 5 to 14 atoms, even more preferably from 5 to 12 atoms.

An aryl group is a monocyclic or polycyclic ring system having from 5 to 20 carbon atoms. An aryl group is preferably a "$C_{6-12}$ aryl group" and is an aryl group constituted by 6, 7, 8, 9, 10, 11 or 12 carbon atoms and includes condensed ring groups such as monocyclic ring group, or bicyclic ring group and the like. Specifically, examples of "$C_{6-10}$ aryl group" include phenyl group, biphenyl group, indenyl group, naphthyl group or azulenyl group and the like. It should be noted that condensed rings such as indan and tetrahydro naphthalene are also included in the aryl group.

A heteroaryl group is an aryl group having, in addition to carbon atoms, from one to four ring heteroatoms which are preferably selected from O, S, N, P and Si. A heteroaryl group preferably has from 5 to 20, more preferably from 5 to 14 ring atoms. Specifically, examples of a heteroaryl group include pyridine, imidazole, methylimidazole and dimethylaminopyridine.

Examples of alicyclic, heteroalicyclic, aryl and heteroaryl groups include but are not limited to cyclohexyl, phenyl, acridine, benzimidazole, benzofuran, benzothiophene, benzoxazole, benzothiazole, carbazole, cinnoline, dioxin, dioxane, dioxolane, dithiane, dithiazine, dithiazole, dithiolane, furan, imidazole, imidazoline, imidazolidine, indole, indoline, indolizine, indazole, isoindole, isoquinoline, isoxazole, isothiazole, morpholine, napthyridine, oxazole, oxadiazole, oxathiazole, oxathiazolidine, oxazine, oxadiazine, phenazine, phenothiazine, phenoxazine, phthalazine, piperazine, piperidine, pteridine, purine, pyran, pyrazine, pyrazole, pyrazoline, pyrazolidine, pyridazine, pyridine, pyrimidine, pyrrole, pyrrolidine, pyrroline, quinoline, quinoxaline, quinazoline, quinolizine, tetrahydrofuran, tetrazine, tetrazole, thiophene, thiadiazine, thiadiazole, thiatriazole, thiazine, thiazole, thiomorpholine, thianaphthalene, thiopyran, triazine, triazole, and trithiane.

The term "halide" or "halogen" are used interchangeably and, as used herein mean a fluorine atom, a chlorine atom, a bromine atom, an iodine atom and the like, preferably a fluorine atom, a bromine atom or a chlorine atom, and more preferably a fluorine atom.

A haloalkyl group is preferably a "$C_{1-20}$ haloalkyl group", more preferably a "$C_{1-15}$ haloalkyl group", more preferably a "$C_{1-12}$ haloalkyl group", more preferably a "$C_{1-10}$ haloalkyl group", even more preferably a "$C_{1-8}$ haloalkyl group", even more preferably a "$C_{1-6}$ haloalkyl group" and is a $C_{1-20}$ alkyl, a $C_{1-15}$ alkyl, a $C_{1-12}$ alkyl, a $C_{1-10}$ alkyl, a $C_{1-8}$ alkyl, or a $C_{1-6}$ alkyl group, respectively, as described above substituted with at least one halogen atom, preferably 1, 2 or 3 halogen atom(s). Specifically, examples of "$C_{1-20}$ haloalkyl group" include fluoromethyl group, difluoromethyl group, trifluoromethyl group, fluoroethyl group, difluorethyl group, trifluoroethyl group, chloromethyl group, bromomethyl group, iodomethyl group and the like.

An alkoxy group is preferably a "$C_{1-20}$ alkoxy group", more preferably a "$C_{1-15}$ alkoxy group", more preferably a "$C_{1-12}$ alkoxy group", more preferably a "$C_{1-10}$ alkoxy group", even more preferably a "$C_{1-8}$ alkoxy group", even more preferably a "$C_{1-6}$ alkoxy group" and is an oxy group that is bonded to the previously defined $C_{1-20}$ alkyl, $C_{1-15}$ alkyl, $C_{1-12}$ alkyl, $C_{1-10}$ alkyl, $C_{1-8}$ alkyl, or $C_{1-6}$ alkyl group respectively. Specifically, examples of "$C_{1-20}$ alkoxy group" include methoxy group, ethoxy group, n-propoxy group, iso-propoxy group, n-butoxy group, iso-butoxy group, sec-butoxy group, tert-butoxy group, n-pentyloxy group, iso-pentyloxy group, sec-pentyloxy group, n-hexyloxy group, iso-hexyloxy group, n-hexyloxy group, n-heptyloxy group, n-octyloxy group, n-nonyloxy group, n-decyloxy group, n-undecyloxy group, n-dodecyloxy group, n-tridecyloxy group, n-tetradecyloxy group, n-pentadecyloxy group, n-hexadecyloxy group, n-heptadecyloxy group, n-octadecyloxy group, n-nonadecyloxy group, n-eicosyloxy group, 1,1-dimethylpropoxy group, 1,2-dimethylpropoxy group, 2,2-dimethylpropoxy group, 2-methylbutoxy group, 1-ethyl-2-methylpropoxy group, 1,1,2-trimethylpropoxy group, 1,1-dimethylbutoxy group, 1,2-dimethylbutoxy group, 2,2-dimethylbutoxy group, 2,3-dimethylbutoxy group, 1,3-dimethylbutoxy group, 2-ethylbutoxy group, 2-methylpentyloxy group, 3-methylpentyloxy group and the like.

An aryloxy group is preferably a "$C_{5-20}$ aryloxy group", more preferably a "$C_{6-12}$ aryloxy group", even more preferably a "$C_{6-10}$ aryloxy group" and is an oxy group that is bonded to the previously defined $C_{5-20}$ aryl, $C_{6-12}$ aryl, or $C_{6-10}$ aryl group respectively.

An alkylthio group is preferably a "$C_{1-20}$ alkylthio group", more preferably a "$C_{1-15}$ alkylthio group", more preferably a "$C_{1-12}$ alkylthio group", more preferably a "$C_{1-10}$ alkylthio group", even more preferably a "$C_{1-8}$ alkylthio group", even more preferably a "$C_{1-6}$ alkylthio group" and is a thio (—S—) group that is bonded to the previously defined $C_{1-20}$ alkyl, $C_{1-15}$ alkyl, $C_{1-12}$ alkyl, $C_{1-10}$ alkyl, $C_{1-5}$ alkyl, or $C_{1-6}$ alkyl group respectively.

An arylthio group is preferably a "$C_{5-20}$ arylthio group", more preferably a "$C_{6-12}$ arylthio group", even more preferably a "$C_{6-10}$ arylthio group" and is a thio (—S—) group that is bonded to the previously defined $C_{5-20}$ aryl, $C_{6-12}$ aryl, or $C_{6-10}$ aryl group respectively.

An alkylaryl group is preferably a "$C_{6-12}$ aryl $C_{1-20}$ alkyl group", more preferably a preferably a "$C_{6-12}$ aryl $C_{1-16}$ alkyl group", even more preferably a "$C_{6-12}$ aryl $C_{1-6}$ alkyl group" and is an aryl group as defined above bonded at any position to an alkyl group as defined above. The point of attachment of the alkylaryl group to a molecule may be via the alkyl portion and thus, preferably, the alkylaryl group is —CH$_2$-Ph or —CH$_2$CH$_2$-Ph. An alkylaryl group can also be referred to as "aralkyl".

A silyl group is preferably a group —Si(R$_s$)$_3$, wherein each R$_s$ can be independently an aliphatic, heteroaliphatic, alicyclic, heteroalicyclic, aryl or heteroaryl group as defined above. In certain embodiments, each R$_s$ is independently an unsubstituted aliphatic, alicyclic or aryl. Preferably, each R$_s$ is an alkyl group selected from methyl, ethyl or propyl.

A silyl ether group is preferably a group OSi(R$_6$)$_3$ wherein each R$_6$ can be independently an aliphatic, heteroaliphatic, alicyclic, heteroalicyclic, aryl or heteroaryl group as defined above. In certain embodiments, each R$_6$ can be independently an unsubstituted aliphatic, alicyclic or aryl. Preferably, each R$_6$ is an optionally substituted phenyl or optionally substituted alkyl group selected from methyl, ethyl, propyl or butyl (such as n-butyl or tert-butyl (tBu)). Exemplary silyl ether groups include OSi(Me)$_3$, OSi(Et)$_3$, OSi(Ph)$_3$, OSi(Me)$_2$(tBu), OSi(tBu)$_3$ and OSi(Ph)$_2$(tBu).

A nitrile group (also referred to as a cyano group) is a group CN.

An imine group is a group —CRNR, preferably a group —CHNR$_7$ wherein R$_7$ is an aliphatic, heteroaliphatic, alicyclic, heteroalicyclic, aryl or heteroaryl group as defined above. In certain embodiments, $R_7$ is unsubstituted aliphatic, alicyclic or aryl. Preferably $R_7$ is an alkyl group selected from methyl, ethyl or propyl.

An acetylide group contains a triple bond —C≡C—$R_9$, preferably wherein $R_9$ can be hydrogen, an aliphatic, heteroaliphatic, alicyclic, heteroalicyclic, aryl or heteroaryl group as defined above. For the purposes of the invention when $R_9$ is alkyl, the triple bond can be present at any position along the alkyl chain. In certain embodiments, $R_9$ is unsubstituted aliphatic, alicyclic or aryl. Preferably $R_9$ is methyl, ethyl, propyl or phenyl.

An amino group is preferably —$NH_2$, —$NHR_{10}$ or —$N(R_{10})_2$ wherein $R_{10}$ can be an aliphatic, heteroaliphatic, alicyclic, heteroalicyclic, a silyl group, aryl or heteroaryl group as defined above. It will be appreciated that when the amino group is $N(R_{10})_2$, each $R_{10}$ group can be the same or different. In certain embodiments, each $R_{10}$ is independently an unsubstituted aliphatic, alicyclic, silyl or aryl. Preferably $R_{10}$ is methyl, ethyl, propyl, $SiMe_3$ or phenyl.

An amido group is preferably —$NR_{11}C(O)$— or —$C(O)$—$NR_{11}$— wherein $R_{11}$ can be hydrogen, an aliphatic, heteroaliphatic, alicyclic, heteroalicyclic, aryl or heteroaryl group as defined above. In certain embodiments, $R_{11}$ is unsubstituted aliphatic, alicyclic or aryl. Preferably $R_{11}$ is hydrogen, methyl, ethyl, propyl or phenyl. The amido group may be terminated by hydrogen, an aliphatic, heteroaliphatic, alicyclic, heteroalicyclic, aryl or heteroaryl group.

An ester group is preferably —$OC(O)R_{12}$— or —$C(O)OR_{12}$— wherein $R_{12}$ can be an aliphatic, heteroaliphatic, alicyclic, heteroalicyclic, aryl or heteroaryl group as defined above. In certain embodiments, $R_{12}$ is unsubstituted aliphatic, alicyclic or aryl. Preferably $R_{12}$ is methyl, ethyl, propyl or phenyl. The ester group may be terminated by an aliphatic, heteroaliphatic, alicyclic, heteroalicyclic, aryl or heteroaryl group. It will be appreciated that if $R_{12}$ is hydrogen, then the group defined by —$OC(O)R_{12}$— or —$C(O)OR_{12}$— will be a carboxylic acid group.

A sulfoxide is preferably —$S(O)R_{13}$ and a sulfonyl group is preferably —$S(O)_2R_{13}$ wherein $R_{13}$ can be an aliphatic, heteroaliphatic, alicyclic, heteroalicyclic, aryl or heteroaryl group as defined above. In certain embodiments, $R_{13}$ is unsubstituted aliphatic, alicyclic or aryl. Preferably $R_{13}$ is methyl, ethyl, propyl or phenyl.

A carboxylate group is preferably —$OC(O)R_{14}$, wherein $R_{14}$ can be hydrogen, an aliphatic, heteroaliphatic, alicyclic, heteroalicyclic, aryl or heteroaryl group as defined above. In certain embodiments, $R_{14}$ is unsubstituted aliphatic, alicyclic or aryl. Preferably $R_{14}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl or adamantyl.

An acetamide is preferably $MeC(O)N(R_{15})_2$ wherein $R_{15}$ can be hydrogen, an aliphatic, heteroaliphatic, alicyclic, heteroalicyclic, aryl or heteroaryl group as defined above. In certain embodiments, $R_{15}$ is unsubstituted aliphatic, alicyclic or aryl. Preferably $R_{15}$ is hydrogen, methyl, ethyl, propyl or phenyl.

A phosphinate group is preferably a group —$OP(O)(R_{16})_2$ or —$P(O)(OR_{16})(R_{16})$ wherein each $R_{16}$ is independently selected from hydrogen, or an aliphatic, heteroaliphatic, alicyclic, heteroalicyclic, aryl or heteroaryl group as defined above. In certain embodiments, $R_{16}$ is aliphatic, alicyclic or aryl, which are optionally substituted by aliphatic, alicyclic, aryl or $C_{1-6}$alkoxy. Preferably $R_{16}$ is optionally substituted aryl or $C_{1-20}$alkyl, more preferably phenyl optionally substituted by $C_{1-6}$alkoxy (preferably methoxy) or unsubstituted $C_{1-20}$alkyl (such as hexyl, octyl, decyl, dodecyl, tetradecyl, hexadecyl, stearyl). A phosphonate group is preferably a group —$P(O)(R_{16})_2$ wherein $R_{16}$ is as defined above. It will be appreciated that when either or both of $R_{16}$ is hydrogen for the group —$P(O)(R_{16})_2$, then the group defined by —$P(O)(R_{16})_2$ will be a phosphonic acid group.

A sulfinate group is preferably —$S(O)OR_{17}$ or —$OS(O)R_{17}$ wherein $R_{17}$ can be hydrogen, an aliphatic, heteroaliphatic, haloaliphatic, alicyclic, heteroalicyclic, aryl or heteroaryl group as defined above. In certain embodiments, $R_{17}$ is unsubstituted aliphatic, alicyclic or aryl. Preferably $R_{17}$ is hydrogen, methyl, ethyl, propyl or phenyl. It will be appreciated that if $R_{17}$ is hydrogen, then the group defined by —$S(O)OR_{17}$ will be a sulfonic acid group.

A carbonate group is preferably —$OC(O)OR_{18}$, wherein $R_{18}$ can be hydrogen, an aliphatic, heteroaliphatic, alicyclic, heteroalicyclic, aryl or heteroaryl group as defined above. In certain embodiments, $R_{18}$ is optionally substituted aliphatic, alicyclic or aryl. Preferably $R_{18}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl, cyclohexyl, benzyl or adamantyl. It will be appreciated that if $R_{17}$ is hydrogen, then the group defined by —$OC(O)OR_{18}$ will be a carbonic acid group.

In an -alkyl$C(O)OR_{19}$ or -alkyl$C(O)R_{19}$ group, $R_{19}$ can be hydrogen, an aliphatic, heteroaliphatic, alicyclic, heteroalicyclic, aryl or heteroaryl group as defined above. In certain embodiments, $R_{19}$ is unsubstituted aliphatic, alicyclic or aryl. Preferably $R_{19}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl or adamantyl.

It will be appreciated that where any of the above groups are present in a Lewis base G, one or more additional R groups may be present, as appropriate, to complete the valency. For example, in the context of an amino group, an additional R group may be present to give $RNHR_{10}$, wherein R is hydrogen, an optionally substituted aliphatic, heteroaliphatic, alicyclic, heteroalicyclic, aryl or heteroaryl group as defined above. Preferably, R is hydrogen or aliphatic, alicyclic or aryl.

Any of the aliphatic, heteroaliphatic, alicyclic, heteroalicyclic, aryl, heteroaryl, haloalkyl, alkoxy, aryloxy, alkylthio, arylthio, alkylaryl, silyl, silyl ether, ester, sulfoxide, sulfonyl, carboxylate, carbonate, imine, acetylide, amino, phosphinate, sulfonate or amido groups wherever mentioned in the definitions above, may optionally be substituted by halogen, hydroxy, nitro, carboxylate, carbonate, alkoxy, aryloxy, alkylthio, arylthio, heteroaryloxy, alkylaryl, amino, amido, imine, nitrile, silyl, silyl ether, ester, sulfoxide, sulfonyl, acetylide, phosphinate, sulfonate or optionally substituted aliphatic, heteroaliphatic, alicyclic, heteroalicyclic, aryl or heteroaryl groups (for example, optionally substituted by halogen, hydroxy, nitro, carbonate, alkoxy, aryloxy, alkylthio, arylthio, amino, imine, nitrile, silyl, sulfoxide, sulfonyl, phosphinate, sulfonate or acetylide).

It will be appreciated that although in formula (I), the groups X and G are illustrated as being associated with a single $M_1$ or $M_2$ metal centre, one or more X and G groups may form a bridge between the $M_1$ and $M_2$ metal centres.

For the purposes of the present invention, the epoxide substrate is not limited. The term epoxide therefore relates to any compound comprising an epoxide moiety. Examples of epoxides which may be used in the present invention include, but are not limited to, cyclohexene oxide, styrene oxide, ethylene oxide, propylene oxide, butylene oxide, substituted cyclohexene oxides (such as limonene oxide, $C_{10}H_{16}O$ or 2-(3,4-epoxycyclohexyl)ethyltrimethoxysilane, $C_{11}H_{22}O$), alkylene oxides (such as ethylene oxide and substituted ethylene oxides), unsubstituted or substituted oxiranes (such as oxirane, epichlorohydrin, 2-(2-methoxyethoxy)methyl oxirane (MEMO), 2-(2-(2-methoxyethoxy)ethoxy) methyl oxirane (ME2MO), 2-(2-(2-(2-methoxyethoxy)ethoxy)ethoxy)methyl oxirane (ME3MO), 1,2-epoxybutane, glycidyl ethers, vinyl-cyclohexene oxide, 3-phenyl-1,2-epoxypropane, 1,2- and 2,3-epoxybutane, isobutylene oxide, cyclopentene oxide, 2,3-epoxy-1,2,3,4-tetrahydronaphthalene, indene oxide, and functionalized 3,5-dioxaepoxides. Examples of functionalized 3,5-dioxaepoxides include:

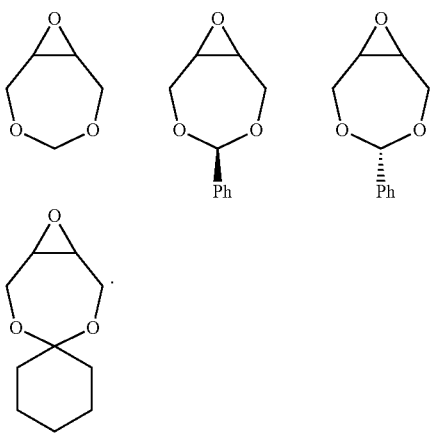

The epoxide moiety may be a glycidyl ether, glycidyl ester or glycidyl carbonate. Examples of glycidyl ethers, glycidyl esters glycidyl carbonates include:

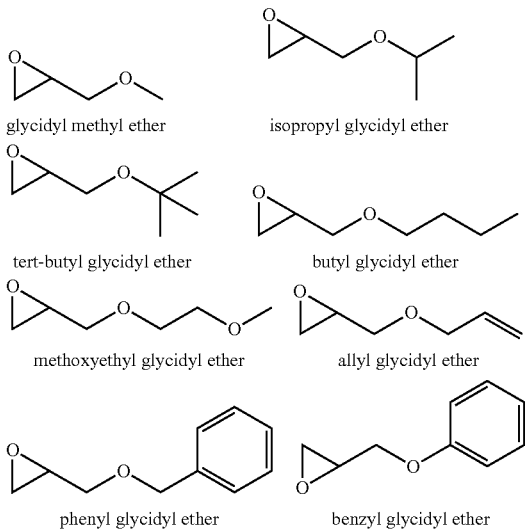

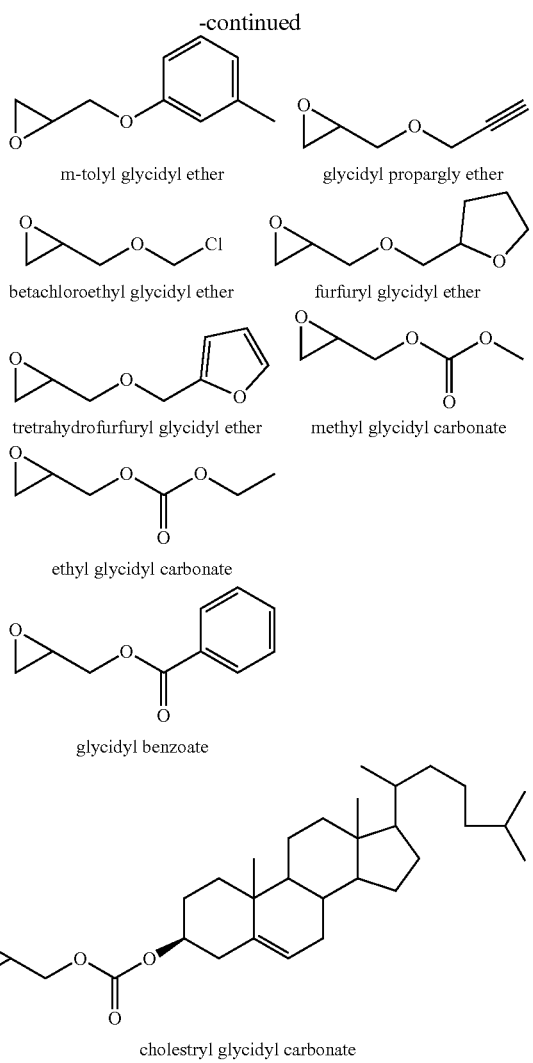

The epoxide substrate may contain more than one epoxide moiety, i.e. it may be a bis-epoxide, a tris-epoxide, or a multi-epoxide containing moiety. Examples of compounds including more than one epoxide moiety include bisphenol A diglycidyl ether and 3,4-epoxycyclohexylmethyl 3,4-epoxycyclohexanecarboxylate. It will be understood that reactions carried out in the presence of one or more compounds having more than one epoxide moiety may lead to cross-linking in the resulting polymer.

The skilled person will appreciate that the epoxide can be obtained from "green" or renewable resources. The epoxide may be obtained from a (poly)unsaturated compound, such as those deriving from a fatty acid and/or terpene, obtained using standard oxidation chemistries.

The epoxide moiety may contain —OH moieties, or protected —OH moieties. The —OH moieties may be protected by any suitable protecting group. Suitable protecting groups include methyl or other alkyl groups, benzyl, allyl, tert-butyl, tetrahydropyranyl (THP), methoxymethyl (MOM), acetyl (C(O)alkyl), benzolyl (C(O)Ph), dimethoxytrityl (DMT), methoxyethoxymethyl (MEM), p-methoxybenzyl (PMB), trityl, silyl (such as trimethylsilyl (TMS), t-Butyldimethylsilyl (TBDMS), t-Butyldiphenylsilyl (TBDPS), tri-iso-propylsilyloxymethyl (TOM), and triisopropylsilyl (TIPS)), (4-methoxyphenyl)diphenylmethyl (MMT), tetrahydrofuranyl (THF), and tetrahydropyranyl (THP).

The epoxide preferably has a purity of at least 98%, more preferably >99%.

It will be understood that the term "an epoxide" is intended to encompass one or more epoxides. In other words, the term "an epoxide" refers to a single epoxide, or a mixture of two or more different epoxides. For example, the epoxide substrate may be a mixture of ethylene oxide and propylene oxide, a mixture of cyclohexene oxide and propylene oxide, a mixture of ethylene oxide and cyclohexene oxide, or a mixture of ethylene oxide, propylene oxide and cyclohexene oxide.

DETAILED DESCRIPTION

The present invention provides a method for reacting an epoxide with carbon dioxide in the presence of a catalyst of formula (I), a double metal cyanide (DMC) catalyst, and a starter compound.

Catalysts of Formula (I)

The catalyst of formula (I) has the following structure:

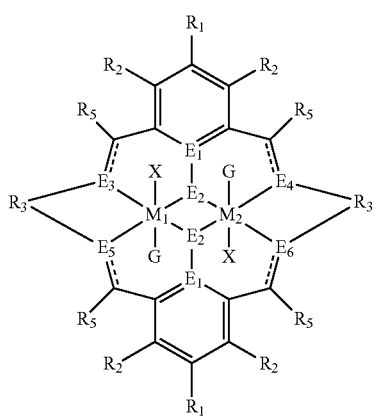

(I)

wherein:

M$_1$ and M$_2$ are independently selected from Zn(II), Cr(II), Co(II), Cu(II), Mn(II), Mg(II), Ni(II), Fe(II), Ti(II), V(II), Cr(III)-X, Co(III)-X, Mn(III)-X, Ni(III)-X, Fe(III)-X, Ca(II), Ge(II), Al(III)-X, Ti(III)-X, V(III)-X, Ge(IV)-(X)$_2$ or Ti(IV)-(X)$_2$;

R$_1$ and R$_2$ are independently selected from hydrogen, halide, a nitro group, a nitrile group, an imine, an amine, an ether group, a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

R$_3$ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic;

R$_5$ is independently selected from H, or optionally substituted aliphatic, heteroaliphatic, alicyclic, heteroalicyclic, aryl, heteroaryl, alkylheteroaryl or alkylaryl;

E$_1$ is C, E$_2$ is O, S or NH or E$_1$ is N and E$_2$ is O;

E$_3$, E$_4$, E$_5$ and E$_6$ are selected from N, NR$_4$, O and S, wherein when E$_3$, E$_4$, E$_5$ or E$_6$ are N, ------ is =, and wherein when E$_3$, E$_4$, E$_5$ or E$_6$ are NR$_4$, O or S, ------ is —; R$_4$ is independently selected from H, or optionally substituted aliphatic, heteroaliphatic, alicyclic, heteroalicyclic, aryl, heteroaryl, alkylheteroaryl, -alkylC(O)OR$_{19}$ or -alkylC≡N or alkylaryl;

X is independently selected from OC(O)R$^x$, OSO$_2$R$^x$, OSOR$^x$, OSO(R$^x$)$_2$, S(O)R$^x$, OR$^x$, phosphinate, halide, nitrate, hydroxyl, carbonate, amino, amido or optionally substituted aliphatic, heteroaliphatic, alicyclic, heteroalicyclic, aryl or heteroaryl;

R$_x$ is independently hydrogen, or optionally substituted aliphatic, haloaliphatic, heteroaliphatic, alicyclic, heteroalicyclic, aryl, alkylaryl or heteroaryl; and G is absent or independently selected from a neutral or anionic donor ligand which is a Lewis base.

Each of the occurrences of the groups R$_1$ and R$_2$ may be the same or different, and R$_1$ and R$_2$ can be the same or different.

Preferably R$_1$ and R$_2$ are independently selected from hydrogen, halide, amino, nitro, sulfoxide, sulfonyl, sulfinate, and an optionally substituted alkyl, alkenyl, aryl, heteroaryl, silyl, silyl ether, alkoxy, aryloxy or alkylthio. Preferably each occurrence of R$_2$ is the same. Preferably, each occurrence of R$_2$ is the same, and is hydrogen.

Both occurrences of R$_1$ may be the same, and may be selected from hydrogen, halide, amino, nitro, sulfoxide, sulfonyl, sulfinate, silyl, silyl ether and an optionally substituted alkyl, alkenyl, aryl, heteroaryl, alkoxy, aryloxy or alkylthio. For example, both occurrences of R$_1$ may be the same, and may be selected from hydrogen, halide, sulfoxide, and an optionally substituted alkyl, heteroaryl, silyl, alkylthio or alkoxy. Exemplary options for R$_1$ (which may both be the same) include hydrogen, methyl, t-butyl, methoxy, ethoxy, alkylthio, trialkylsilyl such as trimethylsilyl or triethylsilyl, bromide, methanesulfonyl, or piperidinyl, e.g. both occurrences of R$_1$ may be the same, and may be selected from methyl, t-butyl or trialkylsilyl.

Preferably, each occurrence of R$_2$ is hydrogen and each R$_1$ is independently selected from hydrogen, halide, amino, nitro, sulfoxide, sulfonyl, sulfinate, and optionally substituted alkyl, alkenyl, aryl, heteroaryl, silyl, silyl ether, alkoxy, aryloxy, alkylthio, arylthio, such as hydrogen, C$_{1-6}$ alkyl (e.g. haloalkyl), alkoxy, aryl, halide, nitro, sulfonyl, silyl and alkylthio, for example, $^t$Bu, iPr, Me, OMe, H, nitro, SO$_2$Me, SiEt$_3$, SiMe$_3$, SMe, halogen or phenyl.

It will be understood that each occurrence of R$^1$ may be the same, and each occurrence of R$_2$ may be the same, and R$_1$ may be different to R$_2$.

It will be appreciated that the group R$_3$ can be a disubstituted divalent alkyl, alkenyl, alkynyl, heteroalkyl, heteroalkenyl or heteroalkynyl group which may optionally be interrupted by an aryl, heteroaryl, alicyclic or heteroalicyclic group, or may be a disubstituted aryl or cycloalkyl group which acts as a bridging group between two nitrogen centres in the catalyst of formula (I). Thus, where R$_3$ is an alkylene group, such as dimethylpropylenyl, the R$_3$ group has the structure —CH$_2$—C(CH$_3$)$_2$—CH$_2$—. The definitions of the alkyl, aryl, cycloalkyl etc groups set out above therefore also relate respectively to the divalent alkylene, arylene, cycloalkylene etc groups set out for R3, and may be optionally substituted. Exemplary options for R3 include ethylenyl, 2,2-fluoropropylenyl, 2,2-dimethylpropylenyl, propylenyl, butylenyl, phenylenyl, cyclohexylenyl or biphenylenyl. When R3 is cyclohexylenyl, it can be the racemic, RR- or SS-forms.

$R_3$ can be independently selected from substituted or unsubstituted alkylene and substituted or unsubstituted arylene, preferably substituted or unsubstituted propylenyl, such as propylenyl and 2,2-dimethylpropylenyl, and substituted or unsubstituted phenylenyl or biphenylenyl. Preferably both occurrences of $R_3$ are the same. Even more preferably $R_3$ is a substituted propylenyl, such as 2,2-di(alkyl)propylenyl, especially 2,2-di(methyl)propylenyl.

$R_3$ can be independently selected from substituted or unsubstituted alkylene, alkenylene, alkynylene, heteroalkylene, heteroalkenylene or heteroalkynylene, arylene or cycloalkylene. Preferably, $R_3$ is selected from substituted or unsubstituted alkylene, cycloalkylene, alkenylene, heteroalkylene and arylene. More preferably, $R_3$ is selected from 2,2-dimethylpropylenyl, —$CH_2CH_2CH_2$—, —$CH_2CH(CH_3)CH_2$—, —$CH_2C(CH_2C_6H_5)_2CH_2$—, phenylene, —$CH_2CH_2$—, —$CH_2CH_2CH_2CH_2$—, —$CH_2CH_2N(CH_3)CH_2CH_2$—, 1,4-cyclohexandiyl or —$CH_2CH_2CH(C_2H_5)$—. Still more preferably $R_3$ is selected from 2,2-dimethylpropylenyl, —$CH_2CH_2CH_2$-, —$CH_2CH(CH_3)CH_2$—, —$CH_2C(CH_2C_6H_5)_2CH_2$—, —$CH_2CH_2CH(C_2H_5)$—, —$CH_2CH_2CH_2CH_2$—. More preferably still, $R_3$ is selected from 2,2-dimethylpropylenyl, —$CH_2C(CH_2C_6H_5)_2CH_2$—, $CH_2CH(CH_3)CH_2$ and —$CH_2C(C_2H_5)_2 CH_2$—.

Most preferably $R_3$ is a substituted propylenyl, such as 2,2-di(alkyl)propylenyl, more preferably 2,2-dimethylpropylenyl.

As set out above, $E_3$, $E_4$, $E_5$ and $E_6$ are each independently selected from N, $NR_4$, O and S. The skilled person will understand that if any of $E_3$, $E_4$, $E_5$ or $E_6$ are N, ===== is =, and if any of $E_3$, $E_4$, $E_5$ or $E_6$ are $NR_4$, O or S, ===== is —. Preferably, $E_3$, $E_4$, $E_5$ and $E_6$ are each independently selected from $NR_4$, O and S.

Preferably each $R_4$ is independently selected from hydrogen, and an optionally substituted alkyl, alkenyl, alkynyl, aryl, heteroalkyl, heteroalkenyl, heteroalkynyl, heteroaryl, -alkylC(O)OR$_{19}$ or -alkylC≡N. Each $R_4$ may be the same or different. Preferably, $R_4$ is selected from hydrogen, and an optionally substituted alkyl, alkenyl, alkynyl, aryl, heteroalkyl, heteroalkenyl, heteroalkynyl or heteroaryl. Exemplary options for $R_4$ include H, Me, Et, Bn, iPr, tBu or Ph, and —$CH_2$-(pyridine). Preferably each $R_4$ is hydrogen or alkyl.

Preferably each $R_5$ is independently selected from hydrogen, and optionally substituted aliphatic or aryl. More preferably, each $R_5$ is independently selected from hydrogen, and optionally substituted alkyl or aryl. Even more preferably, each $R_5$ is the same, and is selected from hydrogen, and optionally substituted alkyl or aryl. Exemplary $R_5$ groups include hydrogen, methyl, ethyl, phenyl and trifluoromethyl, preferably hydrogen, methyl or trifluoromethyl. Even more preferably, each $R_5$ is hydrogen.

Preferably both occurrences of $E_1$ are C and both occurrences of $E_2$ are the same, and selected from O, S or NH. Even more preferably, both occurrences of $E_1$ are C and both occurrences of $E_2$ are O.

The skilled person will appreciate that the macrocyclic ligand of the catalyst of formula (I) may be symmetric, or may be asymmetric.

When the macrocyclic ligand is symmetric, it will be appreciated that each occurrence of $E_3$, $E_4$, $E_5$ and $E_6$ will be the same. For example, each occurrence of $E_3$, $E_4$, $E_5$ and $E_6$ may be $NR_4$ (and each $R_4$ may be the same). It will be understood that $E_3$, $E_4$, $E_5$ and $E_6$ may be the same and may be NH. In other words, the catalyst of formula (I) may have the following structure:

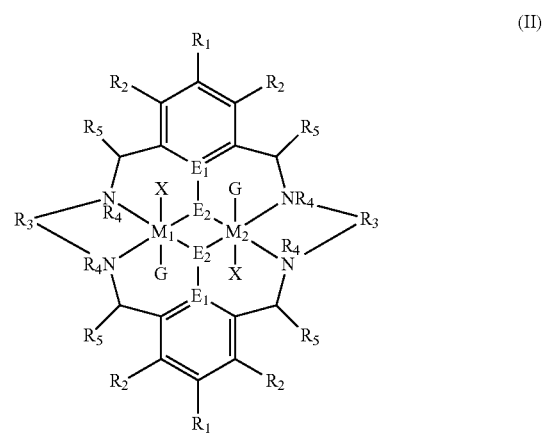

(II)

When the macrocyclic ligand is symmetric, it will be appreciated that each occurrence of $R_1$ may be the same, each occurrence of $R_2$ may be the same, each occurrence of $R_3$ may be the same, each occurrence of $R_5$ may be the same, each occurrence of $E_1$ may be the same, and each occurrence of $E_2$ may be the same (although $R_1$, $R_2$, $R_3$ and $R_5$ are not necessarily the same as each other), and $E_3$, $E_4$, $E_5$ and $E_6$ are the same.

For example, each occurrence of $R_2$, and $R_5$ may be hydrogen, each occurrence of $E_3$, $E_4$, $E_5$ and $E_6$ are $NR_4$, and each $R_4$ is hydrogen or alkyl, each occurrence of $R_3$ may be substituted or unsubstituted alkylene, cycloalkylene, alkenylene, heteroalkylene and arylene, each occurrence of $R^1$ may be selected from hydrogen, halogen, sulfoxide or substituted or unsubstituted alkyl, heteroaryl, silyl, alkylthio or alkoxy, both occurrences of $E_1$ may be C and both occurrences of $E_2$ may be O.

When the ligand of the catalyst of formula (I) is asymmetric, it will be appreciated that at least one of the occurrences of the groups $R_1$, $R_2$, $R_3$, $R_4$, $R_5$, $E_1$ or $E_2$ may be different from the remaining occurrences of the same group, or at least one occurrence of $E_3$, $E_4$, $E_5$ and $E_6$ is different to a remaining occurrence of $E_3$, $E_4$, $E_5$ and $E_6$. For example each occurrence of $R_3$ may be different, or each occurrence of $R_1$ may be different.

It will also be appreciated that $E_3$ and $E_5$ may be the same, and $E_4$ and $E_6$ may be the same, but $E_3$ and $E_5$ are different to $E_4$ and $E_6$. It will also be appreciated that $E_3$ and $E_4$ may be the same, and $E_5$ and $E_6$ may be the same, but $E_3$ and $E_4$ are different to $E_5$ and $E_6$. Alternatively one occurrence of $E_3$, $E_4$, $E_5$ and $E_6$ is different to the remaining occurrences of $E_3$, $E_4$, $E_5$ and $E_6$ (and the remaining three occurrences are the same).

For example, $E_3$, $E_4$ and $E_5$ may be —$NR_4$ where $R_4$ is H, and $E_6$ may be $NR_4$ where $R_4$ is alkyl. Furthermore, $E_3$ and $E_5$ may be $NR_4$ where $R_4$ is H, and $E_4$ and $E_6$ may be $NR_4$ where $R_4$ is alkyl, or $E_3$ and $E_4$ may be $NR_4$ where $R_4$ is H, and $E_5$ and $E_6$ may be $NR_4$ where $R_4$ is alkyl. Thus, it will be appreciated that each $E_3$, $E_4$, $E_5$ and $E_6$ is preferably $NR_4$, where at least one occurrence of $R_4$ is different to the remaining occurrences of $R_4$.

For the catalysts of formula (I), (symmetric and asymmetric), each X is independently selected from OC(O)R$^x$, OSO$_2$R$^x$, OS(O)R$^x$, OSO(R$^x$)$_2$, S(O)R$^x$, OR$^x$, phosphinate, halide, nitro, hydroxyl, carbonate, amino, nitrate, amido and optionally substituted, aliphatic, heteroaliphatic (for example silyl), alicyclic, heteroalicyclic, aryl or heteroaryl. Preferably each X is independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl, (for example silyl), aryl or heteroaryl. Even more preferably, each X is independently $OC(O)R^x$, $OR^x$, halide, carbonate, amino, nitro, alkyl, aryl, heteroaryl, phosphinate or $OSO_2R^x$. Preferred optional substituents for when X is aliphatic, heteroaliphatic, alicyclic, heteroalicyclic, aryl or heteroaryl include halogen, hydroxyl, nitro, cyano, amino, or substituted or unsubstituted aliphatic, heteroaliphatic, alicyclic, heteroalicyclic, aryl or heteroaryl. Each X may be the same or different and preferably each X is the same. It will also be appreciated that X may form a bridge between the two metal centres.

$R^x$ is independently hydrogen, or optionally substituted aliphatic, haloaliphatic, heteroaliphatic, alicyclic, heteroalicyclic, aryl, alkylaryl, or heteroaryl. Preferably, $R^x$ is alkyl, alkenyl, alkynyl, heteroalkyl, aryl, heteroaryl, cycloalkyl, or alkylaryl. Preferred optional substituents for $R^x$ include halogen, hydroxyl, cyano, nitro, amino, alkoxy, alkylthio, or substituted or unsubstituted aliphatic, heteroaliphatic, alicyclic, heteroalicyclic, aryl or heteroaryl (e.g. optionally substituted alkyl, aryl, or heteroaryl).

Exemplary options for X include OAc, $OC(O)CF_3$, halogen, $OSO(CH_3)_2$, Et, Me, OMe, OiPr, OtBu, Cl, Br, I, F, $N(iPr)_2$ or $N(SiMe_3)_2$, OPh, OBn, salicylate, dioctyl phosphinate, etc.

Preferably each X is the same, and is selected from $OC(O)R^x$, $OR^x$, halide, carbonate, amino, nitro, alkyl, aryl, heteroaryl, phosphinate or $OSO_2R^x$, $R^x$ is alkyl, alkenyl, alkynyl, heteroalkyl, aryl, heteroaryl or alkylaryl. More preferably each X is the same and is $OC(O)R^x$, $OR^x$, halide, alkyl, aryl, heteroaryl, phosphinate or $OSO_2R^x$. Still more preferably each X is the same and is $OC(O)R^x$. More preferably still each X is the same and is selected from OAc, $O_2CCF_3$, or $O_2C(CH_2)_3Cy$. Most preferably each X is the same and is OAc.

Preferably each $R^x$ is the same and is selected from an optionally substituted alkyl, alkenyl, alkynyl, heteroalkyl, aryl, heteroaryl, cycloalkyl or alkylaryl. More preferably each $R^x$ is the same and is an optionally substituted alkyl, alkenyl, heteroalkyl, aryl, heteroaryl, cycloalkyl or alkylaryl. Still more preferably each $R^x$ is the same and is an optionally substituted alkyl, alkenyl, heteroalkyl; or cycloalkyl. More preferably still $R^x$ is an optionally substituted alkyl, heteroalkyl or cycloalkyl. Most preferably $R^x$ is an optionally substituted alkyl.

It will be appreciated that preferred definitions for X and preferred definitions for $R^x$ may be combined. For example, each X may be independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl, (for example silyl), aryl or heteroaryl, e.g. each may be independently $OC(O)R^x$, $OR^x$, halide, carbonate, amino, nitro, alkyl, aryl, heteroaryl, phosphinate or $OSO_2R^x$, and $R^x$ may be optionally substituted alkyl, alkenyl, alkynyl, heteroalkyl, aryl, heteroaryl, cycloalkyl, or alkylaryl.

As detailed above, $M_1$ and $M_2$ are independently selected from any of: Zn(II), Cr(III)-X, Cr(II), Co(III)-X, Co(II), Cu(II), Mn(III)-X, Mn(II), Mg(II), Ni(II), Ni(III)-X, Fe(II), Fe(III)-X, Ca(II), Ge(II), Ti(II), Al(III)-X, Ti(III)-X, V(II), V(III)-X, Ge(IV)-$(X)_2$ or Ti(IV)-$(X)_2$.

Preferably, at least one of $M_1$ and $M_2$ is selected from Zn(II), Cr(III)-X, Co(II), Mn(II), Mg(II), Ni(II), Fe(II), and Fe(III)-X, more preferably at least one of $M_1$ and $M_2$ is selected from Mg(II), Zn(II), and Ni(II), for example, at least one of $M_1$ and $M_2$ is Ni(II).

It will be appreciated that $M_1$ and $M_2$ may be the same or different. For example, $M_1$ and/or $M_2$ may be selected from Zn(II), Cr(III)-X, Co(II), Mn(II), Mg(II), Ni(II), Fe(II), and Fe(III)-X, more preferably $M_1$ and/or $M_2$ is selected from Mg(II), Zn(II) and Ni(II), for example, $M_1$ and/or $M_2$ is Ni(II).

Exemplary combinations of $M_1$ and $M_2$ include Mg(II) and Mg(II), Zn(II) and Zn(II), Ni(II) and Ni(II), Mg(II) and Zn(II), Mg(II) and Ni(II), Zn(II) and Co(II), Co(II) and Co(III), Fe(III) and Fe(III), Zn(II) and Fe(II), or Zn(II) and Ni(II).

It will be appreciated that when one of $M_1$ or $M_2$ is Cr(III), Co(III), Mn(III), Ni(III), Fe(III), Al(III), Ti(III) or V(III) the catalyst of formula (I) will contain an additional X group co-ordinated to the metal centre, wherein X is as defined above. It will also be appreciated that when one of $M_1$ or $M_2$ is Ge(IV) or Ti(IV), the catalyst of formula (III) will contain two additional X group co-ordinated to the metal centre, wherein X is as defined above. In certain embodiments, when one of $M_1$ or $M_2$ is Ge(IV)-$(X)_2$ or Ti(IV)-$(X)_2$, both G may be absent.

When G is not absent, it is a group which is capable of donating a lone pair of electrons (i.e. a Lewis base). In certain embodiments, G is a nitrogen-containing Lewis base. Each G may be neutral or negatively charged. If G is negatively charged, then one or more positive counterions will be required to balance out the charge of the complex. Suitable positive counterions include group 1 metal ions ($Na^+$, $K^+$, etc), group 2 metal ions ($Mg^{2+}$, $Ca^{2+}$, etc), imidazolium ions, a positively charged optionally substituted heteroaryl, heteroaliphatic or heteroalicyclic group, ammonium ions (i.e. $N(R^{12})_4^+$), iminium ions (i.e. $(R^{12})_2C=N(R^{12})_2^+$, such as bis(triphenylphosphine)iminium ions) or phosphonium ions ($P(R^{12})_4^+$), wherein each $R^{12}$ is independently selected from hydrogen or optionally substituted aliphatic, heteroaliphatic, alicyclic, heteroalicyclic, aryl or heteroaryl. Exemplary counterions include $[H-B]^+$ wherein B is selected from triethylamine, 1,8-diazabicyclo[5.4.0] undec-7-ene and 7-methyl-1,5,7-triazabicyclo[4.4.0]dec-5-ene.

G is preferably independently selected from an optionally substituted heteroaliphatic group, an optionally substituted heteroalicyclic group, an optionally substituted heteroaryl group, a halide, hydroxide, hydride, a carboxylate and water. More preferably, G is independently selected from water, an alcohol (e.g. methanol), a substituted or unsubstituted heteroaryl (imidazole, methyl imidazole (for example, N-methyl imidazole), pyridine, 4-dimethylaminopyridine, pyrrole, pyrazole, etc), an ether (dimethyl ether, diethylether, cyclic ethers, etc), a thioether, carbene, a phosphine, a phosphine oxide, a substituted or unsubstituted heteroalicyclic (morpholine, piperidine, tetrahydrofuran, tetrahydrothiophene, etc), an amine, an alkyl amine trimethylamine, triethylamine, etc), acetonitrile, an ester (ethyl acetate, etc), an acetamide (dimethylacetamide, etc), a sulfoxide (dimethylsulfoxide, etc), a carboxylate, a hydroxide, hydride, a halide, a nitrate, a sulfonate, etc. In some embodiments, one or both instances of G is independently selected from optionally substituted heteroaryl, optionally substituted heteroaliphatic, optionally substituted heteroalicyclic, halide, hydroxide, hydride, an ether, a thioether, carbene, a phosphine, a phosphine oxide, an amine, an alkyl amine, acetonitrile, an ester, an acetamide, a sulfoxide, a carboxylate, a nitrate or a sulfonate. In certain embodiments, G may be a halide; hydroxide; hydride; water; a heteroaryl, heteroalicyclic or carboxylate group which are optionally substituted by alkyl, alkenyl, alkynyl, alkoxy, halogen, hydroxyl, nitro or nitrile. In preferred embodiments, G is independently selected from halide; water; a heteroaryl optionally substituted by alkyl (e.g. methyl, ethyl etc), alkenyl, alkynyl, alkoxy (preferably methoxy), halogen, hydroxyl, nitro or nitrile. In some embodiments, one or both instances of G is negatively charged (for example, halide). In further embodiments, one or both instances of G is an optionally substituted heteroaryl. Exemplary G groups include chloride, bromide, pyridine, methylimidazole (for example N-methyl imidazole) and dimethylaminopyridine (for example, 4-methylaminopyridine).

It will be appreciated that when a G group is present, the G group may be associated with a single M metal centre as shown in formula (I), or the G group may be associated with both metal centres and form a bridge between the two metal centres, as shown below in formula (IIa):

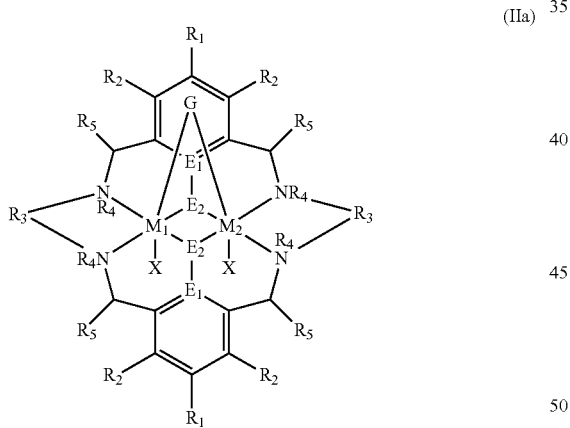

(IIa)

Wherein $R_1$, $R_2$, $R_3$, $R_4$, $R_5$, $M_1$, $M_2$, G, X, $E_1$ and $E_2$, are as defined for formula (I) and formula (II).

The skilled person will understand that, in the solid state, the catalysts of the first aspect may be associated with solvent molecules such as water, or alcohol (e.g. methanol or ethanol). It will be appreciated that the solvent molecules may be present in a ratio of less than 1:1 relative to the molecules of catalyst of the first aspect (i.e. 0.2:1, 0.25:1, 0.5:1), in a ratio of 1:1, relative to the molecules of catalyst of the first aspect, or in a ratio of greater than 1:1, relative to the molecules of catalyst of the first aspect.

The skilled person will understand that, in the solid state, the catalysts of the first aspect may form aggregates. For example, the catalyst of the first aspect may be a dimer, a trimer, a tetramer, a pentamer, or higher aggregate.

Exemplary catalysts of formula (I) are as follows:

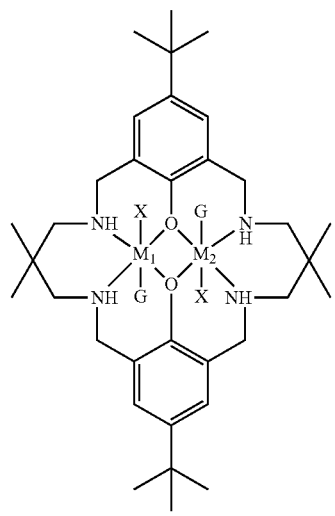

$[L^1M_1M_2(X)_2(G)_2]$

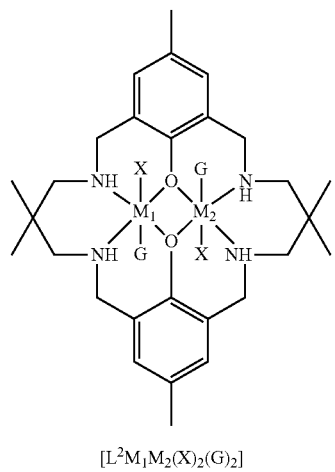

$[L^2M_1M_2(X)_2(G)_2]$

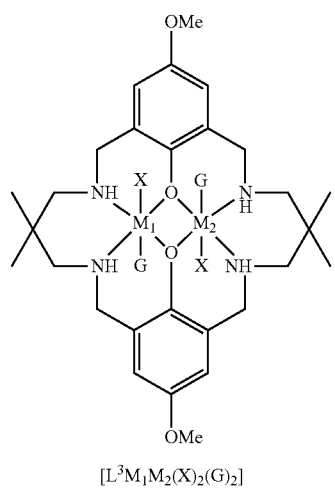

$[L^3M_1M_2(X)_2(G)_2]$

-continued
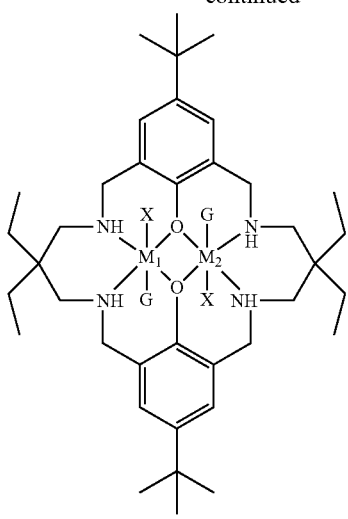
[L⁴M₁M₂(X)₂(G)₂]
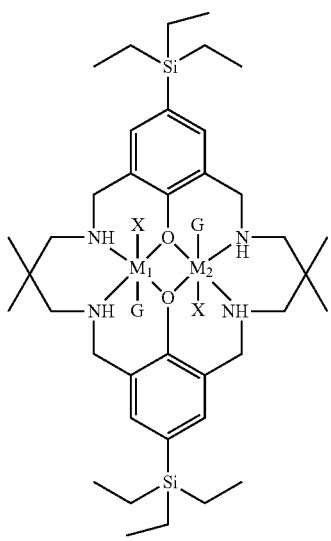
[L⁵M₁M₂(X)₂(G)₂]
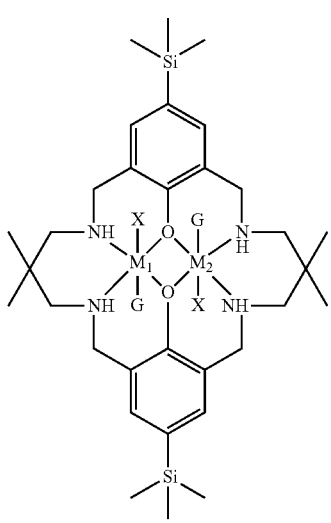
[L⁶M₁M₂(X)₂(G)₂]
-continued
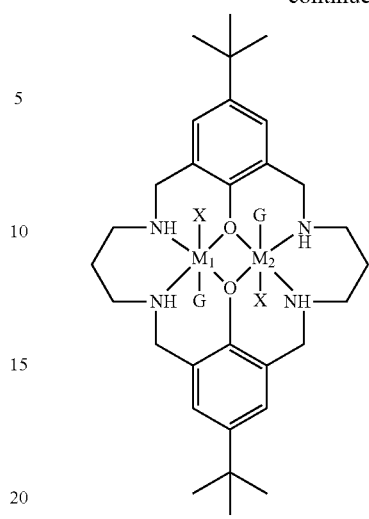
[L⁷M₁M₂(X)₂(G)₂]
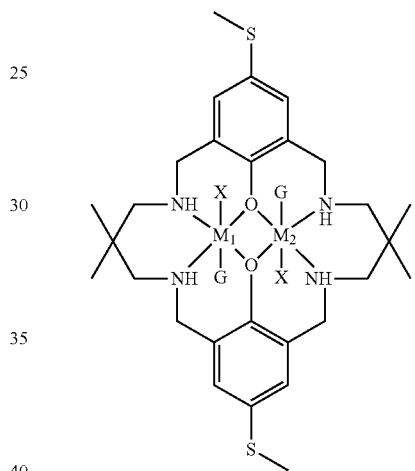
[L⁸M₁M₂(X)₂(G)₂]
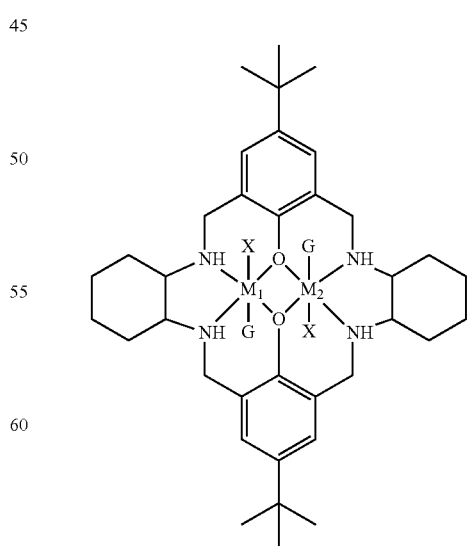
[L⁹M₁M₂(X)₂(G)₂]

-continued
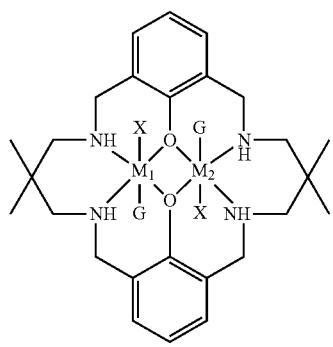
[L¹⁰M₁M₂(X)₂(G)₂]
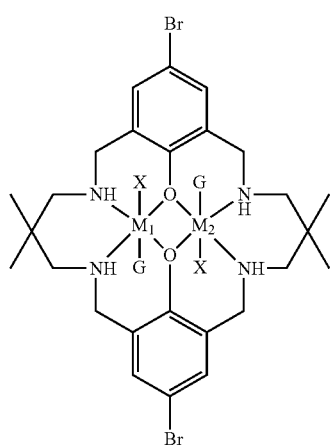
[L¹¹M₁M₂(X)₂(G)₂]
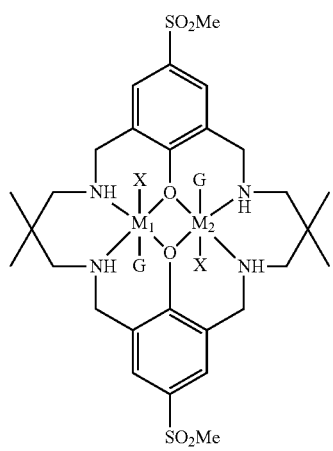
[L¹²M₁M₂(X)₂(G)₂]
-continued
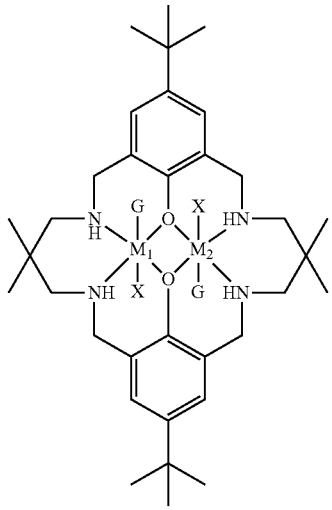
[L¹³M₁M₂(X)₂(G)₂]
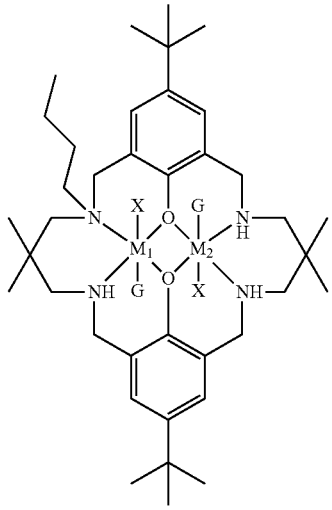
[L¹⁴M₁M₂(X)₂(G)₂]
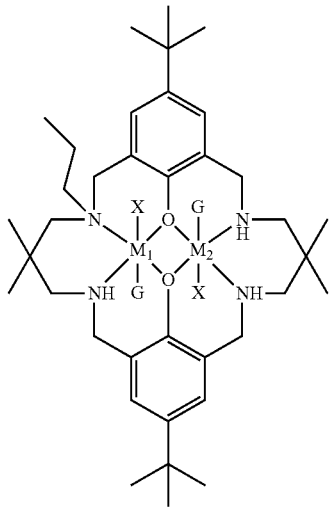
[L¹⁵M₁M₂(X)₂(G)₂]

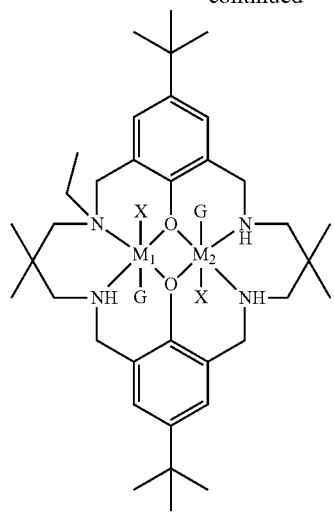
[L¹⁶M₁M₂(X)₂(G)₂]
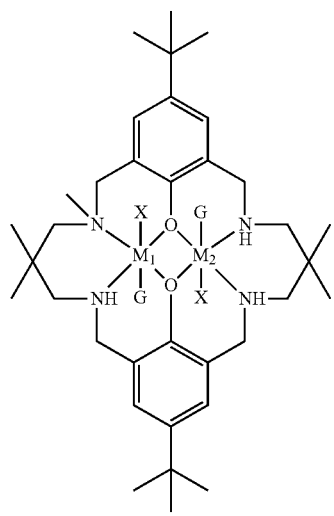
[L¹⁷M₁M₂(X)₂(G)₂]
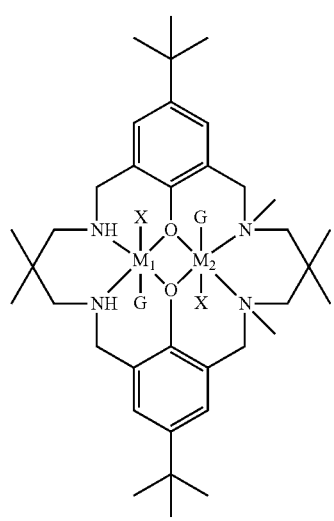
[L¹⁸M₁M₂(X)₂(G)₂]
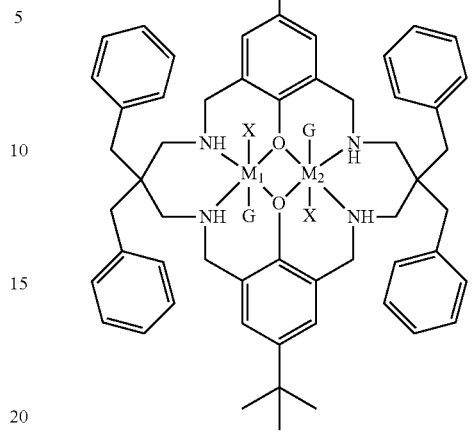
[L¹⁹M₁M₂(X)₂(G)₂]
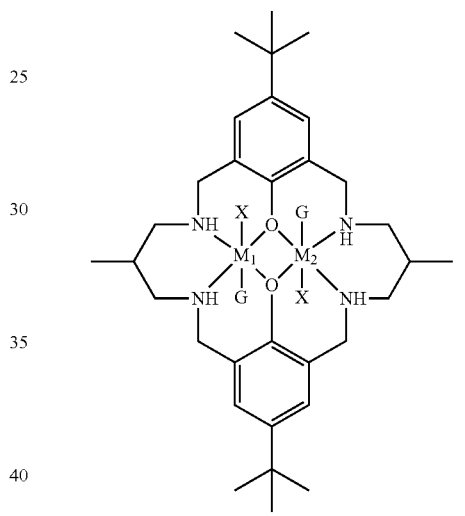
[L²⁰M₁M₂(X)₂(G)₂]
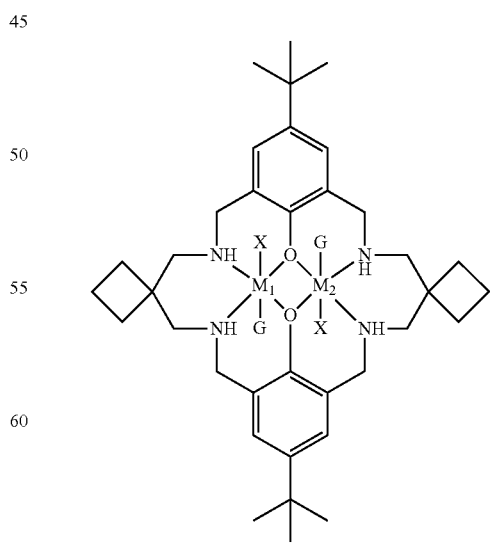
[L²¹M₁M₂(X)₂(G)₂]

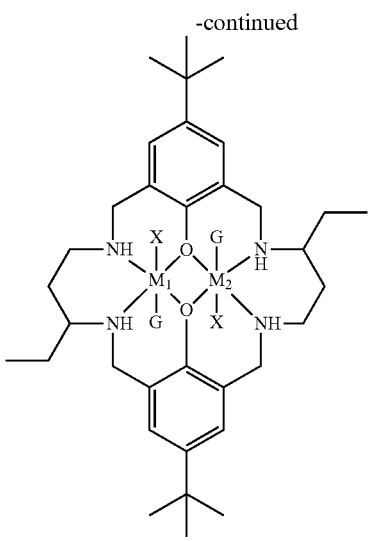

[L²²M₁M₂(X)₂(G)₂]

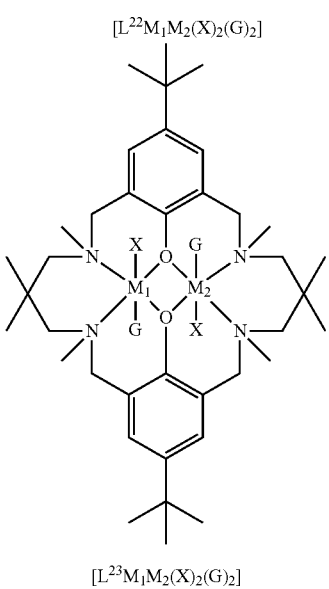

[L²³M₁M₂(X)₂(G)₂]

Where $M_1$, $M_2$, G and X are as defined above for formula (I), and it will be appreciated that one or both G groups may be absent.

For example, at least one of $M_1$ and $M_2$ may be selected from Zn(II), Cr(III)-X, Co(II), Mn(II), Mg(II), Ni(II), Fe(II), and Fe(III)-X, e.g. at least one of $M_1$ and $M_2$ may be selected from Mg(II), Zn(II) and Ni(II), for example, at least one of $M_1$ and $M_2$ may be Ni(II).

As set out above, $M_1$ and $M_2$ may be the same or different. For example, $M_1$ and/or $M_2$ may be selected from Zn(II), Cr(III)-X, Co(II), Mn(II), Mg(II), Ni(II), Fe(II), and Fe(III)-X, preferably $M_1$ and/or $M_2$ is selected from Mg(II), Zn(II) and Ni(II), for example, $M_1$ and/or $M_2$ is Ni(II). Exemplary combinations of $M_1$ and $M_2$ include Mg(II)/Mg(II), Zn(II)/Zn(II), Ni(II)/Ni(II), Mg(II)/Zn(II), Mg(II)/Ni(II), Zn(II)/Ni(II).

For example, each X may be independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl (for example silyl), aryl or heteroaryl, e.g. each may be independently $OC(O)R^x$, $OR^x$, halide, carbonate, amino, nitro, alkyl, aryl, heteroaryl, phos- phinate or $OSO_2R^x$. For example, $R^x$ may be alkyl, alkenyl, alkynyl, heteroalkyl, aryl, heteroaryl, cycloalkyl, or alkylaryl.

For example, if either G are present, G may be independently selected from halide; water; a heteroaryl optionally substituted by alkyl (e.g. methyl, ethyl etc), alkenyl, alkynyl, alkoxy (preferably methoxy), halogen, hydroxyl, nitro or nitrile, e.g. one or both instances of G (if present) can be chloride, bromide, pyridine, methylimidazole (for example N-methyl imidazole) and dimethylaminopyridine (for example, 4-methylaminopyridine).

The skilled person will appreciate that the above definitions may be combined. For example, for the catalysts above, $M_1$ and $M_2$ may be the same or different, and may be selected from Zn(II), Cr(III)-X, Co(II), Mn(II), Mg(II), Ni(II), Fe(II), and Fe(III)-X; each X may be independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl (for example silyl), aryl or heteroaryl, e.g. each may be independently $OC(O)R^x$, $OR^x$, halide, carbonate, amino, nitro, alkyl, aryl, heteroaryl, phosphinate or $OSO_2R^x$; $R^x$ may be alkyl, alkenyl, alkynyl, heteroalkyl, aryl, heteroaryl, cycloalkyl, or alkylaryl; G may be absent or if present, may be independently selected from halide; water; a heteroaryl optionally substituted by alkyl (e.g. methyl, ethyl etc), alkenyl, alkynyl, alkoxy (preferably methoxy), halogen, hydroxyl, nitro or nitrile.

Thus, the skilled person will understand that the above exemplary catalysts of formula (I) encompass, but are not restricted to, the following catalysts:

$[L^1Ni_2(OAc)_2]$, $[L^1Mg_2(OAc)_2]$, $[L^1Zn_2(OAc)_2]$, $[L^1MgZn(OAc)_2]$, $[L^1MgNi(OAc)_2]$, $[L^1Ni_2(CO_2CF_3)_2]$, $[L^1Mg_2CO_2CF_3)_2]$, $[L^1Zn_2(CO_2CF_3)_2]$, $[L^1MgZn(CO_2CF_3)_2]$, $[L^1MgNi(CO_2CF_3)_2]$, $[L^1Ni_2(CO_2{}^tBu)_2]$, $[L^1Mg_2(CO_2{}^tBu)_2]$, $[L^1Zn_2(CO_2{}^tBu)_2]$, $[L^1MgZn(CO_2{}^tBu)_2]$, $[L^1MgNi(CO_2{}^tBu)_2]$, $[L^1Ni_2(OPh)_2]$, $[L^1Mg_2(OPh)_2]$, $[L^1Zn_2(OPh)_2]$, $[L^1MgZn(OPh)_2]$, $[L^1MgNi(OPh)_2]$, $[L^1Ni_2(Ph)_2]$, $[L^1Mg_2(Ph)_2]$, $[L^1Zn_2(Ph)_2]$, $[L^1MgZn(Ph)_2]$, $[L^1MgNi(Ph)_2]$, $[L^1Ni_2(O^iPr)_2]$, $[L^1Mg_2(O^iPr)_2]$, $[L^1Zn_2(O^iPr)_2]$, $[L^1MgZn(O^iPr)_2]$, $[L^1MgNi(O^iPr)_2]$, $[L^1Ni_2(C_6F_5)_2]$, $[L^1Mg_2(C_6F_5)_2]$, $[L^1Zn_2(C_6F_5)_2]$, $[L^1MgZn(C_6F_5)_2]$, $[L^1MgNi(C_6F_5)_2]$, $[L^1Ni_2Cl_2]$, $[L^1Mg_2Cl_2]$, $[L^1Zn_2Cl_2]$, $[L^1MgZnCl_2]$, $[L^1MgNiCl_2]$, $[L^1Ni_2Br_2]$, $[L^1Mg_2Br_2]$, $[L^1Zn_2Br_2]$, $[L^1MgZnBr_2]$, $[L^1MgNiBr_2]$, $[L^1Ni_2I_2]$, $[L^1Mg_2I_2]$, $[L^1Zn_2I_2]$, $[L^1MgZnI_2]$, $[L^1MgNiI_2]$, $[L^1Ni_2(OC(O)(CH_2)_4CH_3)_2]$, $[L^1Mg_2(OC(O)(CH_2)_4CH_3)_2]$, $[L^1Zn_2(OC(O)(CH_2)_4CH_3)_2]$, $[L^1MgZn(OC(O)(CH_2)_4CH_3)_2]$, $[L^1MgNi(OC(O)(CH_2)_4CH_3)_2]$, $[L^1Ni_2(OC(O)(CH_2)_6CH_3)_2]$, $[L^1Mg_2(OC(O)(CH_2)_6CH_3)_2]$, $[L^1Zn_2(OC(O)(CH_2)_6CH_3)_2]$, $[L^1MgZn(OC(O)(CH_2)_6CH_3)_2]$, $[L^1MgNi(OC(O)(CH_2)_6CH_3)_2]$, $[L^1Ni_2(OC(O)(CH_2)_{10}CH_3)^2]$, $[L^1Mg_2(OC(O)(CH_2)_{10}CH_3)_2]$, $[L^1Zn_2(OC(O)(CH_2)_{10}CH_3)_2]$, $[L^1MgZn(OC(O)(CH_2)_{10}CH_3)_2]$, $[L^1MgNi(OC(O)(CH_2)_{10}CH_3)_2]$, $[L^1Ni_2(OC(O)C_6F_5)_2]$, $[L^1Mg_2(OC(O)C_6F_5)_2]$, $[L^1Zn_2(OC(O)C_6F_5)_2]$, $[L^1MgZn(OC(O)C_6F_5)_2]$, $[L^1MgNi(OC(O)C_6F_5)_2]$,

[L$^1$Ni$_2$Cl$_2$(methylimidazole)], [L$^1$Mg$_2$Cl$_2$(methylimidazole)], [L$^1$Zn$_2$Cl$_2$(methylimidazole)],

[L$^1$MgZnCl$_2$(methylimidazole)], [L$^1$MgNiCl$_2$(methylimidazole)],

[L$^1$Ni$_2$Cl$_2$(pyridine)], [L$^1$Mg$_2$Cl$_2$(pyridine)], [L$^1$Zn$_2$Cl$_2$(pyridine)], [L$^1$MgZnCl$_2$(Pyridine)],

[L$^1$MgNiCl$_2$(Pyridine)],

[L$^1$Ni$_2$Cl$_2$(dimethylaminopyridine)], [L$^1$Mg$_2$Cl$_2$(dimethylaminopyridine)],

[L$^1$Zn$_2$Cl$_2$(dimethylaminopyridine)], [L$^1$MgZnCl$_2$(dimethylaminopyridine)],

[L$^1$MgNiCl$_2$(dimethylaminopyridine)],

[L$^1$Ni$_2$Br$_2$(dimethylaminopyridine)], [L$^1$Mg$_2$Br$_2$(dimethylaminopyridine)],

[L$^1$Zn$_2$Br$_2$(dimethylaminopyridine)], [L$^1$MgZnBr$_2$(dimethylaminopyridine)],

[L$^1$MgNiBr$_2$(dimethylaminopyridine)],

[L$^1$Ni$_2$(bis(4-methoxy)phenyl phosphinate)$_2$], [L$^1$Mg$_2$(bis(4-methoxy)phenyl phosphinate)$_2$],

[L$^1$Zn$_2$(bis(4-methoxy)phenyl phosphinate)$_2$], [L$^1$MgZn(bis(4-methoxy)phenyl phosphinate)$_2$], [L$^1$MgNi(bis(4-methoxy)phenyl phosphinate)$_2$],

[L$^1$Ni$_2$(adamantyl carbonate)$_2$], [L$^1$Mg$_2$(adamantyl carbonate)$_2$], [L$^1$Zn$_2$(adamantyl carbonate)$_2$], [L$^1$MgZn(adamantyl carbonate)$_2$], [L$^1$MgNi(adamantyl carbonate)$_2$],

[L$^1$Ni$_2$(diphenylphosphinate)$_2$], [L$^1$Mg$_2$(diphenylphosphinate)$_2$],

[L$^1$Zn$_2$(diphenylphosphinate)$_2$], [L$^1$MgZn(diphenylphosphinate)$_2$],

[L$^1$MgNi(diphenylphosphinate)$_2$],

[L$^2$Ni$_2$(OAc)$_2$], [L$^2$Mg$_2$(OAc)$_2$], [L$^2$Zn$_2$(OAc)$_2$], [L$^2$MgZn(OAc)$_2$], [L$^2$MgNi(OAc)$_2$],

[L$^3$Ni$_2$(OAc)$_2$], [L$^3$Mg$_2$(OAc)$_2$], [L$^3$Zn$_2$(OAc)$_2$], [L$^3$MgZn(OAc)$_2$], [L$^3$MgNi(OAc)$_2$],

[L$^4$Ni$_2$(OAc)$_2$], [L$^4$Mg$_2$(OAc)$_2$], [L$^4$Zn$_2$(OAc)$_2$], [L$^4$MgZn(OAc)$_2$], [L$^4$MgNi(OAc)$_2$],

[L$^5$Ni$_2$(OAc)$_2$], [L$^5$Mg$_2$(OAc)$_2$], [L$^5$Zn$_2$(OAc)$_2$], [L$^5$MgZn(OAc)$_2$], [L$^5$MgNi(OAc)$_2$],

[L$^6$Ni$_2$(OAc)$_2$], [L$^6$Mg$_2$(OAc)$_2$], [L$^6$Zn$_2$(OAc)$_2$], [L$^6$MgZn(OAc)$_2$], [L$^6$MgNi(OAc)$_2$],

[L$^7$Ni$_2$(OAc)$_2$], [L$^7$Mg$_2$(OAc)$_2$], [L$^7$Zn$_2$(OAc)$_2$], [L$^7$MgZn(OAc)$_2$], [L$^7$MgNi(OAc)$_2$],

[L$^8$Ni$_2$(OAc)$_2$], [L$^8$Mg$_2$(OAc)$_2$], [L$^8$Zn$_2$(OAc)$_2$], [L$^8$MgZn(OAc)$_2$], [L$^8$MgNi(OAc)$_2$],

[L$^9$Ni$_2$(OAc)$_2$], [L$^9$Mg$_2$(OAc)$_2$], [L$^9$Zn$_2$(OAc)$_2$], [L$^9$MgZn(OAc)$_2$], [L$^9$MgNi(OAc)$_2$],

[L$^{10}$Ni$_2$(OAc)$_2$], [L$^{10}$Mg$_2$(OAc)$_2$], [L$^{10}$Zn$_2$(OAc)$_2$], [L$^{10}$MgZn(OAc)$_2$], [L$^{10}$MgNi(OAc)$_2$],

[L$^{11}$Ni$_2$(OAc)$_2$], [L$^{11}$Mg$_2$(OAc)$_2$], [L$^{11}$Zn$_2$(OAc)$_2$], [L$^{11}$MgZn(OAc)$_2$], [L$^{11}$MgNi(OAc)$_2$],

[L$^{12}$Ni$_2$(OAc)$_2$], [L$^{12}$Mg$_2$(OAc)$_2$], [L$^{12}$Zn$_2$(OAc)$_2$], [L$^{12}$MgZn(OAc)$_2$], [L$^{12}$MgNi(OAc)$_2$],

[L$^{13}$Ni$_2$(OAc)$_2$], [L$^{13}$Mg$_2$(OAc)$_2$], [L$^{13}$Zn$_2$(OAc)$_2$], [L$^{13}$MgZn(OAc)$_2$], [L$^{13}$MgNi(OAc)$_2$],

[L$^{14}$Ni$_2$(OAc)$_2$], [L$^{14}$Mg$_2$(OAc)$_2$], [L$^{14}$Zn$_2$(OAc)$_2$], [L$^{14}$MgZn(OAc)$_2$], [L$^{14}$MgNi(OAc)$_2$],

[L$^{15}$Ni$_2$(OAc)$_2$], [L$^{15}$Mg$_2$(OAc)$_2$], [L$^{15}$Zn$_2$(OAc)$_2$], [L$^{15}$MgZn(OAc)$_2$], [L$^{15}$MgNi(OAc)$_2$],

[L$^{16}$Ni$_2$(OAc)$_2$], [L$^{16}$Mg$_2$(OAc)$_2$], [L$^{16}$Zn$_2$(OAc)$_2$], [L$^{16}$MgZn(OAc)$_2$], [L$^{16}$MgNi(OAc)$_2$],

[L$^{17}$Ni$_2$(OAc)$_2$], [L$^{17}$Mg$_2$(OAc)$_2$], [L$^{17}$Zn$_2$(OAc)$_2$], [L$^{17}$MgZn(OAc)$_2$], [L$^{17}$MgNi(OAc)$_2$],

[L$^{18}$Ni$_2$(OAc)$_2$], [L$^{18}$Mg$_2$(OAc)$_2$], [L$^{18}$Zn$_2$(OAc)$_2$], [L$^{18}$MgZn(OAc)$_2$], [L$^{18}$MgNi(OAc)$_2$],

[L$^{19}$Ni$_2$(OAc)$_2$], [L$^{19}$Mg$_2$(OAc)$_2$], [L$^{19}$Zn$_2$(OAc)$_2$], [L$^{19}$MgZn(OAc)$_2$], [L$^{19}$MgNi(OAc)$_2$],

[L$^{20}$Ni$_2$(OAc)$_2$], [L$^{20}$Mg$_2$(OAc)$_2$], [L$^{20}$Zn$_2$(OAc)$_2$], [L$^{20}$MgZn(OAc)$_2$], [L$^{20}$MgNi(OAc)$_2$],

[L$^{21}$Ni$_2$(OAc)$_2$], [L$^{21}$Mg$_2$(OAc)$_2$], [L$^{21}$Zn$_2$(OAc)$_2$], [L$^{21}$MgZn(OAc)$_2$], [L$^{21}$MgNi(OAc)$_2$],

[L$^{22}$Ni$_2$(OAc)$_2$], [L$^{22}$Mg$_2$(OAc)$_2$], [L$^{22}$Zn$_2$(OAc)$_2$], [L$^{22}$MgZn(OAc)$_2$], [L$^{22}$MgNi(OAc)$_2$],

[L$^{23}$Ni$_2$(OAc)$_2$], [L$^{23}$Mg$_2$(OAc)$_2$], [L$^{23}$Zn$_2$(OAc)$_2$], [L$^{23}$MgZn(OAc)$_2$], [L$^{23}$MgNi(OAc)$_2$],

[L$^1$Co$_2$(OAc)$_3$], [L$^1$ZnCoI$_2$], [L$^1$ZnFe(OAc)$_2$], [L$^1$ZnFeBr$_2$], [L$^1$ZnFeCl$_2$], [L$^1$ZnFeI$_2$], [L$^1$ZnCo(OAc)$_2$], [L$^1$ZnCoCl$_2$], [L$^1$ZnCoBr$_2$], [L$^1$Fe$_2$Cl$_4$], [L$^1$Co$_2$Cl$_2$(methylimidazole)],

[L$^1$Co$_2$Cl$_2$(pyridine)], [L$^1$Co$_2$Cl$_3$]$^-$[H-DBU]$^+$, and [L$^1$Co$_2$Cl$_3$]$^-$[H-MTBD]$^+$.

The skilled person will appreciate that in any of the above complexes, any one ligand defined by "L" may be replaced by another ligand defined by a different "L". For example, in complexes which refer to L$^1$, this ligand may be replaced by any of the ligands defined by L$^2$ to L$^{22}$.

Double Metal Cyanide (DMC) Catalyst

DMC catalysts are complicated compounds which comprise at least two metal centres and cyanide ligands. The DMC catalyst may additionally comprise an organic complexing agent, water and/or a metal salt (e.g. in non-stoichiometric amounts).

Examples of DMC catalysts which can be used in the method of the invention include those described in U.S. Pat. Nos. 3,427,256, 5,536,883, 6,291,388, 6,486,361, 6,608,231, 7,008,900, 5,482,908, 5,780,584, 5,158,922, 5,693,584, 7,811,958, 6,835,687, 6,699,961, 6,716,788, 6,977,236, 7,968,754, 7,034,103, 4,826,953, 4,500,704, 7,977,501, EP-A-1568414, EP-A-1529566, and WO 2015/022290, the entire contents of which are incorporated by reference.

DMC catalysts which are useful in the invention may be produced by treating a solution (such as an aqueous solution) of a metal salt with a solution (such as an aqueous solution) of a metal cyanide salt in the presence of an organic complexing agent. Suitable metal salts include compounds of the formula M'(X')$_p$, wherein M' is selected from Zn(II), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III), and M' is preferably selected from Zn(II), Fe(II), Co(II) and Ni(II), even more preferably M' is Zn(II). X' is an anion selected from halide, hydroxide, sulphate, carbonate, cyanide, oxalate, thiocyanate, isocyanate, isothiocyanate, carboxylate and nitrate, preferably X' is halide. p is an integer of 1 or more, and the charge on the anion multiplied by p satisfies the valency of M'. Examples of suitable metal salts include zinc chloride, zinc bromide, zinc acetate, zinc acetonylacetonate, zinc benzoate, zinc nitrate, iron(II) sulphate, iron (II) bromide, cobalt(II) chloride, cobalt(II) thiocyanate, nickel(II) formate, nickel(II) nitrate, and mixtures thereof.

Suitable metal cyanide salts include compounds of the formula (Y)q[M"(CN)$_b$(A)$_c$], wherein M" is selected from Fe(II), Fe(III), Co(II), Co(III), Cr(II), Cr(III), Mn(II), Mn(III), Ir(III), Ni(II), Rh(III), Ru(II), V(IV), and V(V), preferably M" is selected from Co(II), Co(III), Fe(II), Fe(III), Cr(III), Ir(III) and Ni(II), more preferably M" is selected from Co(II) and Co(III). Y is an alkali metal ion or an alkaline earth metal ion (such as K$^+$), A is an anion selected from halide, hydroxide, sulphate, cyanide oxalate, thiocyanate, isocyanate, isothiocyanate, carboxylate and nitrate. q and b are integers of 1 or more, preferably b is 4 or 6. c may be 0 or an integer of 1 or more. The sum of the charges on the ions Y, CN and A multiplied by q, b and c respectively (e.g. Y×q+CN×b+A×c) satisfies the valency of M". Examples of suitable metal cyanide salts include potassium hexacyanocobaltate(III), potassium hexacyanoferrate (II), potassium hexacyanoferrate(III), calcium hexacyanocobaltate(III), lithium hexacyanocolbaltate(III), and mixtures thereof.

Suitable complexing agents include ethers, ketones, esters, amides, alcohols, ureas and the like, such as dimethoxyethane, tert-butyl alcohol, ethylene glycol monomethyl ether, diglyme, triglyme, ethanol, isopropyl alcohol, n-butyl alcohol, isobutyl alcohol, sec-butyl alcohol, etc.

In one common preparation, an aqueous solution of zinc chloride (excess) is mixed with an aqueous solution of potassium hexacyanocobaltate, and an organic complexing agent (such as dimethoxyethane) is added to the resulting slurry. After filtration and washing of the catalyst with an aqueous solution of the complexing agent (e.g. aqueous dimethoxyethane), and active catalyst is obtained.

For example, the DMC catalyst may comprise:

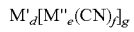

Wherein M' and M" are as defined above, d, e, f and g are integers, and are chosen to such that the DMC catalyst has electroneutrality. Preferably, d is 3. Preferably, e is 1. Preferably f is 6. Preferably g is 2. Preferably, M' is selected from Zn(II), Fe(II), Co(II) and Ni(II), more preferably M' is Zn(II). Preferably M" is selected from Co(III), Fe(III), Cr(III) and Ir(III), more preferably M" is Co(III).

It will be appreciated that any of these preferred features may be combined, for example, d is 3, e is 1, f is 6 and g is 2, M' is Zn(II) and M" is Co(III).

Suitable DMC catalysts of the above formula may include zinc hexacyanocobaltate(III), zinc hexacyanoferrate(III), nickel hexacyanoferrate(II), and cobalt hexacyanocobaltate (III).

There has been a lot of development in the field of DMC catalysts, and the skilled person will appreciate that the DMC catalyst may comprise, in addition to the formula above, further additives to enhance the activity of the catalyst. Thus, while the above formula may form the "core" of the DMC catalyst, the DMC catalyst may additionally comprise stoichiometric or non-stoichiometric amounts of one or more additional components, such as an organic complexing agent, a metal salt, and/or water.

For example, the DMC catalyst may have the following formula:

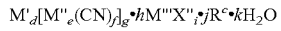

Wherein M', M", d, e, f and g are as defined above.

M''' can be M' and/or M". X" is an anion selected from halide, hydroxide, sulphate, carbonate, cyanide, oxalate, thiocyanate, isocyanate, isothiocyanate, carboxylate and nitrate, preferably X' is halide. i is an integer of 1 or more, and the charge on the anion X" multiplied by i satisfies the valency of M'''.

$R^c$ is a complexing agent, and may be as defined above. For example, $R^c$ may be an ether, a ketone, an ester, an amide, an alcohol (e.g. a $C_{1-6}$ alcohol), a urea and the like, such as dimethoxyethane, tert-butyl alcohol, ethylene glycol monomethyl ether, diglyme, triglyme, ethanol, isopropyl alcohol, n-butyl alcohol, isobutyl alcohol, sec-butyl alcohol, for example, $R^c$ may be tert-butyl alcohol.

It will be appreciated that if the water, complexing agent and/or metal salt are not present in the DMC catalyst, h, j and/or k will be zero respectively. If the water, complexing agent and/or metal salt are present, then h, j and/or k are a positive number and may, for example, be between 0 and 20. For example, h may be between 0.1 and 4. j may be between 0.1 and 6. k may be between 0 and 20, e.g. between 0.1 and 10, such as between 0.1 and 5.

As set out above, DMC catalysts are complicated structures, and thus, the above formula including the additional components is not intended to be limiting. Instead, the skilled person will appreciate that this definition is not exhaustive of the DMC catalysts which are capable of being used in the invention.

An exemplary DMC catalyst is of the formula $Zn_3[Co(CN)_6]_2 \cdot hZnCl_2 \cdot 0.5H_2O \cdot 2[(CH_3)_3COH]$.

Starter Compound

The starter compound which may be used in the method of the invention comprises at least two groups selected from a hydroxyl group (—OH), a thiol (—SH), an amine having at least one N—H bond (—NHR'), a group having at least one P—OH bond (e.g. —PR'(O)OH, PR'(O)(OH)$_2$ or —P(O)(OR')(OH)), or a carboxylic acid group (—C(O)OH).

Thus, the starter compound which is useful in the method of the invention may be of the formula (III):

 (III)

Z can be any group which can have 2 or more —$R^Z$ groups attached to it. Thus, Z may be selected from optionally substituted alkylene, alkenylene, alkynylene, heteroalkylene, heteroalkenylene, heteroalkynylene, cycloalkylene, cycloalkenylene, hererocycloalkylene, heterocycloalkenylene, arylene, heteroarylene, or Z may be a combination of any of these groups, for example Z may be an alkylarylene, heteroalkylarylene, heteroalkylheteroarylene or alkylheteroarylene group. Preferably Z is alkylene, heteroalkylene, arylene, or heteroarylene.

It will be appreciated that a is an integer which is at least 2, preferably a is in the range of between 2 and 8, preferably a is in the range of between 2 and 6.

Each $R^Z$ may be —OH, —NHR', —SH, —C(O)OH, —P(O)(OR')(OH), —PR'(O)(OH)$_2$ or —PR'(O)OH, preferably $R^Z$ is selected from —OH, —NHR' or —C(O)OH, more preferably each $R^Z$ is —OH, —C(O)OH or a combination thereof (e.g. each $R^Z$ is —OH).

R' may be H, or optionally substituted alkyl, heteroalkyl, aryl, heteroaryl, cycloalkyl or heterocycloalkyl, preferably R' is H or optionally substituted alkyl.

It will be appreciated that any of the above features may be combined. For example, a may be between 2 and 8, each $R^Z$ may be —OH, —C(O)OH or a combination thereof, and Z may be selected from alkylene, heteroalkylene, arylene, or heteroarylene.

Exemplary starter compounds include diols such as 1,2-ethanediol (ethylene glycol), 1-2-propanediol, 1,3-propanediol (propylene glycol), 1,2-butanediol, 1-3-butanediol, 1,4-butanediol, 1,5-pentanediol, 1,6-hexanediol, 1,8-octanediol, 1,10-decanediol, 1,4-cyclohexanediol, 1,2-diphenol, 1,3-diphenol, 1,4-diphenol, neopentyl glycol, catechol, cyclohexenediol, 1,4-cyclohexanedimethanol, dipropylene glycol, diethylene glycol, tripropylene glycol, triethylene glycol, tetraethylene glycol, polypropylene glycols (PPGs) or polyethylene glycols (PEGs) having an Mn of up to about 1500 g/mol, such as PPG 425, PPG 725, PPG 1000 and the like, triols such as glycerol, benzenetriol, 1,2,4-butanetriol, 1,2,6-hexanetriol, tris(methylalcohol)propane, tris(methylalcohol)ethane, tris(methylalcohol)nitropropane, trimethylol propane, polypropylene oxide triols and polyester triols, tetraols such as calix[4]arene, 2,2-bis(methylalcohol)-1,3-propanediol, erythritol, pentaerythritol or polyalkylene glycols (PEGs or PPGs) having 4-OH groups, polyols, such as sorbitol or polyalkylene glycols (PEGs or PPGs) having 5 or more —OH groups, or compounds having mixed functional groups including ethanolamine, diethanolamine, methyldiethanolamine, and phenyldiethanolamine.

For example, the starter compound may be a diol such as 1,2-ethanediol (ethylene glycol), 1-2-propanediol, 1,3-propanediol (propylene glycol), 1,2-butanediol, 1-3-butanediol, 1,4-butanediol, 1,5-pentanediol, 1,6-hexanediol, 1,8-octanediol, 1,10-decanediol, 1,12-dodecanediol, 1,4-cyclohexanediol, 1,2-diphenol, 1,3-diphenol, 1,4-diphenol, neopentyl glycol, catechol, cyclohexenediol, 1,4-cyclohexanedimethanol, poly(caprolactone) diol, dipropylene glycol, diethylene glycol, tripropylene glycol, triethylene glycol, tetraethylene glycol, polypropylene glycols (PPGs) or polyethylene glycols (PEGs) having an Mn of up to about 1500 g/mol, such as PPG 425, PPG 725, PPG 1000 and the like. It will be appreciated that the starter compound may be 1,6-hexanediol, 1,4-cyclohexanedimethanol, 1,12-dodecanediol, poly(caprolactone) diol, PPG 425, PPG 725, or PPG 1000.

Further exemplary starter compounds may include diacids such as oxalic acid, malonic acid, succinic acid, glutaric acid, adipic acid, pimelic acid, suberic acid, azelaic acid, sebacic acid, undecanedioic acid, dodecanedioic acid or other compounds having mixed functional groups such as lactic acid, glycolic acid, 3-hydroxypropanoic acid, 4-hydroxybutanoic acid, 5-hydroxypentanoic acid.

Reaction Conditions

The method of the invention may be carried out at pressures of between about 1 bar and about 60 bar carbon dioxide, e.g. between about 1 bar and about 30 bar carbon dioxide, for example between about 1 to about 20 bar, such as between about 1 and about 15 bar carbon dioxide.

The method of the invention is capable of preparing polycarbonate ether polyols at pressures that are within the limits of existing polyether polyol equipment used in industry (e.g. 10 bar or less). Therefore, the method of the invention is capable being carried out at pressures of between about 1 bar and about 10 bar, for example, the reaction is capable of being carried out at a pressure of about 5 bar or less carbon dioxide. Under these conditions, the method of the invention is still capable of producing polycarbonate ether polyols having a varying amount of carbonate linkages, and may produce a polyol having a high content of carbonate linkages.

The method of the invention may be carried out in the presence of a solvent, however it will also be appreciated that the reaction may be carried out in the absence of a solvent. When a solvent is present, it may be toluene, diethyl carbonate, dimethyl carbonate, dioxane, dichlorobenzene, methylene chloride, propylene carbonate, ethylene carbonate, acetone, ethyl acetate, propyl acetate, n-butyl acetate, tetrahydrofuran (THF), etc.

The epoxide which is used in the method may be any containing an epoxide moiety. Exemplary epoxides include ethylene oxide, propylene oxide, butylene oxide and cyclohexene oxide.

The epoxide may be purified (for example by distillation, such as over calcium hydride) prior to reaction with carbon dioxide. For example, the epoxide may be distilled prior to being added to the reaction mixture comprising the catalysts.

The process may be carried out at a temperature of about 0° C. to about 250° C., for example from about 40° C. to about 140° C., e.g. from about 50° C. to about 110° C., such as from about 60° C. to about 100° C., for example from about 70° C. to about 100° C. The duration of the process may be up to about 168 hours, such as from about 1 minute to about 24 hours, for example from about 5 minutes to about 12 hours, e.g. from about 1 to about 6 hours.

The method of the invention may be carried out at low catalytic loading. For example, the catalytic loading of the catalyst of formula (I) may be in the range of about 1:1,000-300,000 [catalyst of formula (I)]:[epoxide], such as about 1:1,000-100,000 [catalyst of formula (I)]:[epoxide], e.g. in the region of about 1:10000-50,000 [catalyst of formula (I)]:[epoxide], for example in the region of about 1:10,000 [catalyst of formula (I)]:[epoxide]. The ratios above are molar ratios.

The ratio of the catalyst of formula (I) to the DMC catalyst may be in the range of from about 300:1 to about 0.1:1, for example, from about 120:1 to about 0.25:1, such as from about 40:1 to about 0.5:1, e.g. from about 30:1 to about 0.75:1 such as from about 20:1 to about 1:1, for example from about 10:1 to about 2:1, e.g. from about 5:1 to about 3:1. These ratios are mass ratios.

The starter compound may be present in amounts of from about 200:1 to about 1:1, for example, from about 175:1 to about 5:1, such as from about 150:1 to about 10:1, e.g. from about 125:1 to about 20:1, for example from about 50:1 to about 20:1, relative to the catalyst of formula (I). These ratios are molar ratios.

The starter may be pre-dried (for example with molecular sieves) to remove moisture. It will be understood that any of the above reaction conditions described may be combined. For example, the reaction may be carried out at 20 bar or less (e.g. 10 bar or less) and at a temperature in the range of from about 50° C. to about 130° C., for example, from about 50° C. to about 110° C., such as from about 60° C. to about 100° C., e.g. from about 70° C. to about 100° C.

The method may be a batch reaction, a semi-continuous reaction, or a continuous reaction.

Polyols

The method of the invention is capable of preparing polycarbonate ether polyols, which are capable of being used, for example, to prepare polyurethanes.

The method of the invention is capable of producing polycarbonate ether polyols in which the amount of ether and carbonate linkages can be controlled. Thus, the invention provides a polycarbonate ether polyol which has n ether linkages and m carbonate linkages, wherein n and m are integers, and wherein $m/(n+m)$ is from greater than zero to less than 1.

For example, the method of the invention is capable of preparing polycarbonate ether polyols having a wide range of $m/(n+m)$ values. It will be understood that $m/(n+m)$ may be about 0.05, about 0.10, about 0.15, about 0.20, about 0.25, about 0.25, about 0.30, about 0.35, about 0.40, about 0.45, about 0.50, about 0.55, about 0.60, about 0.65, about 0.70, about 0.75, about 0.80, about 0.85, about 0.90, about 0.95, or within any range prepared from these specific values. For example, $m/(n+m)$ may be from about 0.05 to about 0.95, from about 0.10 to about 0.90, from about 0.15 to about 0.85, from about 0.20 to about 0.80, or from about 0.25 to about 0.75, etc.

Thus, the method of the invention makes it possible to prepare polycarbonate ether polyols having a high proportion of carbonate linkages, e.g. $m/(n+m)$ may be greater than about 0.50, such as from greater than about 0.55 to less than about 0.95, e.g. 0.65 to about 0.90, e.g. about 0.75 to about 0.90. The method of the invention is able to prepare polyols having a high ratio of $m/(n+m)$ under mild conditions, for example, under pressures of about 20 bar or below, such as 10 bar or below.

For example, the polycarbonate ether polyols produced by the method of the invention may have the following formula (IV):

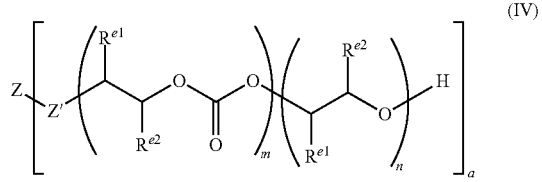

It will be appreciated that the identity of Z and Z' will depend on the nature of the starter compound, and that the identity of $R^{e1}$ and $R^{e2}$ will depend on the nature of the epoxide used to prepare the polycarbonate ether polyol. m and n define the amount of the carbonate and ether linkages in the polycarbonate ether polyol.

The skilled person will understand that in the polymers of formula (IV), the adjacent epoxide monomer units in the backbone may be head-to-tail linkages, head-to-head linkages or tail-to-tail linkages.

It will also be appreciated that formula (IV) does not require the carbonate links and the ether links to be present in two distinct "blocks" in each of the sections defined by "a", but instead the carbonate and ether repeating units may be statistically distributed along the polymer backbone, or may be arranged so that the carbonate and ether linkages are not in two distinct blocks.

Thus, the polycarbonate ether polyol prepared by the method of the invention (e.g. a polymer of formula (IV)) may be referred to as a random copolymer, a statistical copolymer, an alternating copolymer, or a periodic copolymer.

The skilled person will appreciate that the wt % of carbon dioxide incorporated into a polymer cannot be definitively used to determine the amount of carbonate linkages in the polymer backbone. For example, two polymers which incorporate the same wt % of carbon dioxide may have very different ratios of carbonate to ether linkages. This is because the "wt % incorporation" of carbon dioxide does not take into account the length and nature of the starter compound. For instance, if one polymer (Mn 2000 g/mol) is prepared using a starter with a molar mass of 100 g/mol, and another polymer (Mn also 2000 g/mol) is prepared using a starter having a molar mass of 500 g/mol, and both the resultant polymers have the same ratio of m/n then the wt % of carbon dioxide in the polymers will be different due to the differing proportion of the mass of the starter in the overall polymer molecular weight (Mn). For example, if m/(m+n) was 0.5, the two polyols described would have carbon dioxide contents of 26.1 wt % and 20.6 wt % respectively.

As highlighted above, the method of the invention is capable of preparing polyols which have a wide range of carbonate to ether linkages (e.g. m/(n+m) can be from greater than zero to less than 1), which, when using propylene oxide, corresponds to incorporation of up to about 43 wt % carbon dioxide. This is surprising, as DMC catalysts which have previously reported can generally only prepare polyols having a ratio of carbonate to ether linkages of up to 0.75, and these amounts can usually only be achieved at high pressures of carbon dioxide, such as 30 bar, more commonly 40 bar or above.

Furthermore, catalysts which are used to prepare polycarbonate polyols can typically achieve a ratio of carbonate to ether linkages of about 0.95 or above (usually about 0.98 or above), and thus also incorporate a high wt % of carbon dioxide. However, these catalysts are not capable of preparing polyols having a ratio of carbonate to ether linkages below 0.95. The carbon dioxide wt % can be moderated by changing the mass of the starter: the resultant polyols contain blocks of polycarbonate. For many applications this is not desirable, as polycarbonates produced from epoxides and carbon dioxide are less thermally stable than polyethers and block copolymers can have very different properties from random or statistical copolymers.

All other things being equal, polyethers have higher temperatures of degradation than polycarbonates produced from epoxides and carbon dioxide. Therefore, a polyol having a statistical or random distribution of ether and carbonate linkages will have a higher temperature of degradation than a polycarbonate polyol, or a polyol having blocks of carbonate linkages. Temperature of thermal degradation can be measured using thermal gravimetric analysis (TGA).

As set out above, the method of the invention prepares a random copolymer, a statistical copolymer, an alternating copolymer, or a periodic copolymer. Thus, the carbonate linkages are not in a single block, thereby providing a polymer which has improved properties, such as improved thermal degradation, as compared to a polycarbonate polyol. Preferably, the polymer prepared by the method of the invention is a random copolymer or a statistical copolymer.

The polycarbonate ether polyol prepared by the method of the invention may be of formula (IV), in which n and m are integers of 1 or more, the sum of all m and n groups is from 4 to 200, and wherein m/(m+n) is in the range of from greater than zero to less than 1.00. As set out above, m/(n+m) may be from about 0.05, about 0.10, about 0.15, about 0.20, about 0.25, about 0.25, about 0.30, about 0.35, about 0.40, about 0.45, about 0.50, about 0.55, about 0.60, about 0.65, about 0.70, about 0.75, about 0.80, about 0.85, about 0.90, about 0.95, or within any range prepared from these specific values. For example, m/(n+m) may be from about 0.05 to about 0.95, from about 0.10 to about 0.90, from about 0.15 to about 0.85, from about 0.20 to about 0.80, or from about 0.25 to about 0.75, etc.

The skilled person will also appreciate that the polyol must contain at least one carbonate and at least one ether linkage. Therefore it will be understood that the number of ether and carbonate linkages (n+m) in the polyol will be ≥a. The sum of n+m must be greater than or equal to a.

Each $R^{e1}$ may be independently selected from H, halogen, hydroxyl, or optionally substituted alkyl, alkenyl, alkynyl, cycloalkyl, heterocycloalkyl, aryl, heteroaryl, heteroalkyl or heteroalkenyl. Preferably $R^{e1}$ may be selected from H or optionally substituted alkyl.

Each $R^{e2}$ may be independently selected from H, halogen, hydroxyl, or optionally substituted alkyl, alkenyl, alkynyl, cycloalkyl, heterocycloalkyl, aryl, heteroaryl, heteroalkyl or heteroalkenyl. Preferably $R^{e2}$ may be selected from H or optionally substituted alkyl.

It will also be appreciated that $R^{e1}$ and $R^{e2}$ may together form a saturated, partially unsaturated or unsaturated ring containing carbon and hydrogen atoms, and optionally one or more heteroatoms (e.g. O, N or S). For example, $R^{e1}$ and $R^{e2}$ may together form a 5 or six membered ring.

As set out above, the nature of $R^{e1}$ and $R^{e2}$ will depend on the epoxide used in the reaction. If the epoxide is cyclohexene oxide (CHO), then $R^{e1}$ and $R^{e2}$ will together form a six membered alkyl ring (e.g. a cyclohexyl ring). If the epoxide is ethylene oxide, then $R^{e1}$ and $R^{e2}$ will both be H. If the epoxide is propylene oxide, then $R^{e1}$ will be H and $R^{e2}$ will be methyl (or $R^{e1}$ will be methyl and $R^{e2}$ will be H, depending on how the epoxide is added into the polymer backbone). If the epoxide is butylene oxide, then $R^{e1}$ will be H and $R^{e2}$ will be ethyl (or vice versa). If the epoxide is styrene oxide, then $R^{e1}$ may be hydrogen, and $R^{e2}$ may be phenyl (or vice versa).

It will also be appreciated that if a mixture of epoxides are used, then each occurrence of $R^{e1}$ and/or $R^{e2}$ may not be the same, for example if a mixture of ethylene oxide and propylene oxide are used, $R^{e1}$ may be independently hydrogen or methyl, and $R^{e2}$ may be independently hydrogen or methyl.

Thus, $R^{e1}$ and $R^{e2}$ may be independently selected from hydrogen, alkyl or aryl, or $R^{e1}$ and $R^{e2}$ may together form a cyclohexyl ring, preferably $R^{e1}$ and $R^{e2}$ may be independently selected from hydrogen, methyl, ethyl or phenyl, or $R^{e1}$ and $R^{e2}$ may together form a cyclohexyl ring.

Z' corresponds to $R^Z$, except that a bond replaces the labile hydrogen atom. Therefore, the identity of each Z' depends on the definition of $R^Z$ in the starter compound. Thus, it will be appreciated that each Z' may be —O—, —NR'—, —S—, —C(O)O—, —P(O)(OR')O—, —PR'(O)(O—)$_2$ or —PR'(O)O— (wherein R' may be H, or optionally substituted alkyl, heteroalkyl, aryl, heteroaryl, cycloalkyl or heterocycloalkyl, preferably R' is H or optionally substituted alkyl), preferably Z' may be —C(O)O—, —NR'— or —O—, more preferably each Z' may be —O—, —C(O)O— or a combination thereof, more preferably each Z' may be —O—.

Z also depends on the nature of the starter compound. Thus, Z may be selected from optionally substituted alkylene, alkenylene, alkynylene, heteroalkylene, heteroalkenylene, heteroalkynylene, cycloalkylene, cycloalkenylene, hererocycloalkylene, heterocycloalkenylene, arylene, heteroarylene, or Z may be a combination of any of these groups, for example Z may be an alkylarylene, heteroalkylarylene, heteroalkylheteroarylene or alkylheteroarylene group. Preferably Z is alkylene, heteroalkylene, arylene, or heteroarylene, e.g. alkylene or heteroalkylene. It will be appreciated that each of the above groups may be optionally substituted, e.g. by alkyl.

The variable a will also depend on the nature of the starter compound. The skilled person will appreciate that the value of a in formula (IV) will be the same as a in formula (III). Therefore, for formula (IV), a is an integer of at least 2, preferably a is in the range of between 2 and 8, preferably a is in the range of between 2 and 6.

The skilled person will also appreciate that the value of a will influence the shape of the polyol prepared by the method of the invention. For example, when a is 2, the polyol of formula (IV) may have the following structure:

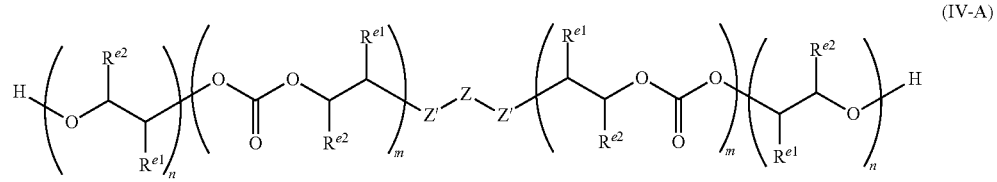
(IV-A)

Where Z, Z', m, n, $R^{e1}$ and $R^{e2}$ are as described above for formula (IV).

For example, when a is 3, the polyol of formula (IV) may have the following formula:

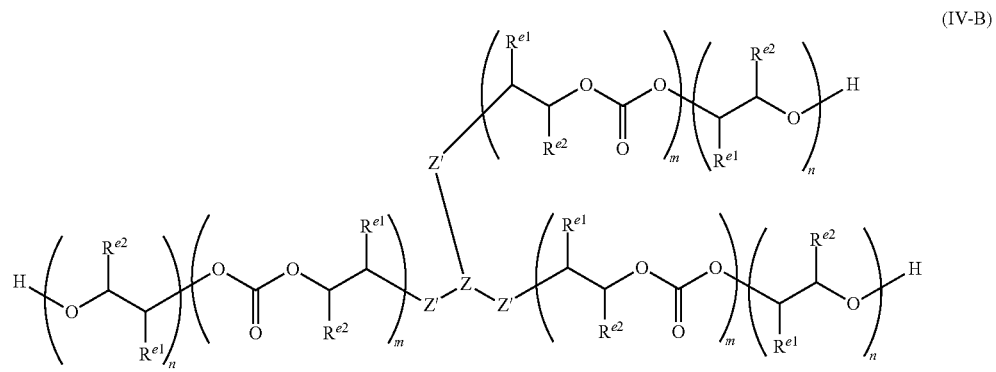
(IV-B)

Where Z, Z', m, n, $R^{e1}$ and $R^{e2}$ are as described above for formula (IV).

The skilled person will understand that each of the above features may be combined. For example, $R^{e1}$ and $R^{e2}$ may be independently selected from hydrogen, alkyl or aryl, or $R^{e1}$ and $R^{e2}$ may together form a cyclohexyl ring, each Z' may be —O—, —C(O)O— or a combination thereof (preferably each Z' may be —O—), and Z may be optionally substituted alkylene, heteroalkylene, arylene, or heteroarylene, e.g. alkylene or heteroalkylene, and a may be between 2 and 8.

The polyols produced by the method of the invention are preferably low molecular weight polyols. It will be appreciated that the nature of the epoxide used to prepare the polycarbonate ether polyol will have an impact on the resulting molecular weight of the product. Thus, the upper limit of n+m is used herein to define "low molecular weight" polymers of the invention.

The method of the invention can advantageously prepare a polycarbonate ether polyol having a narrow molecular weight distribution. In other words, the polycarbonate ether polyol may have a low polydispersity index (PDI). The PDI of a polymer is determined by dividing the weight average molecular weight ($M_w$) by the number average molecular weight ($M_n$) of a polymer, thereby indicating the distribution of the chain lengths in the polymer product. It will be appreciated that PDI becomes more important as the molecular weight of the polymer decreases, as the percent variation in the polymer chain lengths will be greater for a short chain polymer as compared to a long chain polymer, even if both polymers have the same PDI.

Preferably the polymers produced by the method of the invention have a PDI of from about 1 to less than about 2, preferably from about 1 to less than about 1.75, more preferably from about 1 to less than about 1.5, even more preferably from about 1 to less than about 1.3.

The $M_n$ and $M_w$, and hence the PDI of the polymers produced by the method of the invention may be measured using Gel Permeation Chromatography (GPC). For example, the GPC may be measured using an Agilent 1260 Infinity GPC machine with two Agilent PLgel μ-m mixed-E columns in series. The samples may be measured at room temperature (293K) in THF with a flow rate of 1 mL/min against narrow polystyrene standards (e.g. polystyrene low easivials supplied by Agilent Technologies with a range of Mn from 405 to 49,450 g/mol). Optionally, the samples may be measured against poly(ethylene glycol) standards, such as polyethylene glycol easivials supplied by Agilent Technologies.

Preferably, the polymers produced by the method of the invention may have a molecular weight in the range of from about 500 to about 10,000 Da, preferably from about 700 to about 5,000 Da, preferably from about 800 to about 2,000 Da.

The invention also provides a polymerisation system for the copolymerisation of carbon dioxide and an epoxide, comprising:
  d. A catalyst of formula (I) as defined herein,
  e. A DMC catalyst as defined herein, and
  f. A starter compound as herein.

It will also be appreciated that the polyols prepared by the method of the invention may be used for further reactions, for example to prepare a polyurethane, for example by reacting a polyol composition comprising a polyol prepared by the method of the invention with a composition comprising a di- or polyisocyanate.

The skilled person will also appreciate that it may be possible to use other catalysts which are known to prepare polycarbonates via the reaction of an epoxide and carbon dioxide either as well as, or instead of, the catalysts of formula (I). For example, catalysts as defined in WO 2010/028362 are considered for this purpose.

There is herein disclosed a catalyst of formula (IIb):

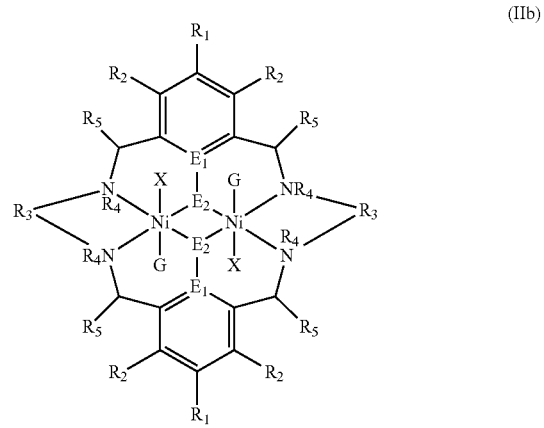

(IIb)

Wherein $R_1$, $R_2$, $R_3$, $R_5$, G, X, $E_1$ and $E_2$, are as defined for formula (I) or formula (II). Each $R_4$ is independently selected from an optionally substituted alkyl, alkenyl, alkynyl, aryl, heteroalkyl, heteroalkenyl, heteroalkynyl, heteroaryl, -alkylC(O)OR$_{19}$ or -alkylC≡N, preferably each $R_4$ is independently selected from an optionally substituted alkyl, aryl, heteroalkyl, or heteroaryl group. Each $R_4$ may be the same or different. Preferably each $R_4$ is the same. For example, each $R_4$ is the same and is selected from optionally substituted alkyl, aryl, heteroalkyl, or heteroaryl group. Exemplary $R_4$ groups include optionally substituted methyl, ethyl, propyl, butyl, cyclohexyl and phenyl.

It will be appreciated that each of the preferred definitions as set out for formula (I) and formula (II) may equally be applied to formula (IIb).

It will be understood that the compound of formula (IIb) may have the following structure:

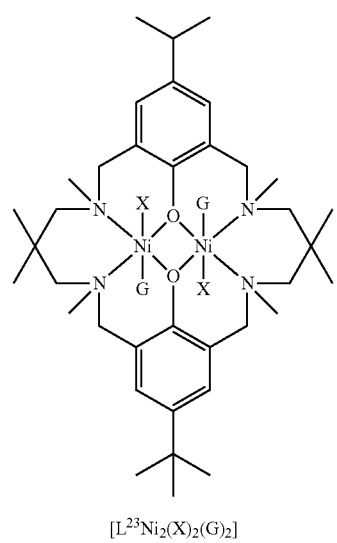

[L$^{23}$Ni$_2$(X)$_2$(G)$_2$]

Wherein X and G are as defined for formula (I) or formula (II).

It will be appreciated that the catalyst of formula (IIb) may be used in the method of the present invention.

The catalyst of formula (IIb) may also be used in a method of reacting (i) carbon dioxide and an epoxide, (ii) an epoxide and an anhydride, and/or (iii) a lactide and/or a lactone, optionally in the presence of a chain transfer agent. The epoxide may be as defined herein, for example, it may be ethylene oxide, propylene oxide or cyclohexene oxide.

EXAMPLES

Methods
$^1$H NMR Analysis

The assessment of polyether and polycarbonate content of the polyethercarbonate polyols has been reported in a number of different ways. In order to calculate the molar carbonate content and the $CO_2$ wt % in the polyethercarbonate polyols, the method described in US2014/0323670 was used herein. The method is as follows:

The samples were dissolved in deuterated chloroform and measured on a Bruker spectrometer. The relevant resonances in the $^1$H-NMR spectra used for integration (in the case that 1,6-hexanediol is used as a starter) were:

TABLE A

| $^1$H NMR resonance (ppm) | Protons from repeating units | No of protons |
|---|---|---|
| A (1.08-1.18) | $CH_3$ of Polyether | 3 |
| B (1.18-1.25) | $CH_3$ of Polycarbonate end groups | 3 |
| C (1.25-1.38) | $CH_3$ of Polycarbonates | 3 |
| D (1.45-1.49) | $CH_3$ of cyclic carbonate | 3 |
| E (1.64-1.75) or (1.40-1.48) | $CH_2$ of hexanediol | 4 |
| F (2.95-2.99) | CH of propylene oxide | 1 |

The resonances A, C-F have been previously defined for polyethercarbonates containing a low proportion of carbonate linkages in the methods described in US2014/0323670. An extra resonance (B, 1.18-1.25 ppm) has been identified that is only present in significant quantities in polyethercarbonates with a high carbonate content. It has been assigned (by terminal propylene $CH_3$ group between a carbonate unit and a hydroxyl end group. It is therefore added to the total carbonate units (C) as described in US2014/0323670.

Carbonate/ether ratio (m/n+m): molar ratio of carbonate and ether linkages:

$$\frac{m}{n+m} = R_C = \frac{B+C}{A+B+C} \quad \text{(Equation 1)}$$

$CO_2$ wt % in polyol: amount of $CO_2$ incorporated into the total polyol:

$$CO2 \text{ wt \%} = \frac{(C+B) \times 44}{(A \times 58) + ((B+C) \times 102) + (0.75 \times (E \times 118))} \times 100 \quad \text{(Equation 2)}$$

Wherein 44 is the mass of $CO_2$ within a carbonate unit, 58 is the mass of a polyether unit, 102 is the mass of a polycarbonate unit and 118 is the mass of the hexanediol starter (the factor 0.75 is added as the hexanediol resonance corresponds to 4 protons whilst all the other resonances correspond to 3). This is the total proportion of $CO_2$ that is present in the entire polyol. If other starters are used it is appreciated the relevant NMR signals, relative integrations and molecular weights will be used in the calculation.

Furthermore, resonance C can be broken down into two different resonances. From 1.26-1.32 ppm ($C^1$) corresponds to the propylene $CH_3$ in a polymer unit between a carbonate and an ether linkage (a polyethercarbonate, PEC linkage) whilst the resonance from 1.32-1.38 ppm ($C^2$) comes from a propylene $CH_3$ in a polymer unit in between two carbonate linkages (a polycarbonate, PC linkage). The ratio of PEC, PC and PE linkages gives an indication of the structure of the polymer. A completely blocked structure will contain very few PEC linkages (only those at the block interfaces), whilst a more random structure will include a significant proportion of PEC linkages where both polyether and polycarbonate units are adjacent to each other in the polymer backbone. The ratio of these two units gives an indication of the structure.

Polyethercarbonate/polycarbonate linkage ratio:

$$R_{PEC} = \frac{C^1}{C^1 + C^2} \quad \text{(Equation 3)}$$

Gel Permeation Chromatography

GPC measurements were carried out against narrow polydispersity poly(ethylene glycol) or polystyrene standards in THF using an Agilent 1260 Infinity machine equipped with Agilent PLgel Mixed-E columns.

Viscosity

The viscosity of the polyol samples was measured according to ASTM Standard D4878-15 using a Lamy RM200 Rheometer at sheer rates between 10-400 $s^{-1}$.

OH Value

The OH value was determined by titration against NaOH according to ASTM D4274-11 using a Mettler Toledo T50M manual titrator.

Example 1

Synthesis of DMC Catalyst

The DMC catalyst used in this example was prepared according to the method reported in Journal of Polymer Science; Part A: Polymer Chemistry, 2002, 40, 1142. In brief, 1.0 g of $K_3Co(CN)_6$ was dissolved in a mixture solvent of 13 g distilled water and 2 g tert-butyl alcohol. 6 g of $ZnCl_2$ was dissolved in a mixture solvent of 13 g water and 4 g tert-butyl alcohol, and then this mixture was added slowly to the $K_3Co(CN)_6$ solution over a period of 20 minutes, whilst stirring. The mixture was then stirred for a further 40 minutes and then centrifugal separation was performed to yield a white precipitate. The precipitate was dispersed in a mixture solvent of 16 g water and 16 g tert-butyl alcohol, and stirred for 20 minutes, and then the precipitate was separated by centrifuge. This washing procedure was repeated 3 times. The white precipitate was then dispersed in 50 g tert-butyl alcohol, and then stirred for 20 minutes, followed by centrifugal separation to obtain a white precipitate. The washing with tert-butyl alcohol was then repeated once more. The solvent was then removed under reduced pressure at 60° C. for 8 hours. The resultant compound is understood to have the formula $Zn_3[Co(CN)_6]_2 \cdot hZnCl_2 \cdot 0.5H_2O \cdot 2[(CH_3)_3COH]$.

Synthesis of [$L^1Ni_2(OAc)_2$], Catalyst 1

Ligand $H_2L^1$ was synthesised by the method previously described by Kember et al, Angew. Chem. Int. Ed., 2009, 48, 931-933.

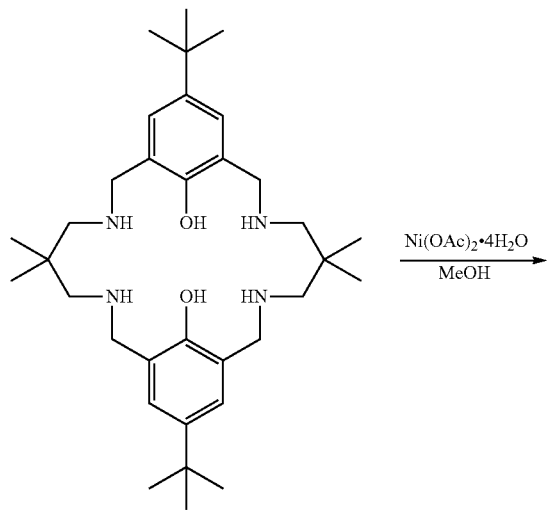

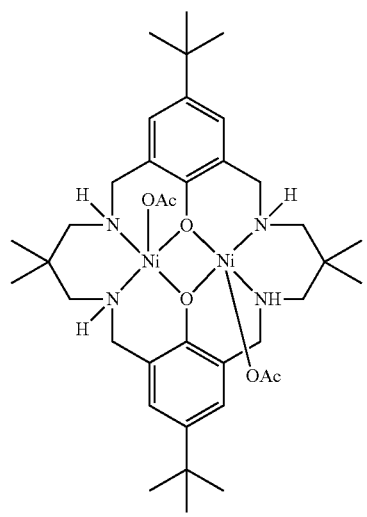

$H_2L^1$ (2 mmol) was dissolved in MeOH (50 mL), then Ni(OAc)$_2$·4H$_2$O (0.498 g, 4 mmol) was added portionwise over 15 minutes and the solution stirred overnight. The solvent was removed under vacuum and excess water/AcOH was removed by azeotrope with toluene (3×40 mL).

[L$^1$Ni$_2$(OAc)$_2$]: IR ($\upsilon_{C=O}$, cm$^{-1}$, neat): 1581 and 1413. MALDI-TOF MS: m/z: 727.6 ([M-OAc]$^+$, 100%).

Polymerisation Reaction

X mg of DMC catalyst, optionally 165 mg of [L$^1$Ni$_2$(OAc)$_2$], and 3 g of PPG-425 (polypropylene glycol) starter were taken into a 100 ml oven dried reactor. The reactor vessel was closed and set to the reactor controller. The catalyst and starter were dried at 110° C.-120° C. under vacuum of −1.0 bar for 1-2 hours. After that, the reactor was cooled down to the room temperature and propylene oxide (PO) (15 ml) was injected into the vessel via a syringe under 1 bar CO$_2$ gas and the reaction mixture heated up to 80° C. Once at temperature, the desired CO$_2$ pressure was added and the reaction was continued for the desired time. After completion, the reactor was cooled down to below 10° C. and the pressure was released very slowly. NMR and GPC was measured instantly. The crude reaction mixture was diluted in CH$_2$Cl$_2$ and poured into HCl/MeOH.

Results

TABLE 1

Combination of DMC and [L$^1$Ni$_2$(OAc)$_2$]: influence on polymer properties

| No. | DMC (mg) | [L$^1$Ni$_2$(OAc)$_2$] (mg) | Time | Pressure (bar) | Mn (g/mol) | PDI | CO$_2$ Wt % |
|---|---|---|---|---|---|---|---|
| 1 | 1.9 | — | 6 | 10 | 1100 | 2.3 | 7.5 |
| 2 | 1.9 | — | 6 | 5 | 1400 | 2.5 | 7.5 |
| 3 | 1.6 | 165 | 6 | 5 | 700 | 1.18 | 17.6 |
| 4 | 1.3 | 165 | 6 | 10 | 850 | 1.1 | 21.6 |

The results set out in Table 1 show that the combination of a DMC catalyst and a catalyst of formula (I) can prepare short chain polyols under low CO$_2$ pressures but still containing a high CO$_2$ content. It can clearly be seen that by combining both the DMC catalyst and [L$^1$Ni$_2$(OAc)$_2$] under 5 or 10 bar pressure, significantly more CO$_2$ can be incorporated than can be by just using the DMC catalyst alone. It also advantageously gives low polydispersities (<1.2) which will give better performance in polyurethane formulations.

Reactions were carried out using the same procedure as above but a range of starters (20 molar eq. vs [L$^1$Ni$_2$(OAc)$_2$])

TABLE 2

Variation of starter compound

| No. | DMC (mg) | [L$^1$Ni$_2$(OAc)$_2$] (mg) | Starter | Pressure (bar) | CO$_2$ wt % | Mn (g/mol) | PDI |
|---|---|---|---|---|---|---|---|
| 1 | 1.7 | 165 | PPG 1000 | 10 | 12.27 | 1700 | 1.05 |
| 2 | 1.7 | 165 | PPG 725 | 10 | 13.4 | 1400 | 1.06 |
| 3 | 1.7 | 165 | 1,6 hexanediol | 10 | 12.9 | 700 | 1.08 |

The results in Table 2 demonstrate that a variety of starters can be successfully used to produce low polydispersity polyols with a variety of molecular weights under low CO$_2$ pressures.

Example 2

Synthesis of [L$^{23}$Ni$_2$(OAc)$_2$]—Catalyst 2

Catalyst [L$^{23}$Ni$_2$(OAc)$_2$]—2 was prepared as per catalyst 1 except using a methylated macrocyclic ligand.

Catalyst 2

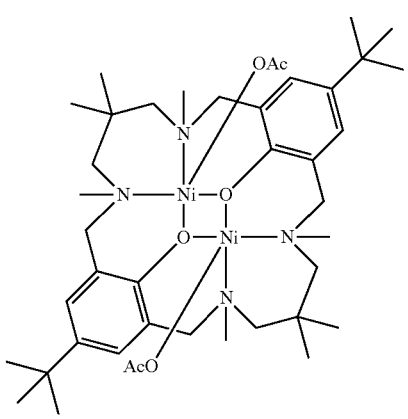

Example 2a

All polymerizations were performed in 100 mL Parr reaction vessels which were dried at 140° C. in an oven for 1 h prior to use. The DMC catalyst as prepared in Example 1 (15 mg) and 1,6-hexanediol (2.28 g, 19.32 mmol) were taken inside the reactor vessel while the vessel temperature was below 80° C. The reactor was assembled and placed under vacuum for 30 minutes at 120° C. The vessel was cooled to room temperature. Catalyst 2 (270 mg, 0.321 mmol) was dried in a Schlenk tube under vacuum for about 30-40 minutes before propylene oxide (45 ml, 643.08 mmol) was added. The catalyst solution was transferred into the Parr reaction vessel via syringe under $CO_2$ at atmospheric pressure. The reactants were stirred under atmospheric pressure $CO_2$ whilst the vessel was heated to 60° C. When the temperature reached to the reaction temperature, the reactor vessel was charged with 5 bar $CO_2$. After 16 hours, the reactor was cooled down to 5-6° C., vented, and the product removed from the reactor. The crude product was analysed by $^1$H NMR and GPC. The crude product was stabilized using p-toluenesulfonic acid, 12% acetic acid (5 mol/mol c.f. catalyst 2).

The polyol was formed with 89% selectivity over the cyclic carbonate with a propylene oxide conversion of 78%. For viscosity/OH number measurements the cyclic propylene carbonate by-product was removed on a Kugelrohr by vacuum distillation at 100° C. for 3 hours.

Example 2b

Example 2b was carried out in the same way as Example 2a except using 128 mg Catalyst 2, at a reaction temperature of 55° C. for 64 hours (over a weekend).

The resulting polyol was formed in 89% selectivity over the cyclic carbonate with a propylene oxide conversion of 91%.

Example 2c

Example 2c was carried out in the same way as Example 2a except using a reaction temperature of 60° C. for 64 hours (over a weekend).

The polyol was formed with 84% selectivity over the cyclic carbonate with a propylene oxide conversion of 99.5%.

Example 2d

Example 2d was carried out in the same way as Example 2a except using a reaction temperature of 80° C. for 16 hours.

The resulting polyol was formed in 92.1% selectivity over the cyclic carbonate with a propylene oxide conversion of >99.5%

Example 2e

Example 2e was carried out in the same way as Example 2a except using a reaction temperature of 85° C. for 16 hours.

The resulting polyol was formed in 92% selectivity over the cyclic carbonate, with a propylene oxide conversion of 95%.

TABLE 3

Copolymerisation data for Examples 2a-2e

| E.g. | P (bar) | $R_C$ | $R_{PEC}$ | $CO_2$ (wt %) | Mn (GPC)* | PDI | OH No. | Mw from OH. No. | Viscosity (mPa · s, 21° C.) | Viscosity (mPa · s, 75° C.) |
|---|---|---|---|---|---|---|---|---|---|---|
| 2a | 5 | 0.72 | 0.35 | 33% | 1400 | 1.7 | — | 1700‡ | —† | 2050 |
| 2b | 5 | 0.54 | 0.67 | 26.6% | 1700 | 1.6 | 54.9 | 2050 | 21300 | 520 |
| 2c | 5 | 0.46 | 0.69 | 25.6% | 1750 | 1.5 | 55.9 | 2010 | 14400 | 430 |
| 2d | 5 | 0.31 | 0.82 | 18.4% | 1950 | 1.5 | — | 2200‡ | 3800 | 230 |
| 2e | 5 | 0.15 | 0.53 | 10% | 1450 | 1.6 | — | 1750‡ | 860 | 60 |

*Gel Permeation Chromatography run against narrow poly(ethylene glycol) standards in THF.
‡Mw estimated based upon calibration between OH no. titration experiments and GPC measurements across a wide range of polycarbonate polyol samples with varying molecular weights.
†Not measured as the viscosity was too high for the torque rating of the machine at this temperature.

The results in Table 3 demonstrate that the catalyst system of the present invention can be used to produce a range of polyols with moderate (10 wt %) to high (33 wt %) $CO_2$ incorporation at just 5 bar $CO_2$ pressure. The polyols can be made in high yields with good polyol selectivities and performance can be tailored for preferred process and product parameters by selection of either catalyst.

Figure 6:
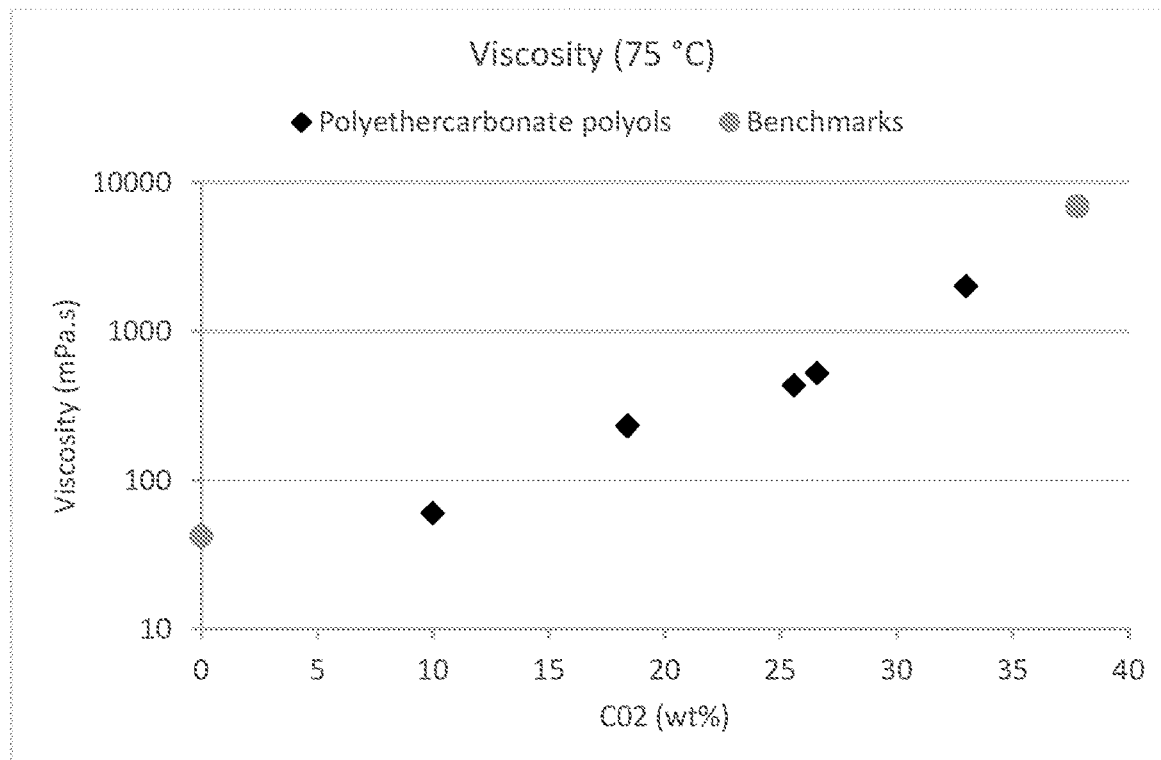
FIG. 6 shows the viscosity at 75° C. of (approximately) Mw 2000 polyols prepared in Example 2, having varying $CO_2$ content.
Figure 7:
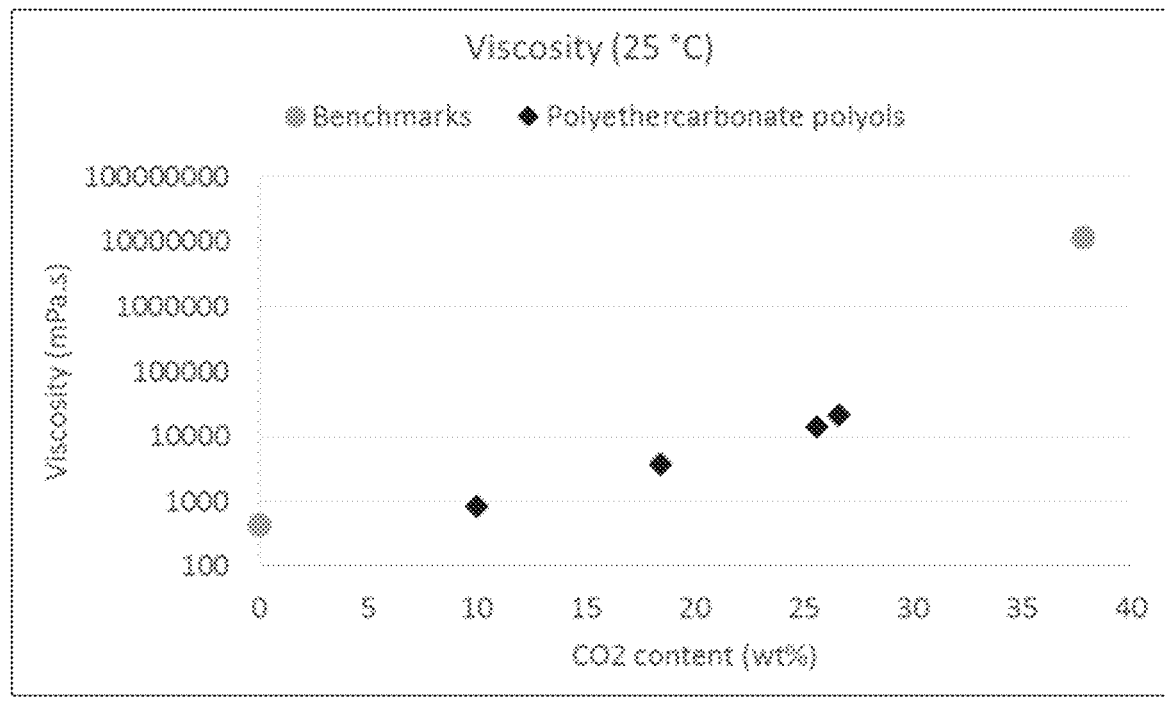
FIG. 7 shows the viscosity at 25° C. of (approximately) Mw 2000 polyols prepared in Example 2, having varying $CO_2$ content.

Furthermore, Table 3 and FIGS. 6 and 7 demonstrate the significant effect $CO_2$ content has on polyol viscosity. Taking into account the slight variation in molecular weights, a clear correlation can be seen between the polyol viscosity and $CO_2$ content. The $CO_2$ content can be tuned using the inventive process to meet the requirements of the desired application without the need for high pressure operation. The inventive process can also be tuned to make relatively short chain polyols (<2000 g/mol) which have high $CO_2$ content as a pre-polymerisation (or activation) phase in the absence of $CO_2$ that only produces polyether is not necessary using the claimed invention.

FIGS. 6 and 7 set out the viscosity of the polymers produced in Examples 2a-2e at 75° C. and 25° C. respectively, the benchmarks used were B1 PPG-2000 (viscosity at 75° C. from U.S. Pat. No. 3,054,755, viscosity at 25° C. from Sigma Aldrich) and B2—a polyol produced just with catalyst 2 using a poly(propylene glycol)-425 starter under conditions which favour high $CO_2$ incorporation (the polyol is essentially a polycarbonate-polyether-polycarbonate triblock with an $R_c$ of 0.80 and an $R_{PEC}$ of 0.16). All polymers have a $M_W$ of approximately 2000.

Figure 8:
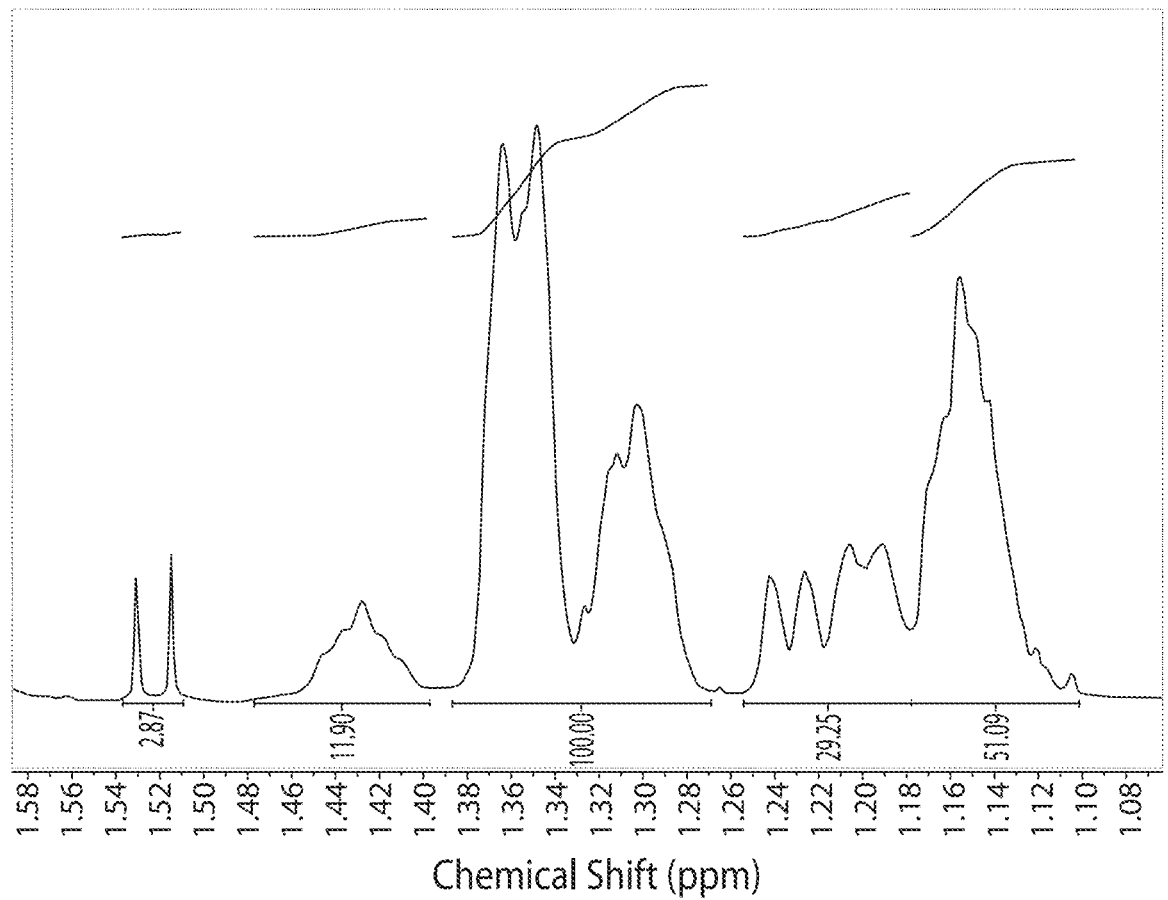
FIG. 8 is a $^1$H NMR spectrum of the polyol prepared in Example 2a, containing 33 wt % $CO_2$.
Figure 9:
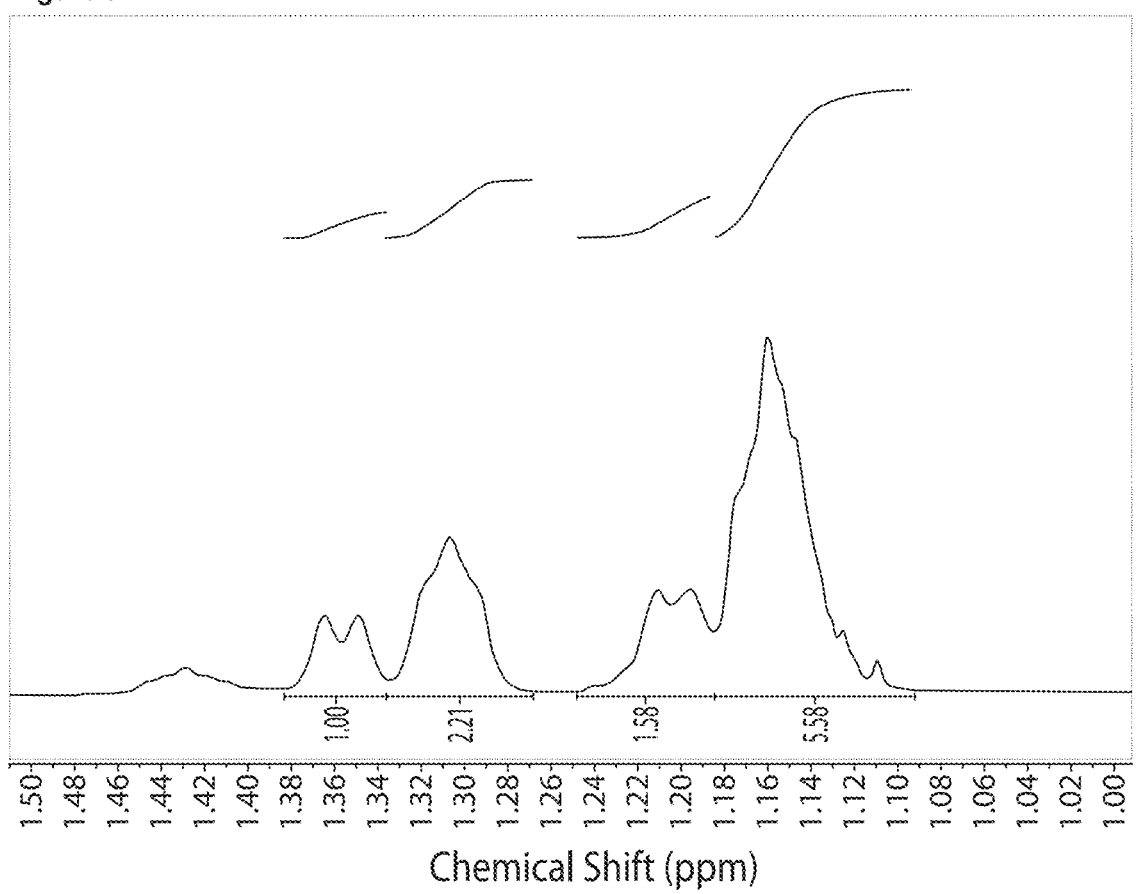
FIG. 9 is a $^1$H NMR spectrum of the polyol prepared in Example 2b, containing 26.6 wt % $CO_2$ and an $R_{PEC}$ of 0.67.

It can be seen from $R_{PEC}$, which is the ratio of PEC/PC, that in all cases a very significant proportion of the carbonate linkages present are adjacent to an ether linkage, indicating the polymers are formed with a significantly random structure and not a well-defined block structure. In comparison, 2a and B2, have similar $R_c$ values (0.71 vs. 0.80) but very different $R_{PEC}$ values (0.35 and 0.16) indicating a significant increase in the random structure in 2a. FIGS. 8 and 9 show the $^1$H NMR spectra from examples 2a and 2b, demonstrating the change in the amount of PEC and PC linkages.

Figure 10:
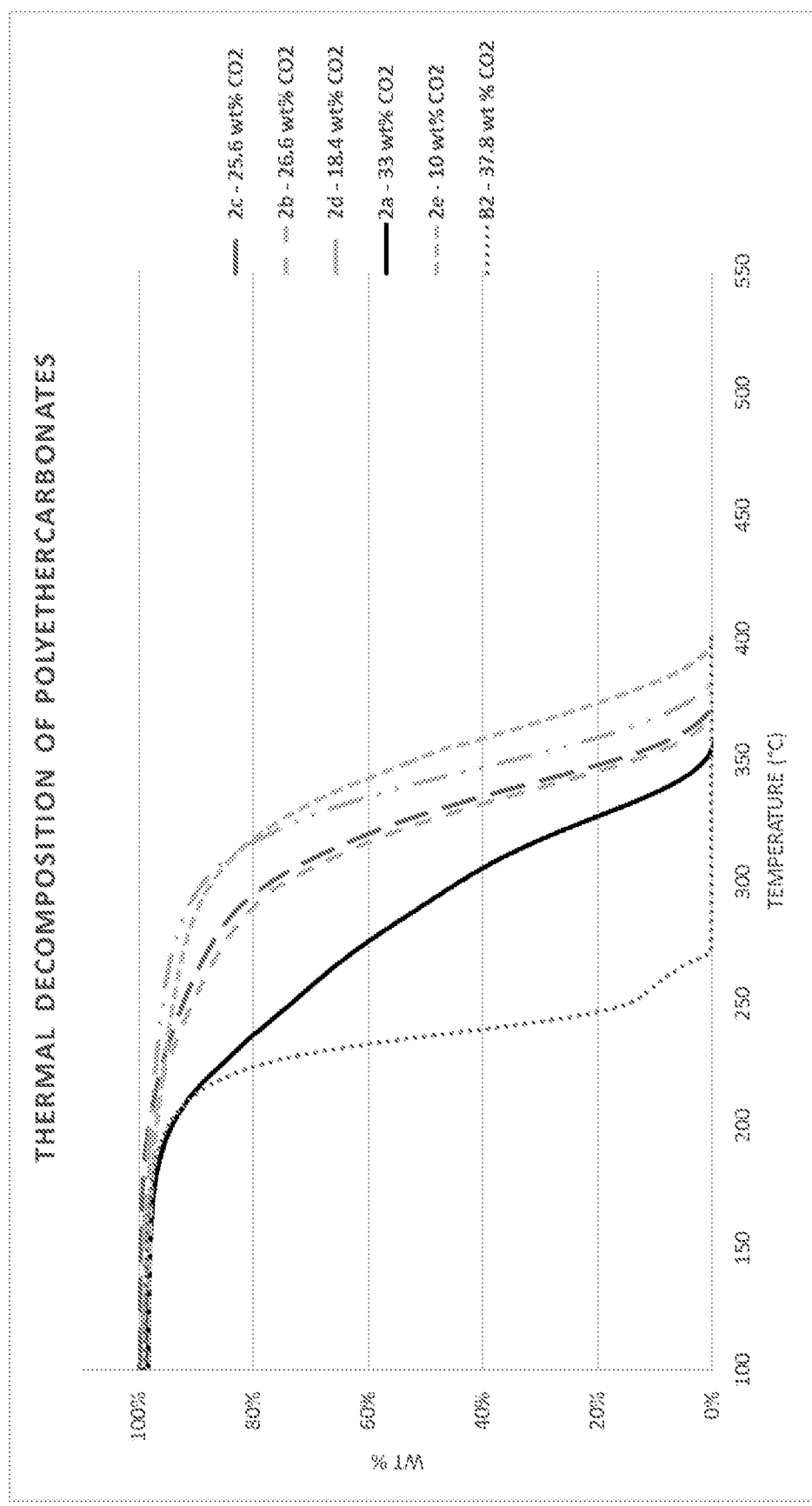
FIG. 10 show the overlaid Thermogravimetrics Analysis (TGA) traces for examples 2a-e and Benchmark B2.

FIG. 10 demonstrates the different the structure of the polyol has on the thermal stability. B2 demonstrates significant decomposition at around 200° C., with a clear second degradation at 250° C. which is understood to correspond to the polyether block section. In comparison, the polyol of example 2a demonstrates a similar onset but a much slower degradation and a much less defined two-stage degradation—indicating the random mixing of the ether and carbonate units within the polyols structure. Polyols produced in examples 2b-e show a significantly increased degradation temperature as well as a one-stage degradation indicating the polyols are random in structure and do not contain significant blocks of polycarbonate (as indicated by the high $R_{PEC}$ values).

Example 3

Several experiments were carried out as per Example 2, except with variation of the starter.

Example 3a

Example 3a was carried out as per Example 2a except 1,4-cyclohexanedimethanol (2.77 g, 19.3 mmol) was used as the starter, and the reaction carried out at 75° C. and 10 bar $CO_2$ pressure.

The resulting polyol was formed in 74% selectivity over the cyclic carbonate with a propylene oxide conversion of 94.5%.

Example 3b

Example 3b was carried out as per Example 3a except 1,12-dodecanediol (3.88 g, 19.3 mmol) was used as the starter.

The resulting polyol was formed in 78.8% selectivity over the cyclic carbonate with a propylene oxide conversion of 98.2%.

Example 3c

Example 3c was carried out as per Example 3a except Poly(caprolactone) diol (Mn 530, 10.1 g, 19.3 mmol) was used as the starter.

The resulting polyol was formed in 81.4% selectivity over the cyclic carbonate with a propylene oxide conversion of 98.6%.

Example 3d

Example 3d was carried out as per Example 3a except poly(propylene glycol) (Mn 425, 8.17 g, 19.3 mmol) was used as the starter.

The resulting polyol was formed in 78.8% selectivity over the cyclic carbonate with a propylene oxide conversion of 95.0%.

TABLE 4

Copolymerisation data for Examples 3a-d

| E.g. | P (bar) | Starter | $R_C$ | $CO_2$ (wt %) | Mn (GPC)* | PDI |
|---|---|---|---|---|---|---|
| 3a | 10 | 1,4-cyclohexanedimethanol | 0.51 | 23.8% | 1900 | 1..9 |
| 3b | 10 | 1,12-dodecanediol | 0.60 | 28.0% | 2600 | 1.8 |
| 3c | 10 | Poly(caprolactone) diol Mn-530 | 0.48 | 19.8% | 2700 | 1.7 |
| 3d | 10 | Poly(propylene glycol)-425 | 0.47 | 26.7% | 2500 | 1.9 |

The results in Table 4 demonstrate the invention can be carried out in the presence of a range of starters, producing polyols with varying molecular weights and still incorporate significant quantities of $CO_2$ under low pressures.

Example 4

Example 4a

Example 4a was run according to Example 2a except with 1.08 g 1,6-hexanediol, for 6 hours at 75° C. and 10 bar.

Example 4b

Example 4b was run according to Example 4a except in the absence of catalyst 2.

Example 4c

Example 4c was run according to Example 4a except in the absence of the DMC catalyst.

TABLE 5

Copolymerisation data for Examples 4a-c

| E.g. | P (bar) | Cat 2 | DMC | Conv. | $R_C$ | $CO_2$ (wt %) | Mn (GPC)* | PDI |
|---|---|---|---|---|---|---|---|---|
| 4a | 10 | Yes | Yes | 88% | 0.57 | 28.4% | 2000 | 1.9 |
| 4b | 10 | No | Yes | 8% | 0.60 | 25% | 350 | 1.1 |
| 4c | 10 | Yes | No | 34% | 0.97 | 37% | 700 | 1.16 |

Table 5 demonstrates that the invention provides a product and a performance that isn't achieved by either catalyst on it's own under the same conditions, giving an increased conversion, molecular weight and balanced $R_c$. Whilst the DMC alone gives a reasonable carbonate content under these conditions it provides almost no conversion of monomer to polymer or molecular weight development.

The invention claimed is:

1. A method for preparing a polycarbonate ether polyol, the method comprising reacting carbon dioxide and an epoxide in the presence of a double metal cyanide (DMC) catalyst, a catalyst of formula (I), and a starter compound, wherein the catalyst of formula (I) has the following structure:

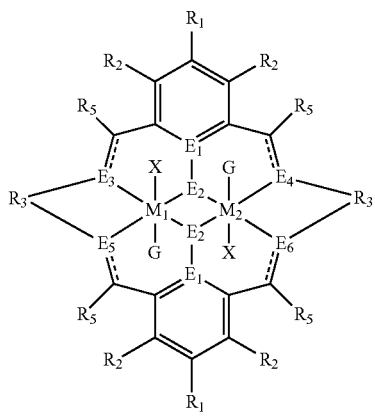 (I)

wherein $M_1$ and $M_2$ are independently selected from Zn(II), Cr(II), Co(II), Cu(II), Mn(II), Mg(II), Ni(II), Fe(II), Ti(II), V(II), Cr(III)-X, Co(III)-X, Mn(III)-X, Ni(III)-X, Fe(III)-X, Ca(II), Ge(II), Al(III)-X, Ti(III)-X, V(III)-X, Ge(IV)-(X)$_2$, and Ti(IV)-(X)$_2$;

$R_1$ and $R_2$ are each independently selected from hydrogen, halide, a nitro group, a nitrile group, an imine, an amine, an ether group, a silyl group, a silyl ether group, a sulfoxide group, a sulfonyl group, a sulfinate group, an acetylide group, an optionally substituted alkyl, an optionally substituted alkenyl, an optionally substituted alkynyl, an optionally substituted haloalkyl, an optionally substituted heteroalkyl, an optionally substituted aryl, an optionally substituted heteroaryl, an optionally substituted alkoxy, an optionally substituted aryloxy, an optionally substituted alkylthio, an optionally substituted arylthio, an optionally substituted alicyclic, and an optionally substituted heteroalicyclic group;

each $R_3$ is independently selected from optionally substituted alkylene, optionally substituted alkenylene, optionally substituted alkynylene, optionally substituted heteroalkylene, optionally substituted heteroalkenylene, optionally substituted heteroalkynylene, optionally substituted arylene, optionally substituted heteroarylene, and optionally substituted cycloalkylene, wherein alkylene, alkenylene, alkynylene, heteroalkylene, heteroalkenylene, and heteroalkynylene may optionally be interrupted by aryl, heteroaryl, alicyclic, and heteroalicyclic;

each $R_5$ is independently selected from hydrogen, optionally substituted aliphatic, optionally substituted heteroaliphatic, optionally substituted alicyclic, optionally substituted heteroalicyclic, optionally substituted aryl, optionally substituted heteroaryl, optionally substituted alkylheteroaryl, and optionally substituted alkylaryl;

$E_1$ is C, $E_2$ is O, s, or NH, or $E_1$ is N and $E_2$ is O;

$E_3$, $E_4$, $E_5$, and $E_6$ are each independently selected from N, NR$_4$, O, and S, wherein when $E_3$, $E_4$, $E_5$, or $E_6$ is N, ===== is =====, and wherein when $E_3$, $E_4$, $E_5$, or $E_6$ is NR$_4$, O, or S, ===== is _____;

each $R_4$ is independently selected from hydrogen, optionally substituted aliphatic, optionally substituted heteroaliphatic, optionally substituted alicyclic, optionally substituted heteroalicyclic, optionally substituted aryl, optionally substituted heteroaryl, optionally substituted alkylheteroaryl, optionally substituted -alkylC(O)OR$_{19}$, optionally substituted -alkylC≡N, and optionally substituted alkylaryl;

each X is independently selected from OC(O)R$_x$, OSO$_2$R$_x$, OSOR$_x$, OSO(R$_x$)$_2$, S(O)R$_x$, OR$_x$, phosphinate, halide, nitrate, hydroxyl, carbonate, amino, amido, optionally substituted aliphatic, optionally substituted heteroaliphatic, optionally substituted alicyclic, optionally substituted heteroalicyclic, optionally substituted aryl, and optionally substituted heteroaryl;

each R$_x$ is independently hydrogen, optionally substituted aliphatic, optionally substituted haloaliphatic, optionally substituted heteroaliphatic, optionally substituted alicyclic, optionally substituted heteroalicyclic, optionally substituted aryl, optionally substituted alkylaryl, or optionally substituted heteroaryl;

G is absent or independently selected from a neutral or anionic donor ligand which is a Lewis base;

the starter compound is a compound having the following structure:

 (III)

wherein Z is selected from optionally substituted alkylene, optionally substituted alkenylene, optionally substituted alkynylene, optionally substituted heteroalkylene, optionally substituted heteroalkenylene, optionally substituted heteroalkynylene, optionally substituted cycloalkylene, optionally substituted cycloalkenylene, optionally substituted hererocycloalkylene, optionally substituted heterocycloalkenylene, optionally substituted arylene, and optionally substituted heteroarylene, or Z may be a combination of any of these groups;

a is an integer which is at least 2;

each $R^Z$ is independently —OH, —NHR', —SH, —C(O)OH, PR'(O)(OH)$_2$, —P(O)(OR')(OH), or —PR'(O)OH; and each R' is independently selected from H, optionally substituted alkyl, optionally substituted heteroalkyl, optionally substituted aryl, optionally substituted heteroaryl, optionally substituted cycloalkyl, and optionally substituted heterocycloalkyl.

2. The method of claim 1 wherein the reaction is carried out at a pressure of between about 1 bar and about 60 bar carbon dioxide.

3. The method according to claim 1, wherein $M_1$ and $M_2$ are independently selected from Ni(II), Zn(II), Mg(II), Co(II), Co(III)-X, Cr(II), Cr(III)-X, Mn(II), Mn(III)-X, Al(III)-X, Fe(II), and Fe(III)-X.

4. The method according to claim 1, wherein each $E_1$ is C; and each $E_2$ is O.

5. The method according to claim 1, wherein $R_1$ is hydrogen, halide, an amine, an ether group, an alkylthio group, optionally substituted alkyl, optionally substituted alkenyl, optionally substituted alkynyl, optionally substituted haloalkyl, optionally substituted aryl, optionally substituted heteroaryl, optionally substituted alicyclic, or optionally substituted heteroalicyclic.

6. The method according to claim 1, wherein $R_2$ is hydrogen, optionally substituted alkyl, optionally substituted heteroalkyl, optionally substituted aryl, or optionally substituted heteroaryl.

7. The method according to claim 1, wherein $R_4$ is hydrogen, optionally substituted alkyl, optionally substituted heteroalkyl, optionally substituted aryl, or optionally substituted heteroaryl.

8. The method according to claim 1, wherein $R_5$ is hydrogen, optionally substituted alkyl, optionally substituted heteroalkyl, optionally substituted aryl, or optionally substituted heteroaryl.

9. The method according to claim 1, wherein $R_3$ is optionally substituted alkylene, optionally substituted heteroalkylene, optionally substituted arylene, or optionally substituted cycloalkylene.

10. The method of claim 1, wherein each X is independently selected from $OC(O)R^*_X$, $OSO_2R^*_X$, $OS(O)R^*_X$, $OSO(R^*_X)_2$, $S(O)R^*_X$, $OR^*_X$, halide, nitrate, hydroxyl, carbonate, amino, nitro, amido, alkyl, heteroalkyl, aryl, and heteroaryl, and each $R^*_X$ is independently optionally substituted alkyl, optionally substituted alkenyl, optionally substituted alkynyl, optionally substituted heteroalkyl, optionally substituted aryl, optionally substituted heteroaryl, optionally substituted cycloalkyl, or optionally substituted alkylaryl.

11. The method of claim 1, wherein the catalyst of formula (I) has a symmetric macrocyclic ligand.

12. The method of claim 1, wherein the catalyst of formula (I) has an asymmetric macrocyclic ligand.

13. The method of claim 11, wherein $E_3$, $E_4$, $E_5$, and $E_6$ are $NR_4$, and wherein at least one occurrence of $E_3$, $E_4$, $E_5$, and $E_6$ is different from the remaining occurrence(s) of $E_3$, $E_4$, $E_5$, and $E_6$.

14. The method according to claim 1, wherein the catalyst of formula (I) is selected from:

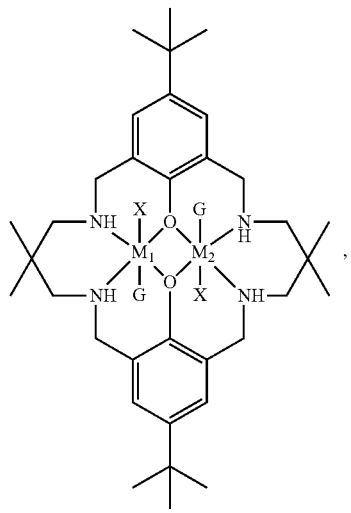

$[L^1M_1M_2(X)_2(G)_2]$

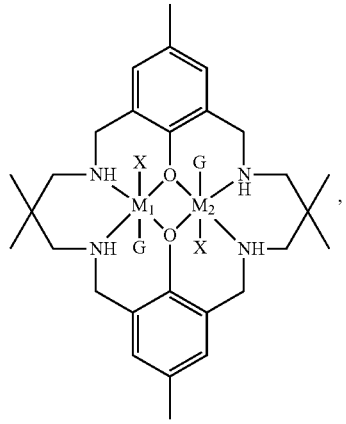

$[L^2M_1M_2(X)_2(G)_2]$

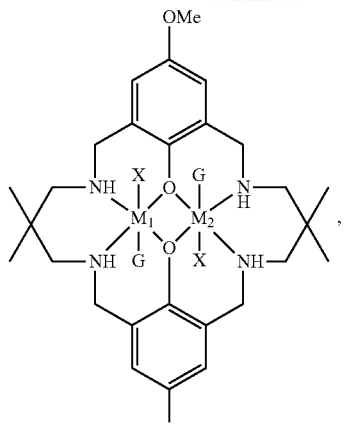

$[L^3M_1M_2(X)_2(G)_2]$

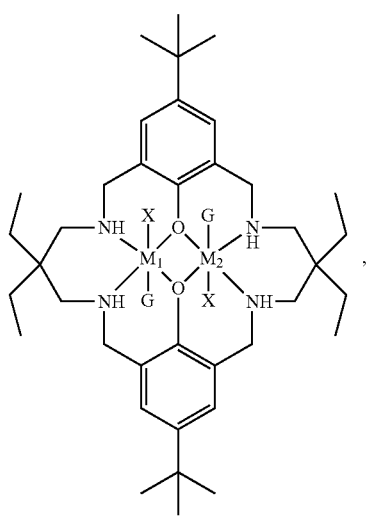

$[L^4M_1M_2(X)_2(G)_2]$

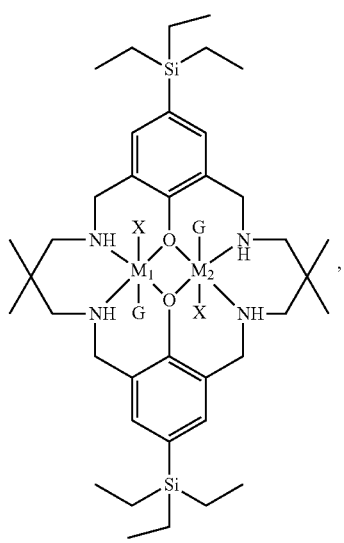

$[L^5M_1M_2(X)_2(G)_2]$

-continued
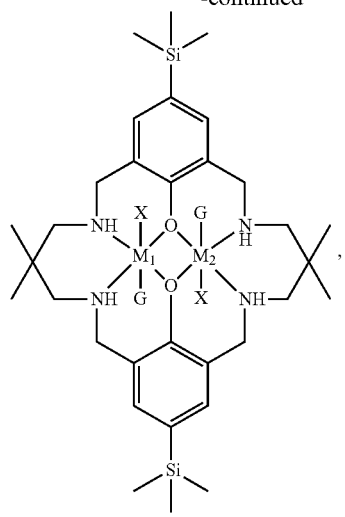
[L⁶M₁M₂(X)₂(G)₂]
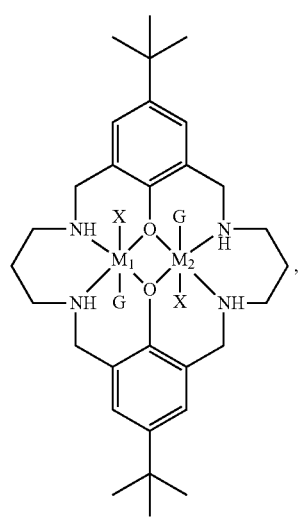
[L⁷M₁M₂(X)₂(G)₂]
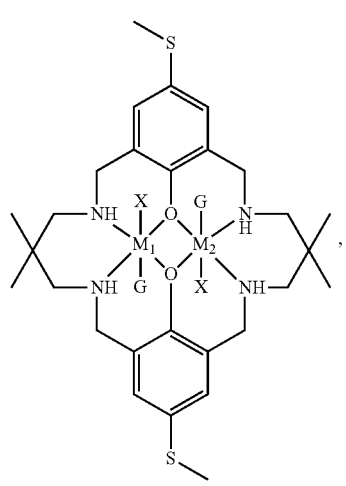
[L⁸M₁M₂(X)₂(G)₂]
-continued
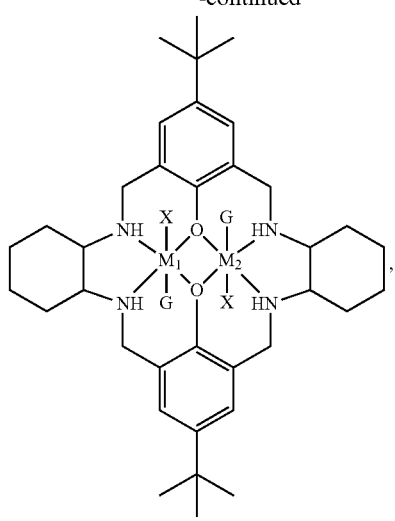
[L⁹M₁M₂(X)₂(G)₂]
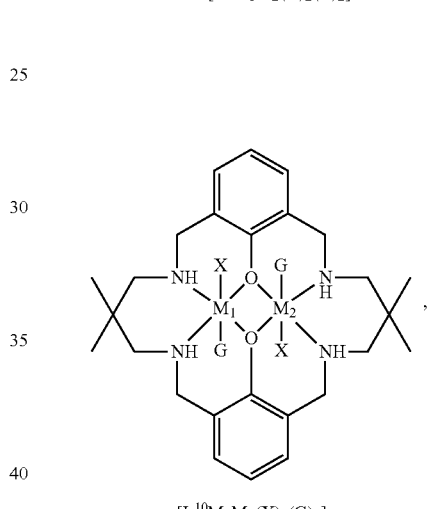
[L¹⁰M₁M₂(X)₂(G)₂]
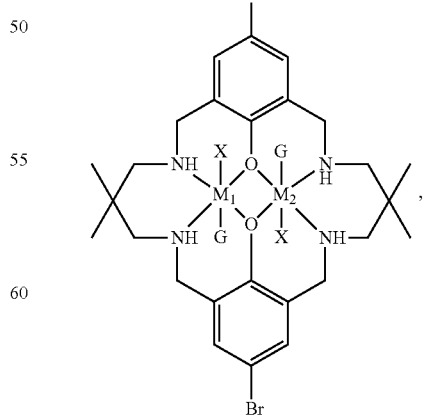
[L¹¹M₁M₂(X)₂(G)₂]

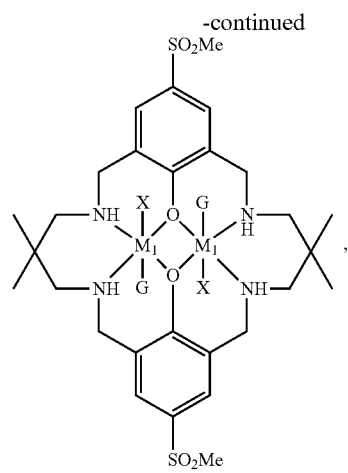
[L¹²M₁M₂(X)₂(G)₂]
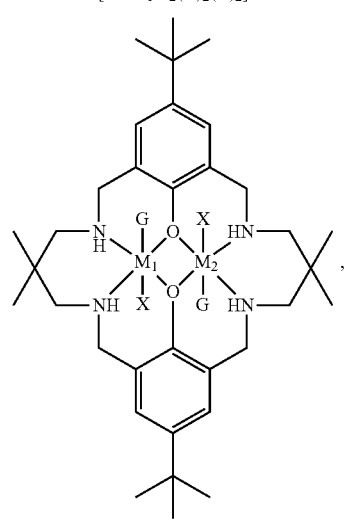
[L¹³M₁M₂(X)₂(G)₂]
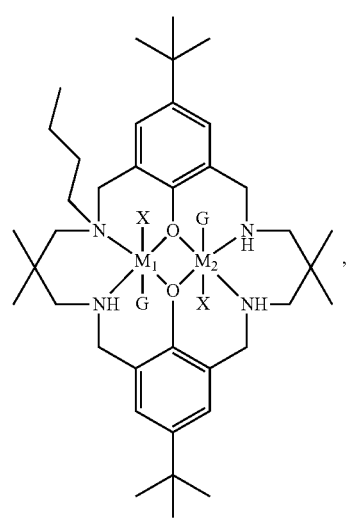
[L¹⁴M₁M₂(X)₂(G)₂]
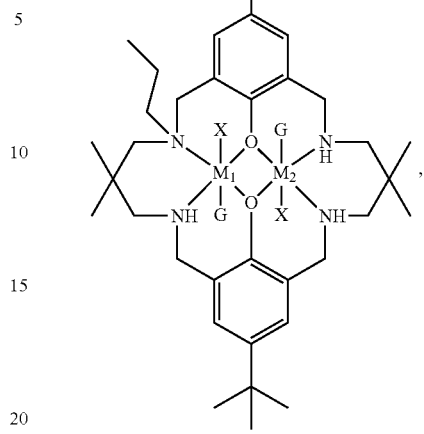
[L¹⁵M₁M₂(X)₂(G)₂]
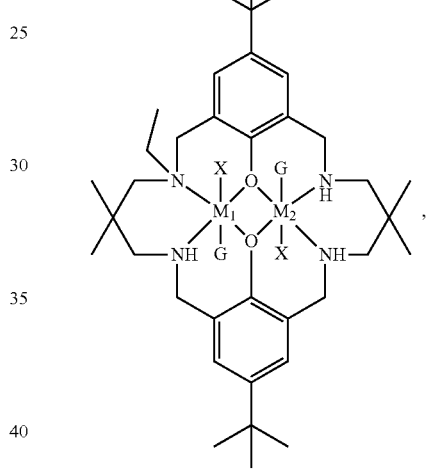
[L¹⁶M₁M₂(X)₂(G)₂]
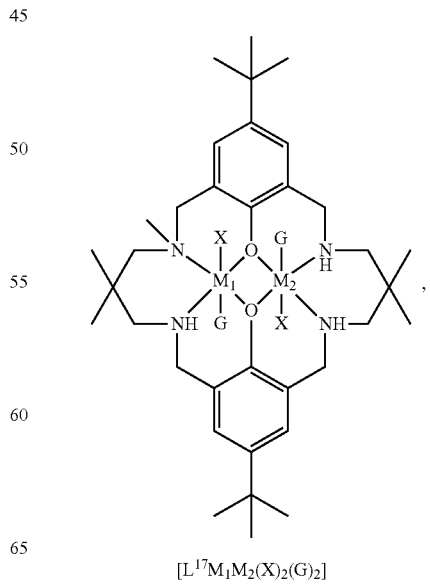
[L¹⁷M₁M₂(X)₂(G)₂]

-continued
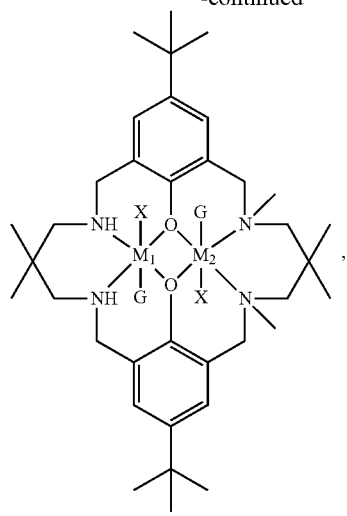
$[L^{18}M_1M_2(X)_2(G)_2]$
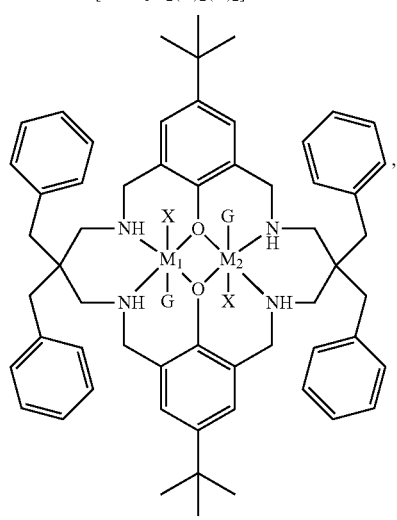
$[L^{19}M_1M_2(X)_2(G)_2]$
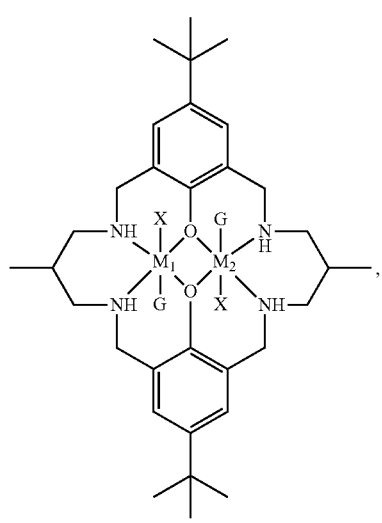
$[L^{20}M_1M_2(X)_2(G)_2]$
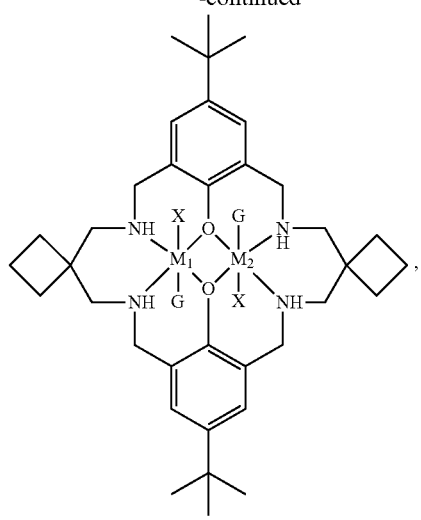
$[L^{21}M_1M_2(X)_2(G)_2]$
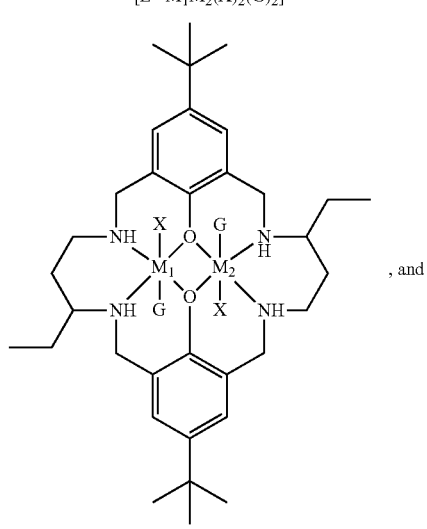
, and
$[L^{22}M_1M_2(X)_2(G)_2]$
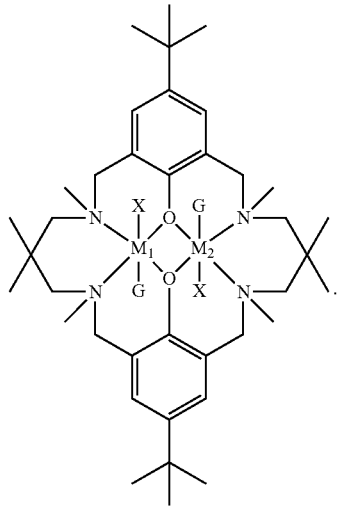
$[L^{23}M_1M_2(X)_2(G)_2]$ 15. The method of claim 1, wherein the reaction is carried out at a temperature in the range of about 50° C. to about 110° C.

16. The method of claim 1, wherein each occurrence of $R^z$ is —OH.

17. The method of claim 1, wherein the starter compound is selected from 1,2-ethanediol (ethylene glycol), 1-2-propanediol, 1,3-propanediol (propylene glycol), 1,2-butanediol, 1-3-butanediol, 1,4-butanediol, 1,5-pentanediol, 1,6-hexanediol, 1,8-octanediol, 1,10-decanediol, 1,4-cyclohexanediol, 1,2-diphenol, 1,3-diphenol, 1,4-diphenol, neopentyl glycol, catechol, cyclohexenediol, 1,4-cyclohexanedimethanol, dipropylene glycol, diethylene glycol, tripropylene glycol, triethylene glycol, tetraethylene glycol, polypropylene glycols (PPGs), polyethylene glycols (PEGs), glycerol, benzenetriol, 1,2,4-butanetriol, 1,2,6-hexanetriol, tris(methylalcohol)propane, tris(methylalcohol)ethane, tris(methylalcohol)nitropropane, polypropylene oxide triols, polyester triols, calix[4]arene, 2,2-bis(methylalcohol)-1,3-propanediol, erythritol, pentaerythritol, polyalkylene glycols having 4-OH groups, sorbitol, polyalkylene glycols having 5 or more —OH groups, oxalic acid, malonic acid, succinic acid, glutaric acid, adipic acid, pimelic acid, suberic acid, azelaic acid, sebacic acid, undecanedioic acid, dodecanedioic acid, lactic acid, glycolic acid, 3-hydroxypropanoic acid, 4-hydroxybutanoic acid, and 5-hydroxypentanoic acid.

18. The method of claim 1, wherein the starter compound is 1,6-hexanediol, 1,4-cyclohexanedimethanol, 1,12-dodecanediol, poly(caprolactone) diol, PPG 425, PPG 725, or PPG 1000.

19. The method of claim 1, wherein the starter compound is glycerol, benzenetriol, 1,2,4-butanetriol, 1,2,6-hexanetriol, tris(methylalcohol)propane, tris(methylalcohol)ethane, tris(methylalcohol)nitropropane, polypropylene oxide triols, or polyester triols.

20. The method of claim 1, wherein the DMC catalyst is prepared by treating an aqueous solution of a metal salt with an aqueous solution of a metal cyanide salt in the presence of an organic complexing agent, the metal cyanide salt is of the formula $(Y)_qM''(CN)_b(A)_c$, wherein M'' is selected from Fe(II), Fe(III), Co(II), Co(III), Cr(II), Cr(III), Mn(II), Mn(III), Ir(III), Ni(II), Rh(III), Ru(II), V(IV), and V(V), Y is an alkali metal ion or an alkaline earth metal ion, A is an anion selected from halide, hydroxide, sulphate, cyanide oxalate, thiocyanate, isocyanate, isothiocyanate, carboxylate and nitrate;

q and b are integers of 1 or more;

c is 0 or an integer of 1 or more;

the sum of the charges on the anions Y, CN, and A multiplied by q, b, and c respectively satisfies the valency of M''; and the complexing agent is an ether, a ketone, an ester, an amide, an alcohol, an urea or a combination thereof.

21. The method of claim 20, wherein the metal salt is of the formula $M'(X')_p$, wherein M' is selected from Zn(II), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III), X' is an anion selected from halide, hydroxide, sulphate, carbonate, cyanide, oxalate, thiocyanate, isocyanate, isothiocyanate, carboxylate, and nitrate, p is an integer of 1 or more, and the charge on the anion multiplied by p satisfies the valency of M'.

22. The method of claim 20, wherein the DMC catalyst comprises the formula:

$$M'_d[M''_e(CN)_f]_g$$

wherein M' is selected from Zn(II), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III);

M'' is selected from Fe(II), Fe(III), Co(II), Co(III), Cr(II), Cr(III), Mn(II), Mn(III), Ir(III), Ni(II), Rh(III), Ru(II), V(IV), and V(V); and d, e, f, and g are integers, such that the DMC catalyst has electroneutrality.

23. The method of claim 22 wherein M' is selected from Zn(II), Fe(II), Co(II) and Ni(II); and/or M'' is selected from Co(II), Co(III), Fe(II), Fe(III), Cr(III), Ir(III) and Ni(II).

24. The method of claim 22 wherein M' is Zn(II); and M'' is Co(III).

* * * * *

UNITED STATES PATENT AND TRADEMARK OFFICE
CERTIFICATE OF CORRECTION

PATENT NO. : 10,774,179 B2
APPLICATION NO. : 15/809801
DATED : September 15, 2020
INVENTOR(S) : Michael Kember et al.

It is certified that error appears in the above-identified patent and that said Letters Patent is hereby corrected as shown below:

In the Claims

In Claim 10, at Column 51, Lines 6-7, the text:
"$OC(O)R^*_x$, $OSO_2R^*_x$, $OS(O)R^*_x$, $OSO(R^*_x)_2$, $S(O)R^*_x$, $OR^*_x$,"
Should be replaced with the text:
--$OC(O)R_x$, $OSO_2R_x$, $OS(O)R_x$, $OSO(R_x)_2$, $S(O)R_x$, $OR_x$,--.

In Claim 10, at Column 51, Line 9, the text:
"$R^*_x$"
Should be replaced with the text:
--$R_x$--.

In Claim 14, at Column 55, Lines 1-19, the formula:

"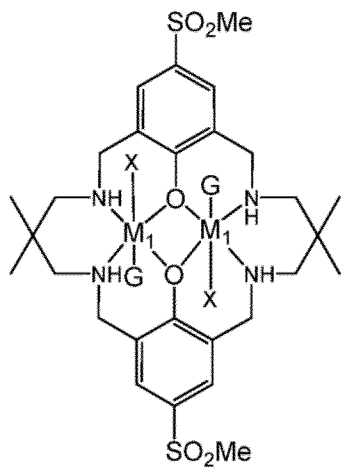"

Signed and Sealed this
Twentieth Day of April, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,774,179 B2

Should be replaced with the formula:

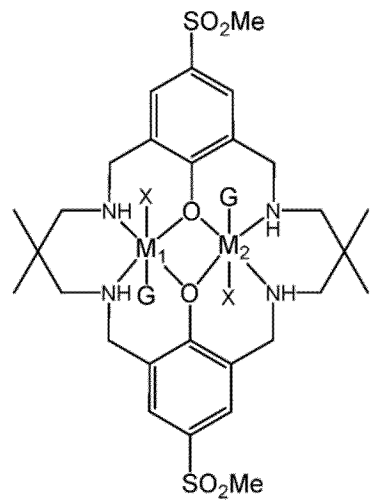

-- $[L^{12}M_1M_2(X)_2(G)_2]$ --.